(12) United States Patent
Ota et al.

(10) Patent No.: US 10,746,976 B2
(45) Date of Patent: Aug. 18, 2020

(54) ZOOM LENS AND IMAGING APPARATUS

(71) Applicant: FUJIFILM Corporation, Tokyo (JP)

(72) Inventors: Motoari Ota, Saitama (JP); Takuya Tanaka, Saitama (JP)

(73) Assignee: FUJIFILM Corporation, Tokyo (JP)

(*) Notice: Subject to any disclaimer, the term of this patent is extended or adjusted under 35 U.S.C. 154(b) by 164 days.

(21) Appl. No.: 16/142,024

(22) Filed: Sep. 26, 2018

(65) Prior Publication Data

US 2019/0025557 A1    Jan. 24, 2019

Related U.S. Application Data

(63) Continuation of application No. PCT/JP2017/011478, filed on Mar. 22, 2017.

(30) Foreign Application Priority Data

Mar. 29, 2016 (JP) .................. 2016-065234

(51) Int. Cl.
*G02B 15/163* (2006.01)
*G02B 13/18* (2006.01)
(Continued)

(52) U.S. Cl.
CPC ........... *G02B 15/163* (2013.01); *G02B 13/02* (2013.01); *G02B 13/18* (2013.01);
(Continued)

(58) Field of Classification Search
CPC .. G02B 15/14; G02B 15/145; G02B 15/1451; G02B 15/145129; G02B 15/15;
(Continued)

(56) References Cited

U.S. PATENT DOCUMENTS

2011/0037878 A1    2/2011  Wakazono et al.
2013/0271630 A1   10/2013  Nakamura
(Continued)

FOREIGN PATENT DOCUMENTS

CN        104364695 A      2/2015
CN        105182509 A     12/2015
(Continued)

OTHER PUBLICATIONS

International Search Report issued in PCT/JP2017/011478; dated Jul. 25, 2017.
(Continued)

*Primary Examiner* — Cara E Rakowski
(74) *Attorney, Agent, or Firm* — Studebaker & Brackett PC

(57) ABSTRACT

A zoom lens consists of, in order from an object side, a positive first lens group fixed relative to the image surface during zooming, at least two movable lens groups including a negative second lens group being adjacent to the first lens group, the at least two movable lens groups being movable by changing a distance in an optical-axis direction to an adjacent group during zooming; and a final lens group arranged on the most image side and fixed relative to the image surface during zooming. The first lens group has, continuously in order from the most object side, a first negative lens having a concave surface facing an image side, a second negative lens, and a third positive lens. A predetermined conditional expression relating to the first lens group is satisfied.

18 Claims, 23 Drawing Sheets

(51) Int. Cl.
*G02B 15/20* (2006.01)
*G02B 15/167* (2006.01)
*G02B 15/14* (2006.01)
*G02B 13/02* (2006.01)

(52) U.S. Cl.
CPC ... *G02B 15/145129* (2019.08); *G02B 15/167* (2013.01); *G02B 15/20* (2013.01)

(58) Field of Classification Search
CPC .... G02B 15/155; G02B 15/16; G02B 15/163; G02B 15/167; G02B 15/173; G02B 15/20
See application file for complete search history.

(56) References Cited

U.S. PATENT DOCUMENTS

| | | | |
|---|---|---|---|
| 2014/0104467 A1* | 4/2014 | Takemoto | G02B 15/173 348/294 |
| 2015/0042864 A1 | 2/2015 | Iriyama | |
| 2015/0092280 A1 | 4/2015 | Ikeda et al. | |
| 2015/0131165 A1 | 5/2015 | Nakamura et al. | |
| 2015/0355436 A1 | 12/2015 | Shimada et al. | |

FOREIGN PATENT DOCUMENTS

| | | |
|---|---|---|
| JP | H06-337350 A | 12/1994 |
| JP | 2011-039401 A | 2/2011 |
| JP | 2013-221977 A | 10/2013 |
| JP | 2015-052781 A | 3/2015 |
| JP | 2015-094869 A | 5/2015 |

OTHER PUBLICATIONS

Written Opinion issued in PCT/JP2017/011478; dated Jul. 25, 2017.
An Office Action mailed by the State Intellectual Property Office of People's Republic of China dated Mar. 7, 2019, which corresponds to Chinese Patent Application No. 201780020527.2 and is related to U.S. Appl. No. 16/142,024.

\* cited by examiner

EXAMPLE 1

EXAMPLE 2

EXAMPLE 3

EXAMPLE 4

EXAMPLE 5

EXAMPLE 7

EXAMPLE 10

ZOOM LENS AND IMAGING APPARATUS

CROSS-REFERENCE TO RELATED APPLICATIONS

This application is a continuation application of International Application No. PCT/JP2017/011478, filed Mar. 22, 2017, the disclosure of which is incorporated herein by reference in its entirety. Further, this application claims priority from Japanese Patent Application No. 2016-065234, filed Mar. 29, 2016, the disclosure of which is incorporated herein by reference in its entirety.

BACKGROUND OF THE INVENTION

1. Field of the Invention

The present invention relates to a zoom lens suitable for an electronic camera, such as a digital camera, a video camera, a broadcast camera, a motion-picture camera, or a surveillance camera; and also relates to an imaging apparatus including the zoom lens.

2. Description of the Related Art

A zoom lens is suggested in each of JP2015-52781A, JP2015-94869A, JP2011-39401A, and JP2013-221977A, as a zoom lens used for an electronic camera, such as a digital camera, a video camera, a broadcast camera, a motion-picture camera, or a surveillance camera.

Either one of Examples 1 to 3 of JP2015-52781A, Example 6 of JP2015-94869A, Example 4 of JP2011-39401A, and Example 6 of JP2013-221977A discloses a lens system composed of, in order from an object side, at least two movable lens groups including a first lens group fixed relative to an image surface during zooming and having a positive refractive power, and a second lens group having a negative refractive power; and a final lens group arranged on the most image side and fixed relative to the image surface during zooming.

SUMMARY OF THE INVENTION

However, with the lens in each of Examples 1 and 3 of JP2015-52781A, it is difficult to sufficiently reduce both spherical aberration on a telephoto side and variation in field curvature during zooming. With the lens in Example 2, the amount of spherical aberration on the telephoto side is not sufficiently small.

With the lens in each of Example 6 of JP2015-94869A and Example 4 of JP2011-39401A, it is difficult to sufficiently reduce both spherical aberration on the telephoto side and variation in field curvature during zooming.

Moreover, the lens in Example 6 of JP2013-221977A does not have high magnification.

The invention is made in light of the situations, and it is an object of the invention to provide a high-performance zoom lens which has high magnification, and whose aberrations have been properly corrected; and an imaging apparatus including the zoom lens.

A zoom lens according to an aspect of the invention consists of, in order from an object side, a first lens group fixed relative to the image surface during zooming and having the positive refractive power, at least two movable lens groups including a second lens group being adjacent to the first lens group and having a negative refractive power, the at least two movable lens groups being movable by changing a distance in an optical-axis direction to an adjacent group during zooming; and a final lens group arranged on the most image side and fixed relative to the image surface during zooming, the first lens group has, continuously in order from the most object side, a first negative lens having a concave surface facing an image side, a second negative lens, and a third positive lens, and the following conditional expressions (1), (2), and (3) are satisfied $$-0.8 < (L1ar + L1bf)/(L1ar - L1bf) < -0.03 \quad (1),$$

$$0.04 < d2/tt1 < 0.13 \quad (2), \text{ and}$$

$$-10 < f1/f2 < -3 \quad (3),$$

where $L1ar$ is a curvature radius of a surface on the image side of the first negative lens, $L1bf$ is a curvature radius of a surface on the object side of the second negative lens, $d2$ is a distance between the first negative lens and the second negative lens, $tt1$ is a length on an optical axis of the first lens group, $f1$ is a focal length for a d-line of the first lens group, and $f2$ is a focal length for the d-line of the second lens group.

The following conditional expression (1-1), conditional expression (2-1), and conditional expression (3-1), and/or conditional expression (3-2) are preferably satisfied $$-0.41 < (L1ar + L1bf)/(L1ar - L1bf) < -0.04 \quad (1-1),$$

$$0.06 < d2/tt1 < 0.12 \quad (2-1), \text{ and}$$

$$-5.5 < f1/f2 < -3 \quad (3-1), \text{ and/or}$$

$$-4.6 < f1/f2 < -3.5 \quad (3-2).$$

With the zoom lens according to the invention, the first lens group preferably consists of, in order from the object side, a 1a lens group fixed relative to the image surface during focusing and having a negative refractive power, a 1b lens group being movable along the optical axis during focusing and having a positive refractive power, and a 1c lens group fixed relative to the image surface during focusing and having a positive refractive power; and the 1a lens group preferably consists of three lenses.

When the first lens group consists of the 1a lens group, the 1b lens group, and the 1c lens group, the following conditional expression (4) is preferably satisfied, and the following conditional expression (4-1) is further preferably satisfied $$-0.65 < f1/f1a < -0.5 \quad (4), \text{ and}$$

$$-0.63 < f1/f1a < -0.52 \quad (4-1),$$

where $f1$ is the focal length for the d-line of the first lens group, and $f1a$ is a focal length for the d-line of the 1a lens group.

When the first lens group consists of the 1a lens group, the 1b lens group, and the 1c lens group, the following conditional expression (5) is preferably satisfied, and the following conditional expression (5-1) is further preferably satisfied $$-0.4 < f1/f1ab < -0.2 \quad (5), \text{ and}$$

$$-0.36 < f1/f1ab < -0.21 \quad (5-1),$$

where $f1$ is the focal length for the d-line of the first lens group, and f1$ab$ is a composite focal length for the d-line of the 1a lens group and the 1b lens group.

When the first lens group consists of the 1a lens group, the 1b lens group, and the 1c lens group, the following conditional expression (6) is preferably satisfied, and the following conditional expression (6-1) is further preferably satisfied $$75 < f1c\_vd\_ave < 95.2 \quad (6), \text{ and}$$

$$78 < f1c\_vd\_ave < 95.2 \quad (6\text{-}1),$$

where f1$c$_vd_ave is an average value of Abbe numbers for the d-line of positive lenses included in the 1c lens group.

When the first lens group consists of the 1a lens group, the 1b lens group, and the 1c lens group, the following conditional expression (7) is preferably satisfied, and the following conditional expression (7-1) is further preferably satisfied $$0.95 < f1/f1c < 1.15 \quad (7), \text{ and}$$

$$1 < f1/f1c < 1.1 \quad (7\text{-}1),$$

where f1 is the focal length for the d-line of the first lens group, and f1$c$ is a focal length for the d-line of the 1c lens group.

The following conditional expression (8) is preferably satisfied, and the following conditional expression (8-1) is further preferably satisfied $$15 < (L1avd + L1bvd)/2 - L1cvd < 29 \quad (8), \text{ and}$$

$$18 < (L1avd + L1bvd)/2 - L1cvd < 26 \quad (8\text{-}1),$$

where

L1$a$vd is an Abbe number for the d-line of the first negative lens,

L1$b$vd is an Abbe number for the d-line of the second negative lens, and

L1$c$vd is an Abbe number for the d-line of the third positive lens.

The following conditional expression (9) is preferably satisfied, and the following conditional expression (9-1) is further preferably satisfied $$-0.3 < (L1br - L1cf)/(L1br + L1cf) < 0.5 \quad (9), \text{ and}$$

$$-0.06 < (L1br - L1cf)/(L1br + L1cf) < 0.35 \quad (9\text{-}1),$$

where

L1$br$ is a curvature radius of a surface on the image side of the second negative lens, and L1$cf$ is a curvature radius of a surface on the object side of the third positive lens.

The zoom lens according to the invention preferably consists of, in order from the object side, the first lens group fixed relative to the image surface during zooming and having the positive refractive power, the second lens group being movable during zooming and having the negative refractive power, a third lens group being movable during zooming and having a positive refractive power, a fourth lens group being movable during zooming and having a positive refractive power, and a fifth lens group fixed relative to the image surface during zooming and having a positive refractive power.

When the zoom lens consists of the first lens group to the fifth lens group, during zooming from a wide angle end to a telephoto end, the third lens group preferably constantly moves toward the object side so that a 3-4 composite lens group composed of the third lens group and the fourth lens group, and the second lens group simultaneously pass through respective points at which imaging magnifications of the 3-4 composite lens group and the second lens group are −1.

Also, when the zoom lens consists of the first lens group to the fifth lens group, during zooming from the wide angle end to the telephoto end, a distance between the third lens group and the fourth lens group preferably decreases, increases, and then decreases.

An imaging apparatus according to the invention includes the above-described zoom lens according to the invention.

The aforementioned expression "consist of . . . " implies that a lens having no power; optical elements other than a lens, such as a diaphragm, a mask, a cover glass, and a filter; a lens flange; a lens barrel; an imaging element; a mechanism part such as a camera shake correction mechanism; and so forth, may be included in addition to those described as the components.

The sign of the refractive power of any of the aforementioned lens groups, the sign of the refractive power of any of the aforementioned lenses, and the surface shape of any of the lenses are considered in a paraxial region as far as an aspherical surface is included. All the aforementioned conditional expressions use the d-line (wavelength of 587.6 nm) as the reference and use values in focus at infinity unless otherwise noted.

A zoom lens according to the invention consists of, in order from an object side, at least two movable lens groups including a first lens group fixed relative to an image surface during zooming and having a positive refractive power, and a second lens group being adjacent to the first lens group and having a negative refractive power, the two movable lens groups being movable by changing a distance in an optical-axis direction to an adjacent group during zooming; and a final lens group arranged on the most image side and fixed relative to the image surface during zooming, the first lens group has, continuously in order from the most object side, a first negative lens having a concave surface facing an image side, a second negative lens, and a third positive lens, and the following conditional expressions (1), (2), and (3) are satisfied. Thus, the zoom lens can be a high-performance zoom lens which has high magnification, and whose aberrations have been properly corrected.

$$-0.8 < (L1ar + L1bf)/(L1ar - L1bf) < -0.03 \quad (1),$$

$$0.04 < d2/tt1 < 0.13 \quad (2), \text{ and}$$

$$-10 < f1/f2 < -3 \quad (3).$$

An imaging apparatus according to the invention includes the zoom lens according to the invention, and thus an image with high magnification and high image quality can be obtained.

DESCRIPTION OF THE PREFERRED EMBODIMENTS

Figure 1:
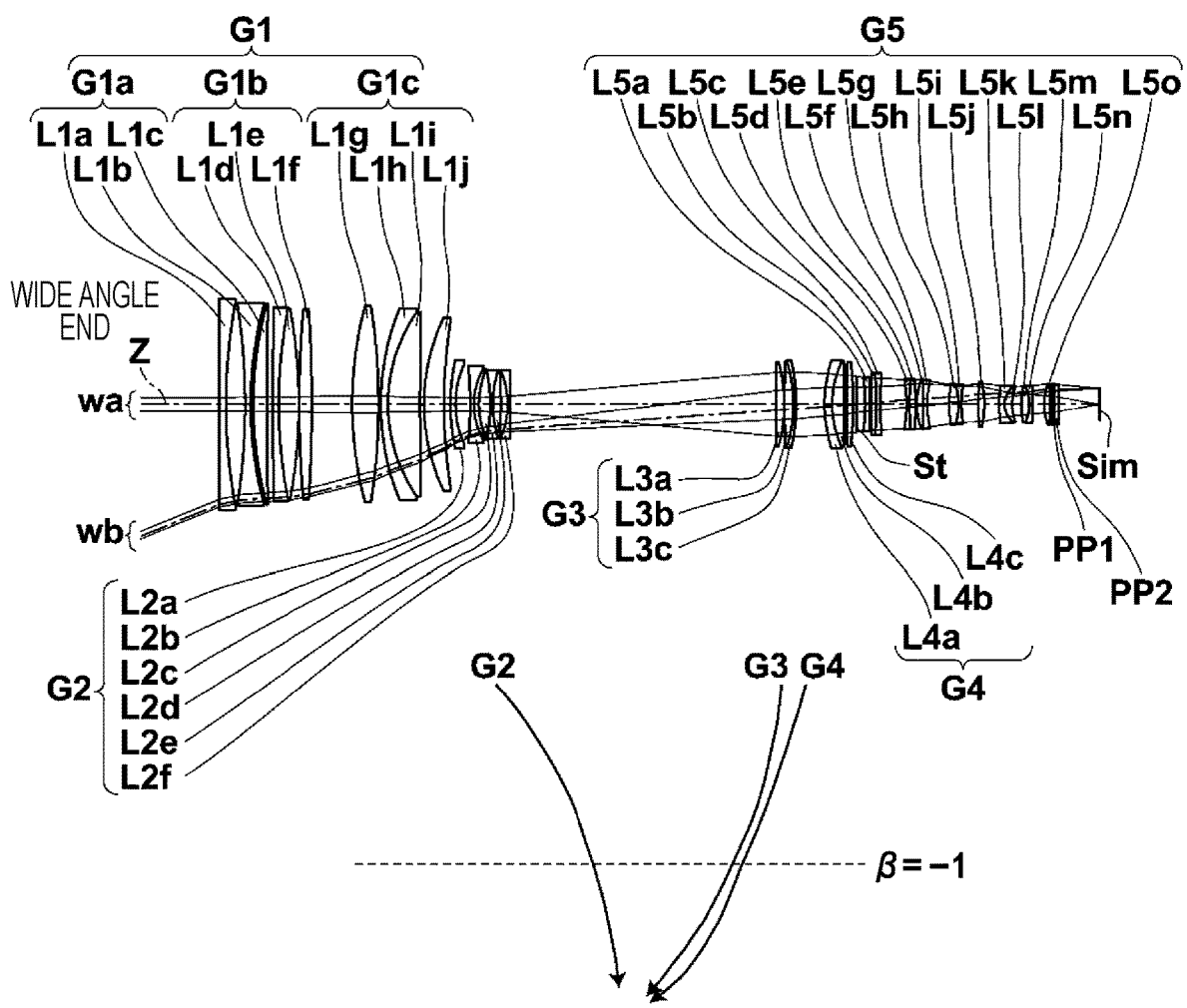
FIG. 1 provides cross-sectional views illustrating a lens configuration of a zoom lens according to an embodiment (common to Example 1) of the invention.
Figure 1:
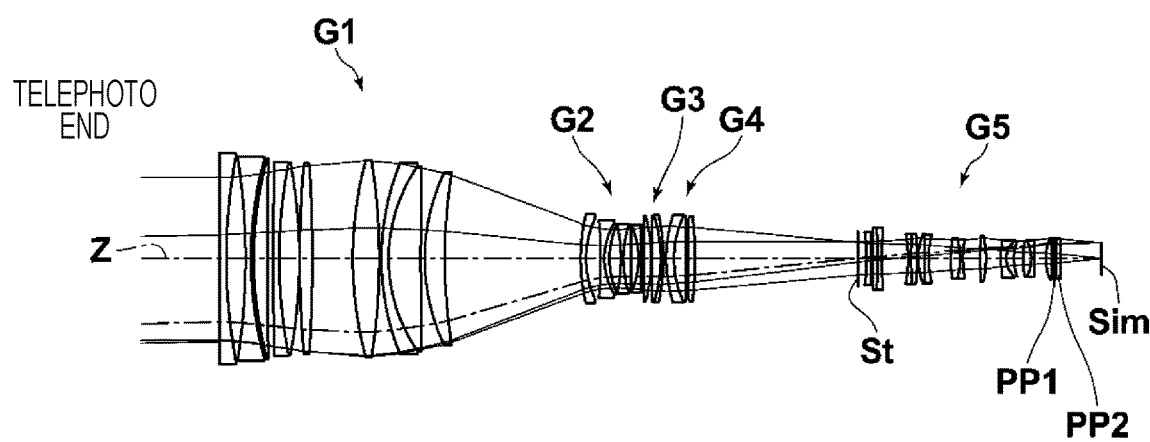

An embodiment of the invention is described below in detail with reference to the drawings. FIG. 1 provides cross-sectional views illustrating a lens configuration of a zoom lens according to an embodiment of the invention. A configuration example illustrated in FIG. 1 is common to the configuration of a zoom lens according to Example 1 which will be described later. In FIG. 1, the left side is an object side and the right side is an image side. An illustrated aperture diaphragm St does not necessarily indicate the size or shape, but indicates the position on an optical axis Z. FIG. 1 also illustrates an arrow indicative of a movement locus of each lens group during zooming from a wide angle end to a telephoto end, a point at which an imaging magnification is −1 (a horizontal dotted line with β=−1 in the drawing), axial rays wa, and rays wb at the maximum angle of view.

A zoom lens according to this embodiment is composed of, in order from an object side, a first lens group G1 fixed relative to the image surface during zooming and having the positive refractive power, at least two movable lens groups including a second lens group G2 being adjacent to the first lens group G1 and having a negative refractive power, the at least two movable lens groups being movable by changing a distance in an optical-axis direction to an adjacent group during zooming; and a final lens group arranged on the most image side and fixed relative to the image surface Sim during zooming (with a zoom lens according to this embodiment illustrated in FIG. 1, a fifth lens group G5 corresponds to the final lens group).

When the zoom lens is applied to an imaging apparatus, it is preferable to arrange a cover glass, a prism, and/or any of various filters, such as an infrared cut filter or a low pass filter, between the optical system and the image surface Sim in accordance with a camera configuration on which the lens is mounted. Thus, FIG. 1 illustrates an example in which parallel-plane-shaped optical members PP1 and PP2 that expect the above-listed components are arranged between the lens system and the image surface Sim.

The first lens group G1 has, continuously in order from the most object side, a first negative lens L1a having a concave surface facing the image side, a second negative lens L1b, and a third positive lens L1c.

With this configuration, the angle of chief rays at a peripheral angle of view incident on lenses of the third positive lens L1c and later can be decreased, and occurrence of astigmatism due to the lenses of the third positive lens L1c and later can be reduced. Also, since the negative lens on the most object side of the first lens group G1 is composed of the two lenses, the negative power can be distributed into the two lenses. Thus, occurrence of spherical aberration can be suppressed.

Further, the following conditional expressions (1), (2), and (3) are satisfied. As long as the conditional expression (1) is satisfied, variation in field curvature during zooming can be reduced, and further spherical aberration on a telephoto side can be accommodated within a proper range. As long as below the upper limit of the conditional expression (2), spherical aberration on the telephoto side can be reduced. As long as above the lower limit of the conditional expression (2), a sufficient negative power can be given to an air lens that is formed between the first negative lens L1a and the second negative lens L1b, and hence spherical aberration on the telephoto side can be reduced. As long as below the upper limit of the conditional expression (3), high magnification can be obtained. As long as above the lower limit of the conditional expression (3), variation in spherical aberration, astigmatism, and distortion during zooming can be suppressed.

$$-0.8 < (L1ar + L1bf)/(L1ar - L1bf) < -0.03 \qquad (1),$$

$$0.04 < d2/tt1 < 0.13 \qquad (2), \text{ and}$$

$$-10 < f1/f2 < -3 \qquad (3),$$

where

L1ar is a curvature radius of a surface on the image side of the first negative lens, L1bf is a curvature radius of a surface on the object side of the second negative lens, d2 is a distance between the first negative lens and the second negative lens, tt1 is a length on the optical axis of the first lens group, f1 is a focal length for a d-line of the first lens group, and f2 is a focal length for the d-line of the second lens group.

If the following conditional expression (1-1), conditional expression (2-1), and conditional expression (3-1), and/or conditional expression (3-2) are satisfied, further proper characteristics can be obtained.

$$-0.41 < (L1ar + L1bf)/(L1ar - L1bf) < -0.04 \quad (1\text{-}1),$$

$$0.06 < d2/tt1 < 0.12 \quad (2\text{-}1), \text{ and}$$

$$-5.5 < f1/f2 < -3 \quad (3\text{-}1), \text{ and/or}$$

$$-4.6 < f1/f2 < -3.5 \quad (3\text{-}2).$$

With the zoom lens according to this embodiment, the first lens group G1 preferably consists of, in order from the object side, a 1a lens group G1a fixed relative to the image surface Sim during focusing and having a negative refractive power, a 1b lens group G1b being movable along the optical axis during focusing and having a positive refractive power, and a 1c lens group G1c fixed relative to the image surface Sim during focusing and having a positive refractive power; and the 1a lens group G1a preferably consists of three lenses.

Since the first lens group G1 is configured as described above, variation in spherical aberration on the telephoto side during focusing can be reduced. Also, since the number of lenses of the 1a lens group G1a is no more than three, an increase in length in the optical-axis direction of the 1a lens group G1a can be suppressed, and an increase in effective diameter of the first negative lens L1a can be suppressed.

When the first lens group G1 consists of the 1a lens group G1a, the 1b lens group G1b, and the 1c lens group G1c, the following conditional expression (4) is preferably satisfied. When rays at the maximum angle of view pass through the 1a lens group G1a during focusing from infinity to a short range, the height of passing rays is low and variation in distortion likely occurs. However, if the conditional expression (4) is satisfied, the variation in distortion at the maximum angle of view at the wide angle end during focusing can be suppressed. If the following conditional expression (4-1) is satisfied, further proper characteristics can be obtained.

$$-0.65 < f1/f1a < -0.5 \quad (4), \text{ and}$$

$$-0.63 < f1/f1a < -0.52 \quad (4\text{-}1),$$

where f1 is the focal length for the d-line of the first lens group, and f1a is a focal length for the d-line of the 1a lens group.

When the first lens group G1 consists of the 1a lens group G1a, the 1b lens group G1b, and the 1c lens group G1c, the following conditional expression (5) is preferably satisfied. As long as below the upper limit of the conditional expression (5), variation in angle of view of an intermediate angle of view (about 60%) at the wide angle end during focusing can be suppressed. As long as above the lower limit of the conditional expression (5), variation in distortion at the maximum angle of view at the wide angle end during focusing can be suppressed. If the following conditional expression (5-1) is satisfied, further proper characteristics can be obtained.

$$-0.4 < f1/f1ab < -0.2 \quad (5), \text{ and}$$

$$-0.36 < f1/f1ab < -0.21 \quad (5\text{-}1),$$

where f1 is the focal length for the d-line of the first lens group, and f1ab is a composite focal length for the d-line of the 1a lens group and the 1b lens group.

When the first lens group G1 consists of the 1a lens group G1a, the 1b lens group G1b, and the 1c lens group G1c, the following conditional expression (6) is preferably satisfied. As long as below the upper limit of the conditional expression (6), a lens material with a relatively high refractive index can be used, and hence spherical aberration on the telephoto side can be reduced. As long as above the lower limit of the conditional expression (6), axial chromatic aberration on the telephoto side can be reduced. If the following conditional expression (6-1) is satisfied, further proper characteristics can be obtained.

$$75 < f1c\_vd\_ave < 95.2 \quad (6), \text{ and}$$

$$78 < f1c\_vd\_ave < 95.2 \quad (6\text{-}1),$$

where f1c_vd_ave is an average value of Abbe numbers for the d-line of positive lenses included in the 1c lens group.

When the first lens group G1 consists of the 1a lens group G1a, the 1b lens group G1b, and the 1c lens group G1c, the following conditional expression (7) is preferably satisfied. As long as below the upper limit of the conditional expression (7), spherical aberration on the telephoto side can be reduced. As long as above the lower limit of the conditional expression (7), variation in angle of view of the intermediate angle of view (about 60%) at the wide angle end during focusing can be suppressed. If the following conditional expression (7-1) is satisfied, further proper characteristics can be obtained.

$$0.95 < f1/f1c < 1.15 \quad (7), \text{ and}$$

$$1 < f1/f1c < 1.1 \quad (7\text{-}1),$$

where f1 is the focal length for the d-line of the first lens group, and f1c is a focal length for the d-line of the 1c lens group.

The following conditional expression (8) is preferably satisfied. As long as below the upper limit of the conditional expression (8), occurrence of 1st order axial chromatic aberration on the telephoto side can be suppressed. As long as above the lower limit of the conditional expression (8), a combination of lens materials can be more easily selected so that the partial dispersion ratio of the third positive lens L1c is larger than the partial dispersion ratios of the first negative lens L1a and/or the second negative lens L1b. Thus, 2nd order axial chromatic aberration on the telephoto side can be more easily reduced. If the following conditional expression (8-1) is satisfied, further proper characteristics can be obtained.

$$15 < (L1avd + L1bvd)/2 - L1cvd < 29 \quad (8), \text{ and}$$

$$18 < (L1avd + L1bvd)/2 - L1cvd < 26 \quad (8\text{-}1),$$

where

L1avd is an Abbe number for the d-line of the first negative lens,

L1bvd is an Abbe number for the d-line of the second negative lens, and

L1cvd is an Abbe number for the d-line of the third positive lens.

The following conditional expression (9) is preferably satisfied. As long as below the upper limit of the conditional expression (9), occurrence of 5th order or higher spherical aberration on the telephoto side can be suppressed. As long as above the lower limit of the conditional expression (9), occurrence of 3rd order spherical aberration on the telephoto side can be suppressed. If the following conditional expression (9-1) is satisfied, further proper characteristics can be obtained.

$$-0.3 < (L1br - L1cf)/(L1br + L1cf) < 0.5 \quad (9), \text{ and}$$

$$-0.06 < (L1br - L1cf)/(L1br + L1cf) < 0.35 \quad (9\text{-}1),$$

where

L1br is a curvature radius of a surface on the image side of the second negative lens, and L1cf is a curvature radius of a surface on the object side of the third positive lens.

The zoom lens according to this embodiment preferably consists of, in order from the object side, the first lens group G1 fixed relative to the image surface Sim during zooming and having the positive refractive power, the second lens group G2 being movable during zooming and having the negative refractive power, a third lens group G3 being movable during zooming and having a positive refractive power, a fourth lens group G4 being movable during zooming and having a positive refractive power, and a fifth lens group G5 fixed relative to the image surface Sim during zooming and having a positive refractive power. With this configuration, by independently moving the third lens group G3 and the fourth lens group G4, high magnification can be obtained and variation in field curvature during zooming can be suppressed.

When the zoom lens consists of the first lens group G1 to the fifth lens group G5 as described above, during zooming from the wide angle end to the telephoto end, the third lens group G3 preferably constantly moves toward the object side so that a 3-4 composite lens group composed of the third lens group G3 and the fourth lens group G4, and the second lens group G2 simultaneously pass through respective points at which imaging magnifications of the 3-4 composite lens group and the second lens group G2 are −1. With this configuration, the third lens group G3 does not return to the image side and a large zoom ratio can be obtained during zooming from the wide angle end to the telephoto end.

Also, when the zoom lens consists of the first lens group G1 to the fifth lens group G5, during zooming from the wide angle end to the telephoto end, a distance between the third lens group G3 and the fourth lens group G4 preferably decreases, increases, and then decreases. With this configuration, a variation in field curvature at an intermediate focal length can be suppressed.

While FIG. 1 illustrates the example in which the optical members PP1 and PP2 are arranged between the lens system and the image surface Sim, instead of arranging any of various filters, such as a low pass filter or one that cuts a specific wavelength range between the lens system and the image surface Sim, such various filters may be arranged between respective lenses, or a lens surface of any of the lenses may be treated with a coating having an effect similar to those of the various filters.

Next, numerical examples of the zoom lens according to the invention are described.

A zoom lens according to Example 1 is described first. FIG. 1 provides cross-sectional views illustrating a lens configuration of the zoom lens according to Example 1. In FIG. 1, and FIGS. 2 to 11 corresponding to Examples 2 to 11, the left side is an object side and the right side is an image side. An illustrated aperture diaphragm St does not necessarily indicate the size or shape, but indicates the position on an optical axis Z. FIG. 1 also illustrates an arrow indicative of a movement locus of each lens group during zooming from a wide angle end to a telephoto end, a point at which an imaging magnification is −1 (a horizontal dotted line with β=−1 in the drawing), axial rays wa, and rays wb at the maximum angle of view.

The zoom lens according to Example 1 is composed of, in order from the object side, a first lens G1 consisting of ten lenses of a lens L1a to a lens L1j and entirely having a positive refractive power, a second lens group G2 consisting of six lenses of a lens L2a to a lens L2f and entirely having a negative refractive power, a third lens group G3 consisting of three lenses of a lens L3a to a lens L3c and entirely having a positive refractive power, a fourth lens group G4 consisting of three lenses of a lens L4a to a lens L4c and entirely having a positive refractive power, and a fifth lens group G5 consisting of fifteen lenses of a lens L5a to a lens L5o and entirely having a positive refractive power.

The first lens group G1 is composed of a 1a lens group G1a consisting of three lenses of the lens L1a to the lens L1c, a 1b lens group G1b consisting of three lenses of the lens L1d to the lens L1f, and a 1c lens group G1c consisting of four lenses of the lens L1g to the lens L1j.

Table 1 shows basic lens data of the zoom lens according to Example 1, Table 2 shows data relating to specifications, Table 3 shows data relating to surface distances that change during zooming, and Table 4 shows data relating to aspherical coefficients. The meaning of reference signs in the table are exemplarily described below according to Example 1, and reference signs according to Examples 2 to 11 are basically similar to those according to Example 1.

In the lens data in Table 1, the column of surface number indicates surface numbers that sequentially increase toward the image side while a surface of a component on the most object side is counted as the first surface, the column of curvature radius indicates a curvature radius of each surface, and the column of surface distance indicates a distance between each surface and a surface next thereto on the optical axis Z. Also, the column of nd indicates a refractive index for the d-line (wavelength of 587.6 nm) of each optical element, the column of vd indicates an Abbe number for the d-line (wavelength of 587.6 nm) of each optical element, and the column of θgF indicates a partial dispersion ratio of each optical element.

The partial dispersion ratio θgF is expressed by the following expression $$\theta gF = (ng - nF)/(nF - nC)$$

where ng is a refractive index for a g-line, nF is a refractive index for an F-line, and nC is a refractive index for a C-line.

In this case, the sign of the curvature radius is positive when the surface shape is convex on the object side, and negative when the surface shape is convex on the image side. The basic lens data includes the aperture diaphragm St and the optical members PP1 and PP2. A word "diaphragm" together with the surface number thereof is written in a cell of a surface corresponding to the aperture diaphragm St in the column of surface number. In the lens data in Table 1, DD [surface number] is written in a cell of the column of surface distance if the distance changes during zooming. The numerical value corresponding to DD [surface number] is shown in Table 3.

For data relating to specifications in Table 2, values of zoom magnification, focal length f', F-number FNo., and total angle of view 2ω are shown.

In the basic lens data, data relating to specifications, and data relating to surface distances that change, the unit of angle is degree, and the unit of length is millimeter; however, since the optical system can be used although the optical system is proportionally expanded or proportionally contracted, other suitable units may be used.

In the lens data in Table 1, an asterisk * is added to a surface number of an aspherical surface, and a numerical value of a paraxial curvature radius is indicated as a curvature radius of the aspherical surface. The data relating to aspherical coefficients in Table 4 indicates a surface number of an aspherical surface, and an aspherical coefficient relating to the aspherical surface. A numerical value "E±n" (n is an integer) of an aspherical coefficient represents "×10$^{\pm n}$." The aspherical coefficient is a value of each of coefficients KA, Am (m=3 . . . 16) expressed by the following aspherical surface expression $$Zd = C \cdot h^2 / \{1 + (1 - KA \cdot C^2 \cdot h^2)^{1/2}\} + \Sigma Am \cdot h^m$$

where

Zd is an aspherical surface depth (a length of a perpendicular line extending from a point on an aspherical surface at a height h to a plane perpendicular to the optical axis with which the vertex of the aspherical surface comes into contact), h is a height (a distance from the optical axis), C is a reciprocal of a paraxial curvature radius, and KA, Am each are an aspherical coefficient (m=3 . . . 16).

TABLE 1

Example 1, lens data (nd, vd for d-line)

| Surface number | Curvature radius | Surface distance | nd | vd | θgF |
|---|---|---|---|---|---|
| 1 | −13378.35006 | 5.977 | 1.77250 | 49.60 | 0.55212 |
| 2 | 506.33763 | 16.475 | | | |
| 3 | −584.49773 | 4.800 | 1.80400 | 46.58 | 0.55730 |
| 4 | 335.43813 | 2.500 | | | |
| 5 | 349.09925 | 12.000 | 1.84139 | 24.56 | 0.61274 |
| 6 | 8435.34081 | 4.877 | | | |
| 7 | 7849.07545 | 5.000 | 1.80000 | 29.84 | 0.60178 |
| 8 | 439.82608 | 18.270 | 1.49700 | 81.54 | 0.53748 |
| 9 | −444.99046 | 0.125 | | | |
| 10 | 1000.00000 | 10.877 | 1.63246 | 63.77 | 0.54215 |
| 11 | −1249.86489 | 34.999 | | | |
| 12 | 336.67292 | 23.000 | 1.43387 | 95.18 | 0.53733 |
| 13 | −555.44540 | 1.838 | | | |
| 14 | 224.29284 | 6.264 | 1.63980 | 34.47 | 0.59233 |
| 15 | 143.35462 | 28.031 | 1.43875 | 94.94 | 0.53433 |
| 16 | 8626.60879 | 3.144 | | | |
| 17 | 176.57760 | 17.500 | 1.49700 | 81.54 | 0.53748 |
| 18 | 475.02631 | DD [18] | | | |
| 19 | 182.61414 | 4.500 | 1.95375 | 32.32 | 0.59015 |
| 20 | 86.38802 | 12.791 | | | |
| 21 | −331.30207 | 3.073 | 1.55032 | 75.50 | 0.54001 |
| 22 | 61.69495 | 4.501 | 1.54814 | 45.78 | 0.56859 |
| 23 | 78.10163 | 9.831 | | | |
| 24 | −145.36707 | 2.145 | 1.49700 | 81.54 | 0.53748 |
| 25 | 96.62937 | 7.000 | 1.84139 | 24.56 | 0.61274 |
| 26 | −687.33596 | 5.926 | | | |
| 27 | −76.16819 | 2.130 | 1.43875 | 94.94 | 0.53433 |
| 28 | 1644.59414 | DD [28] | | | |

TABLE 1-continued

Example 1, lens data (nd, vd for d-line)

| Surface number | Curvature radius | Surface distance | nd | vd | θgF |
|---|---|---|---|---|---|
| 29 | 4104.02749 | 7.091 | 1.43875 | 94.66 | 0.53402 |
| 30 | −137.72084 | 0.177 | | | |
| 31 | 2020.97885 | 7.824 | 1.43875 | 94.66 | 0.53402 |
| 32 | −125.76283 | 2.257 | 1.94692 | 32.77 | 0.58862 |
| 33 | −185.59421 | DD [33] | | | |
| 34 | 124.45199 | 6.891 | 1.80390 | 32.49 | 0.59305 |
| 35 | 90.80287 | 10.021 | 1.43875 | 94.66 | 0.53402 |
| 36 | −49972.97817 | 2.118 | | | |
| 37 | 817.29840 | 6.060 | 1.43875 | 94.66 | 0.53402 |
| *38 | −343.72331 | DD [38] | | | |
| 39 (diaphragm) | ∞ | 7.705 | | | |
| 40 | −170.68031 | 4.420 | 1.51793 | 61.26 | 0.54257 |
| 41 | 1424.66641 | 1.393 | | | |
| 42 | 854.58215 | 4.351 | 1.84139 | 24.56 | 0.61274 |
| 43 | −298.35856 | 3.656 | 1.83481 | 42.72 | 0.56486 |
| 44 | 408.16101 | 22.581 | | | |
| 45 | −124.70799 | 2.963 | 1.63723 | 35.15 | 0.58660 |
| 46 | 545.65832 | 5.104 | 1.84139 | 24.56 | 0.61274 |
| 47 | −188.00072 | 0.570 | | | |
| 48 | 59.62634 | 5.814 | 1.73532 | 53.96 | 0.54449 |
| 49 | 1199.51213 | 3.520 | 1.72395 | 29.02 | 0.60094 |
| 50 | 86.05183 | 19.251 | | | |
| 51 | 144.47442 | 7.880 | 1.74356 | 40.77 | 0.57416 |
| 52 | −63.44339 | 2.500 | 1.92486 | 36.38 | 0.57719 |
| 53 | 99.00655 | 14.855 | | | |
| 54 | 342.36858 | 5.042 | 1.84139 | 24.56 | 0.61274 |
| 55 | −97.66651 | 13.086 | | | |
| 56 | 222.75255 | 4.531 | 1.52189 | 50.90 | 0.55751 |
| 57 | 21.13645 | 6.601 | 1.49700 | 81.54 | 0.53748 |
| 58 | 48.14182 | 8.035 | | | |
| 59 | 95.08701 | 6.958 | 1.49700 | 81.54 | 0.53748 |
| 60 | −37.48307 | 2.876 | 1.95375 | 32.32 | 0.59015 |
| 61 | −260.67641 | 9.976 | | | |
| 62 | 55.91542 | 4.808 | 1.53515 | 57.90 | 0.54800 |
| 63 | −387.96848 | 2.000 | | | |
| 64 | ∞ | 1.500 | 1.51633 | 64.14 | 0.53531 |
| 65 | ∞ | 0.000 | | | |
| 66 | ∞ | 3.690 | 1.51633 | 64.14 | 0.53531 |
| 67 | ∞ | 35.589 | | | |

TABLE 2

Example 1, specifications (d-line)

| | Wide angle end | Intermediate position | Telephoto end |
|---|---|---|---|
| Zoom magnification | 1.0 | 3.8 | 19.8 |
| f' | 34.993 | 134.373 | 692.862 |
| FNo. | 2.85 | 2.85 | 4.85 |
| 2ω[°] | 44.8 | 11.8 | 2.4 |

TABLE 3

Example 1, zoom distance

| | Wide angle end | Intermediate position | Telephoto end |
|---|---|---|---|
| DD [18] | 5.430 | 85.787 | 118.419 |
| DD [28] | 231.414 | 131.867 | 2.255 |
| DD [33] | 24.452 | 5.861 | 2.307 |
| DD [38] | 2.654 | 40.435 | 140.970 |

TABLE 4

Example 1, aspherical coefficient

| Surface number | 38 |
|---|---|
| KA | −6.0660447E+00 |
| A3 | 0.0000000E+00 |
| A4 | −2.8516819E−09 |
| A5 | −3.7645381E−10 |
| A6 | 5.1922095E−11 |
| A7 | −1.9515833E−13 |
| A8 | 4.9687016E−14 |
| A9 | −1.0574536E−14 |
| A10 | 2.5263117E−17 |
| A11 | 2.5847685E−17 |
| A12 | −7.1492956E−19 |
| A13 | 3.0977491E−21 |
| A14 | −1.5830950E−22 |
| A15 | 9.3185221E−24 |
| A16 | −1.0801038E−25 |

Figure 12:
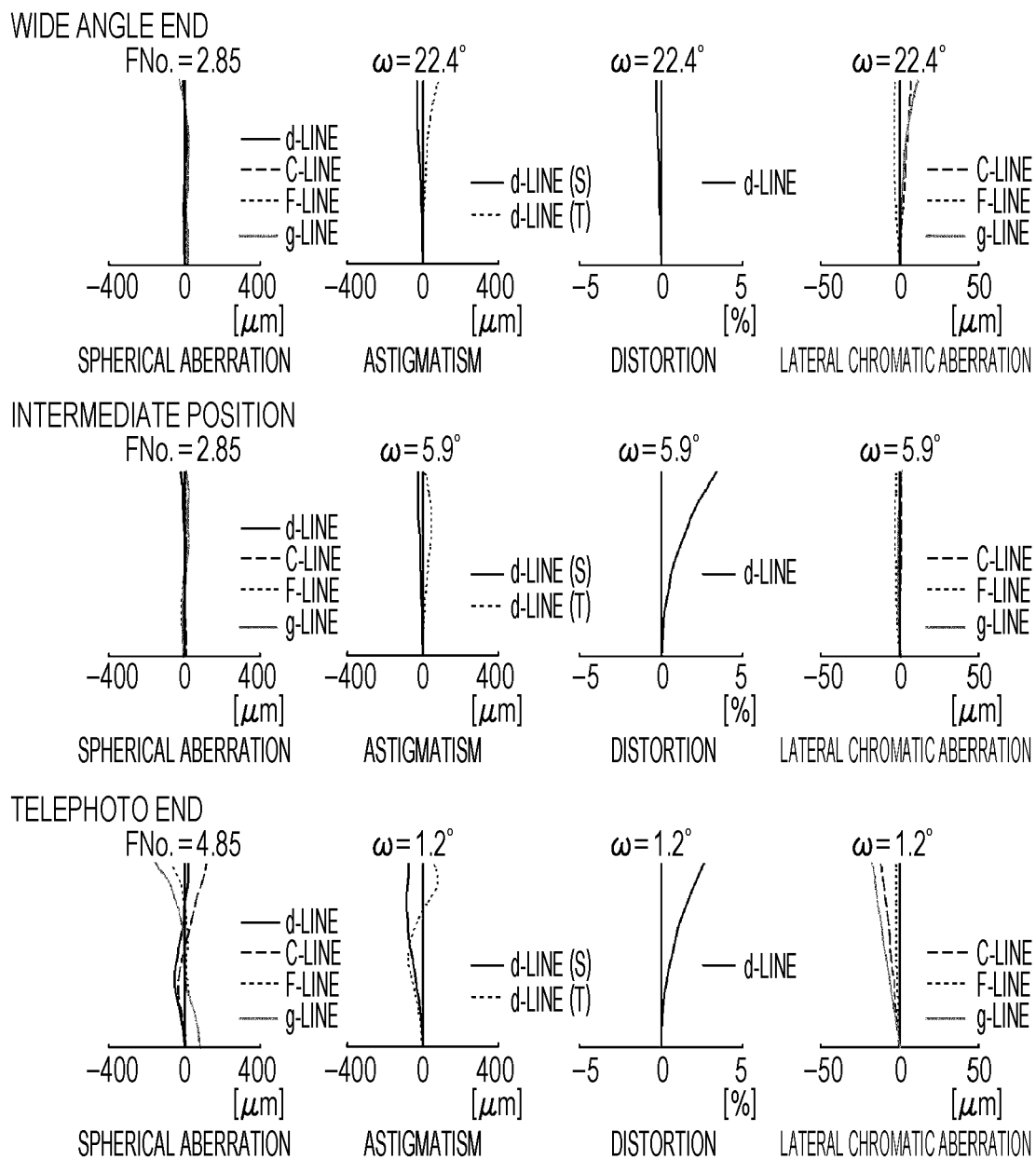
FIG. 12 provides aberration diagrams of the zoom lens according to Example 1 of the invention.

FIG. 12 provides aberration diagrams of the zoom lens according to Example 1. Spherical aberration, astigmatism, distortion, and lateral chromatic aberration at the wide angle end are shown in FIG. 12 in order from the left side in the upper section. Spherical aberration, astigmatism, distortion, and lateral chromatic aberration at an intermediate position are shown in FIG. 12 in order from the left side in the middle section. Spherical aberration, astigmatism, distortion, and lateral chromatic aberration at the telephoto end are shown in FIG. 12 in order from the left side in the lower section. The aberration diagrams show states when the object distance is infinity. The aberration diagrams showing spherical aberration, astigmatism, and distortion show aberrations using the d-line (wavelength of 587.6 nm) as the reference wavelength. The spherical aberration diagram shows aberrations for the d-line (wavelength of 587.6 nm), C-line (wavelength of 656.3 nm), F-line (wavelength of 486.1 nm), and g-line (wavelength of 435.8 nm) by respectively using solid line, long dotted line, short dotted line, and gray solid line. The astigmatism diagram shows aberrations in a sagittal direction and a tangential direction by respectively using solid line and short dotted line. The lateral chromatic aberration diagram shows aberrations for the C-line (wavelength of 656.3 nm), F-line (wavelength of 486.1 nm), and g-line (wavelength of 435.8 nm) by respectively using long dotted line, short dotted line, and gray solid line. Note that FNo. in the spherical aberration diagram indicates an F-number, and ω in the other aberration diagrams indicates a half angle of view.

Figure 2:
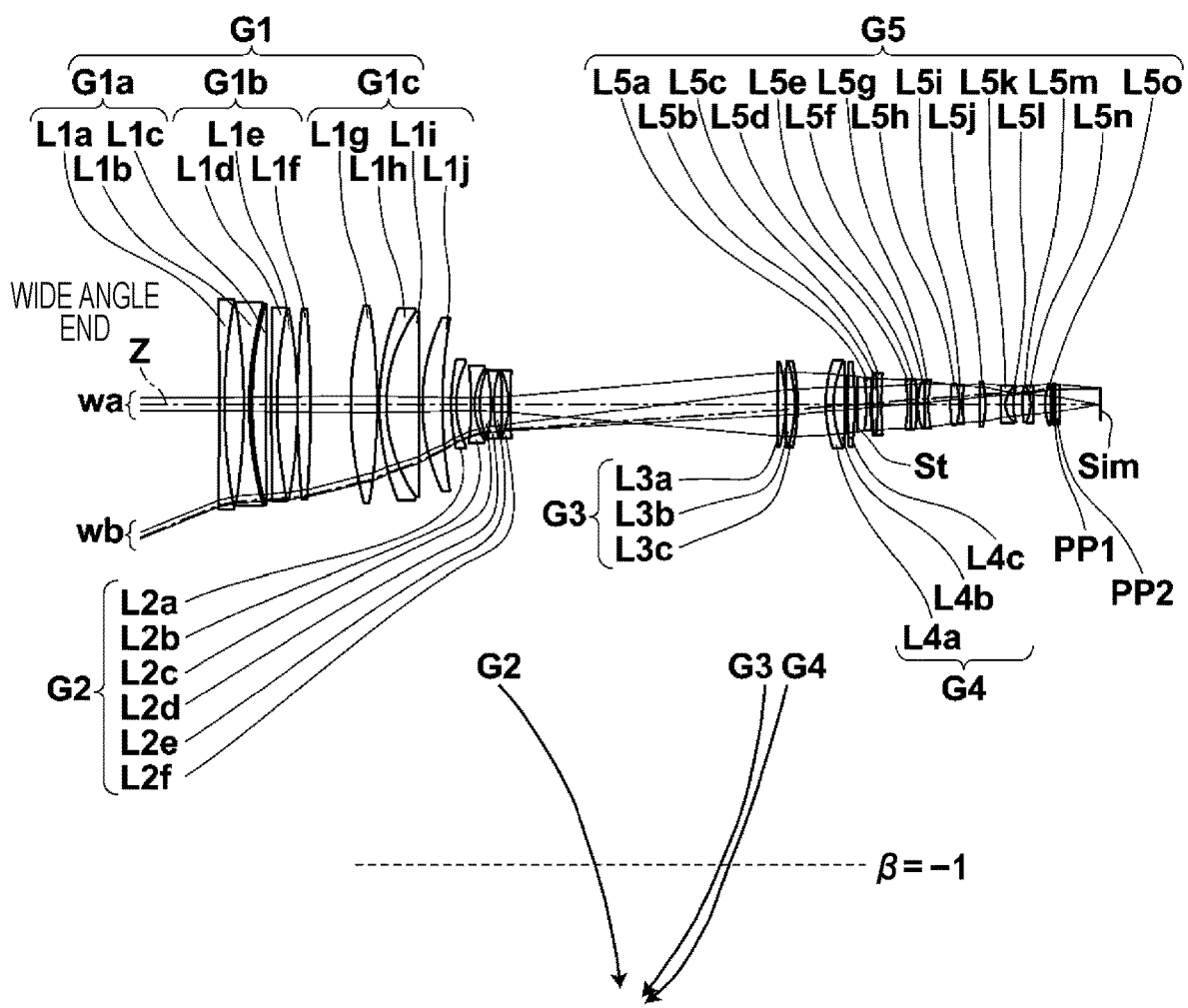
FIG. 2 provides cross-sectional views illustrating a lens configuration of a zoom lens according to Example 2 of the invention.
Figure 2:
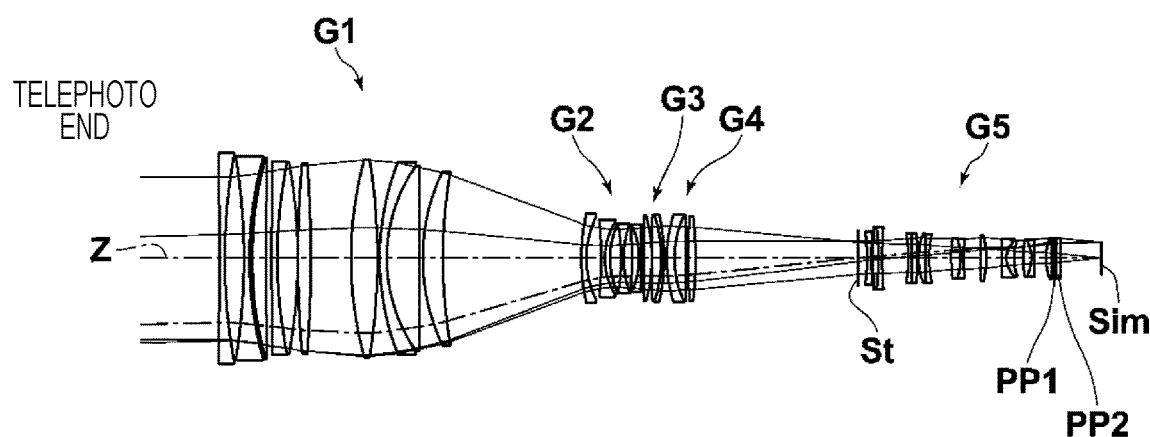
Figure 13:
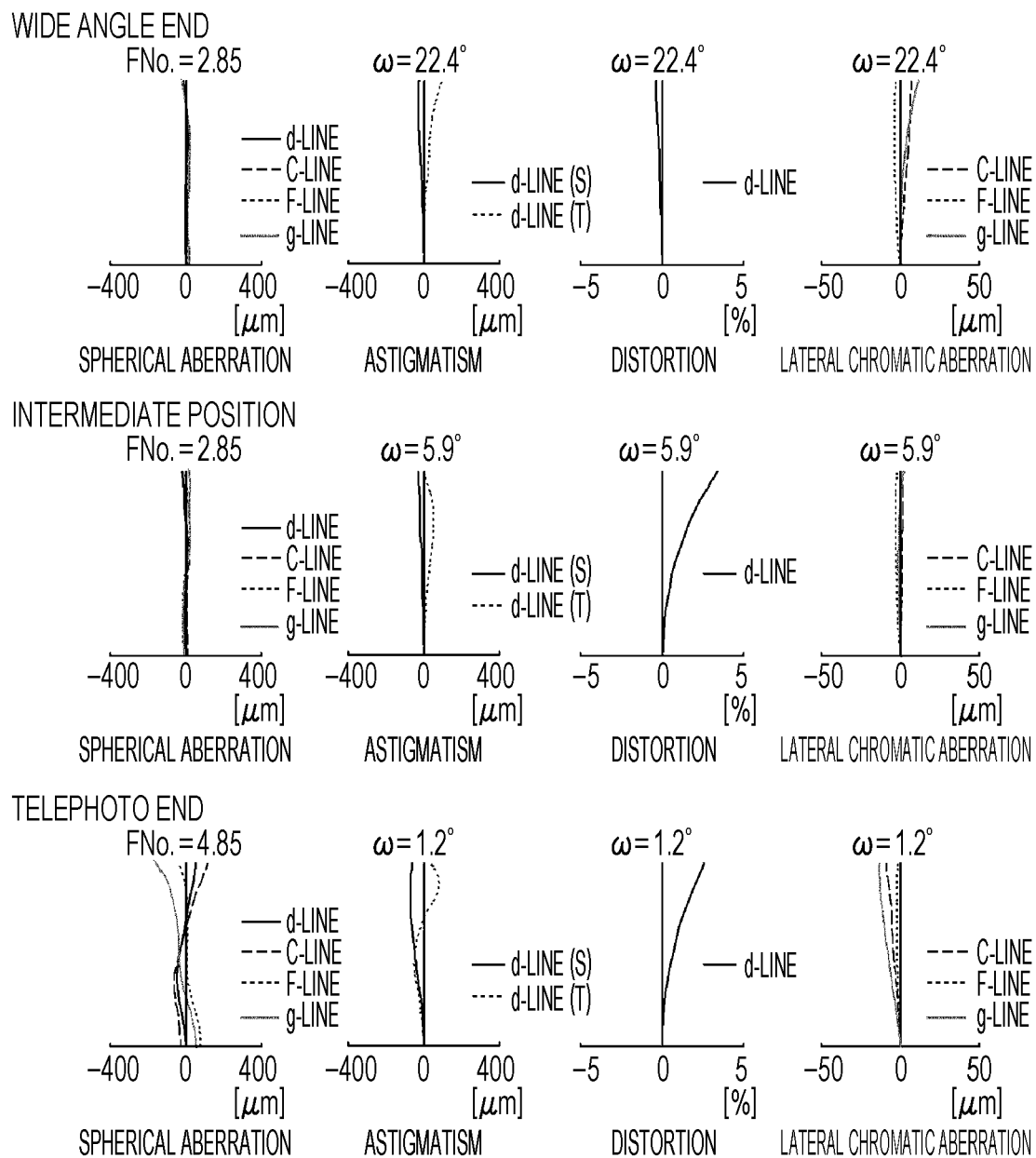
FIG. 13 provides aberration diagrams of the zoom lens according to Example 2 of the invention.

A zoom lens according to Example 2 is described next. FIG. 2 provides cross-sectional views illustrating a lens configuration of the zoom lens according to Example 2. The zoom lens according to Example 2 has the same lens number configuration as that of the zoom lens according to Example 1. Table 5 shows basic lens data of the zoom lens according to Example 2, Table 6 shows data relating to specifications, Table 7 shows data relating to surface distances that change, and Table 8 shows data relating to aspherical coefficients. FIG. 13 shows aberrations.

TABLE 5

Example 2, lens data (nd, νd for d-line)

| Surface number | Curvature radius | Surface distance | nd | νd | θgF |
|---|---|---|---|---|---|
| 1 | −17374.27699 | 4.954 | 1.77250 | 49.60 | 0.55212 |
| 2 | 515.52725 | 16.475 | | | |
| 3 | −565.78121 | 4.800 | 1.80400 | 46.58 | 0.55730 |
| 4 | 334.28184 | 2.500 | | | |
| 5 | 348.58721 | 12.000 | 1.84139 | 24.56 | 0.61274 |
| 6 | 7335.08162 | 4.857 | | | |
| 7 | 8100.03388 | 5.000 | 1.80000 | 29.84 | 0.60178 |
| 8 | 441.57926 | 18.270 | 1.49700 | 81.54 | 0.53748 |
| 9 | −459.45313 | 0.125 | | | |
| 10 | 999.62577 | 10.863 | 1.63246 | 63.77 | 0.54215 |
| 11 | −1249.85366 | 34.988 | | | |
| 12 | 331.41864 | 23.000 | 1.43387 | 95.18 | 0.53733 |
| 13 | −555.43460 | 1.844 | | | |
| 14 | 231.27593 | 6.246 | 1.72047 | 34.71 | 0.58350 |
| 15 | 143.34892 | 28.057 | 1.49700 | 81.54 | 0.53748 |
| 16 | 4763.22108 | 3.150 | | | |
| 17 | 179.29715 | 17.500 | 1.49700 | 81.54 | 0.53748 |
| 18 | 457.42906 | DD [18] | | | |
| 19 | 182.44776 | 4.500 | 1.95375 | 32.32 | 0.59015 |
| 20 | 86.51118 | 12.791 | | | |
| 21 | −334.16437 | 3.072 | 1.55032 | 75.50 | 0.54001 |
| 22 | 61.82805 | 4.500 | 1.54814 | 45.78 | 0.56859 |
| 23 | 78.16316 | 9.822 | | | |
| 24 | −145.45264 | 2.145 | 1.49700 | 81.54 | 0.53748 |
| 25 | 96.79029 | 7.009 | 1.84139 | 24.56 | 0.61274 |
| 26 | −694.72543 | 5.941 | | | |
| 27 | −76.19334 | 2.141 | 1.43875 | 94.94 | 0.53433 |
| 28 | 1736.83551 | DD [28] | | | |
| 29 | 4270.48200 | 7.105 | 1.43875 | 94.66 | 0.53402 |
| 30 | −137.86493 | 0.194 | | | |
| 31 | 2057.62397 | 7.841 | 1.43875 | 94.66 | 0.53402 |
| 32 | −126.04188 | 2.251 | 1.94709 | 32.76 | 0.58864 |
| 33 | −185.50599 | DD [33] | | | |
| 34 | 124.39046 | 6.894 | 1.80391 | 32.49 | 0.59304 |
| 35 | 90.81996 | 10.020 | 1.43875 | 94.66 | 0.53402 |
| 36 | −169144.05304 | 2.114 | | | |
| 37 | 824.45845 | 6.056 | 1.43875 | 94.66 | 0.53402 |
| *38 | −346.58355 | DD [38] | | | |
| 39 (diaphragm) | ∞ | 7.698 | | | |
| 40 | −170.85337 | 4.409 | 1.51792 | 61.26 | 0.54256 |
| 41 | 1412.02444 | 1.380 | | | |
| 42 | 849.25112 | 4.339 | 1.84139 | 24.56 | 0.61274 |
| 43 | −295.14207 | 3.651 | 1.83481 | 42.72 | 0.56486 |
| 44 | 407.32585 | 22.575 | | | |
| 45 | −124.60852 | 2.955 | 1.63728 | 35.13 | 0.58662 |
| 46 | 549.68268 | 5.099 | 1.84139 | 24.56 | 0.61274 |
| 47 | −188.55815 | 0.573 | | | |
| 48 | 59.52609 | 5.815 | 1.73548 | 53.96 | 0.54449 |
| 49 | 1254.27053 | 3.520 | 1.72380 | 29.01 | 0.60096 |
| 50 | 86.04201 | 19.247 | | | |
| 51 | 144.55821 | 7.876 | 1.74390 | 40.78 | 0.57413 |
| 52 | −63.49507 | 2.500 | 1.92466 | 36.38 | 0.57721 |
| 53 | 99.04128 | 14.838 | | | |
| 54 | 347.50320 | 5.029 | 1.84139 | 24.56 | 0.61274 |
| 55 | −97.91525 | 13.073 | | | |
| 56 | 222.40660 | 4.518 | 1.52047 | 51.16 | 0.55705 |
| 57 | 21.11965 | 6.594 | 1.49700 | 81.54 | 0.53748 |
| 58 | 48.22752 | 8.032 | | | |
| 59 | 94.79522 | 6.951 | 1.49700 | 81.54 | 0.53748 |
| 60 | −37.49466 | 2.868 | 1.95375 | 32.32 | 0.59015 |
| 61 | −259.55822 | 9.975 | | | |
| 62 | 55.77235 | 4.807 | 1.53634 | 57.80 | 0.54818 |
| 63 | −380.90253 | 2.000 | | | |
| 64 | ∞ | 1.500 | 1.51633 | 64.14 | 0.53531 |
| 65 | ∞ | 0.000 | | | |
| 66 | ∞ | 3.690 | 1.51633 | 64.14 | 0.53531 |
| 67 | ∞ | 35.589 | | | |

TABLE 6

Example 2, specifications (d-line)

|  | Wide angle end | Intermediate position | Telephoto end |
|---|---|---|---|
| Zoom magnification | 1.0 | 3.8 | 19.8 |
| f | 34.992 | 134.370 | 692.844 |
| FNo. | 2.85 | 2.85 | 4.85 |
| 2ω[°] | 44.8 | 11.8 | 2.4 |

TABLE 7

Example 2, zoom distance

|  | Wide angle end | Intermediate position | Telephoto end |
|---|---|---|---|
| DD [18] | 7.414 | 87.953 | 120.637 |
| DD [28] | 231.897 | 132.146 | 2.241 |
| DD [33] | 24.482 | 5.853 | 2.287 |
| DD [38] | 2.530 | 40.369 | 141.157 |

TABLE 8

Example 2, aspherical coefficient

| Surface number | 38 |
|---|---|
| KA | −6.0661247E+00 |
| A3 | 0.0000000E+00 |
| A4 | −6.0498397E−10 |
| A5 | −3.9242470E−10 |
| A6 | 4.2998199E−11 |
| A7 | 6.5777538E−15 |
| A8 | 6.1474104E−14 |
| A9 | −1.0495812E−14 |
| A10 | 1.5144561E−17 |
| A11 | 2.4967345E−17 |
| A12 | −7.1763341E−19 |
| A13 | 5.0602365E−21 |
| A14 | −1.7779216E−22 |
| A15 | 8.3996059E−24 |
| A16 | −9.3643011E−26 |

Figure 3:
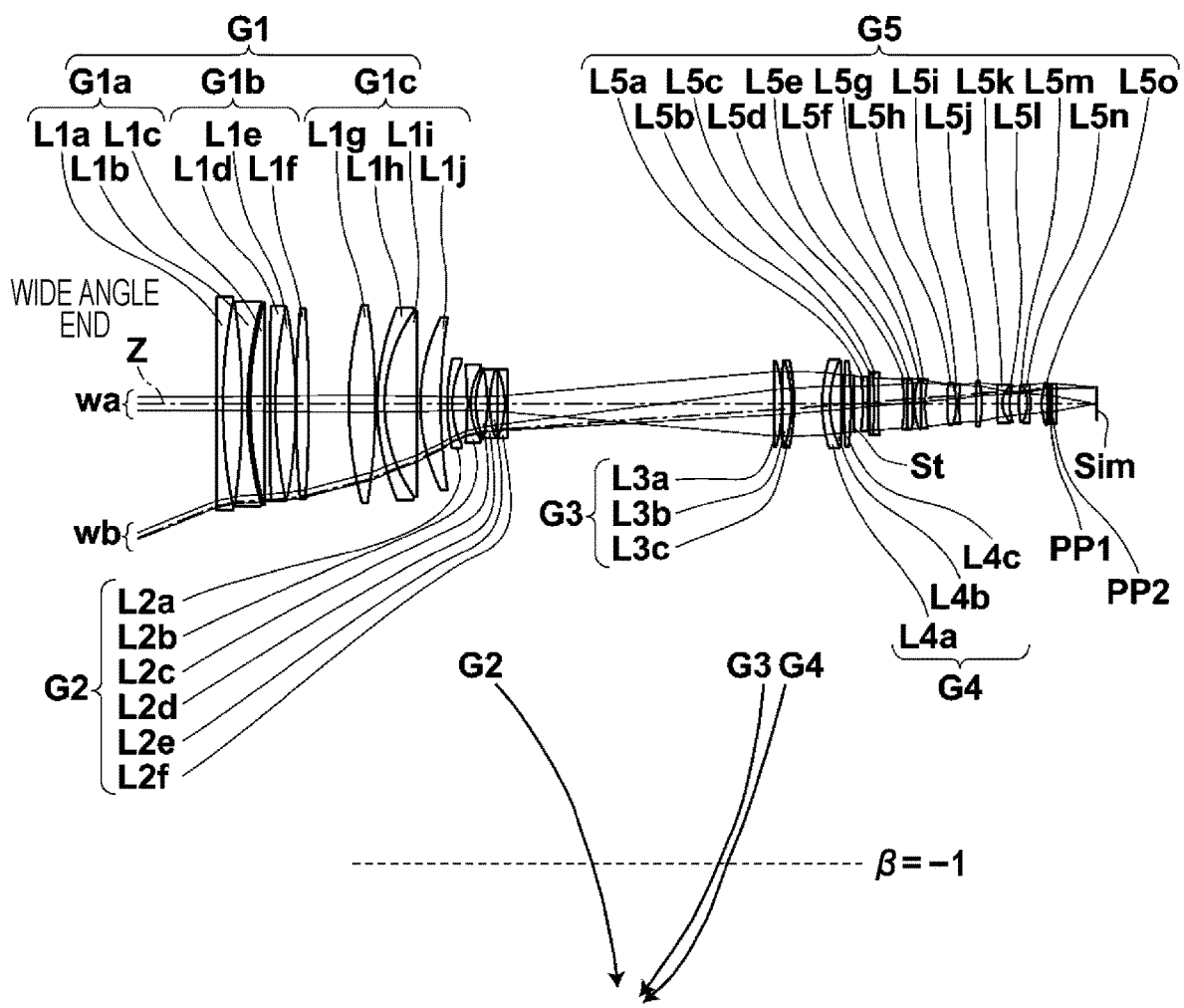
FIG. 3 provides cross-sectional views illustrating a lens configuration of a zoom lens according to Example 3 of the invention.
Figure 3:
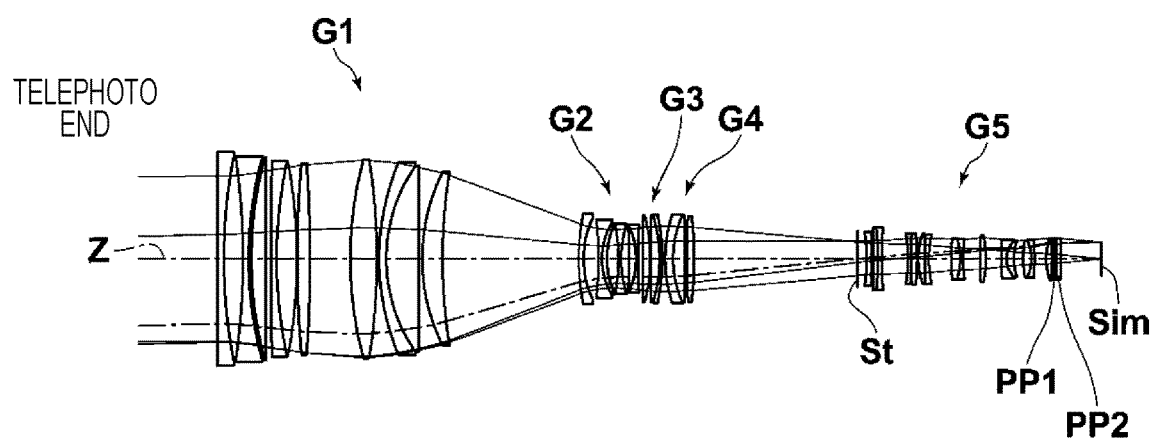
Figure 14:
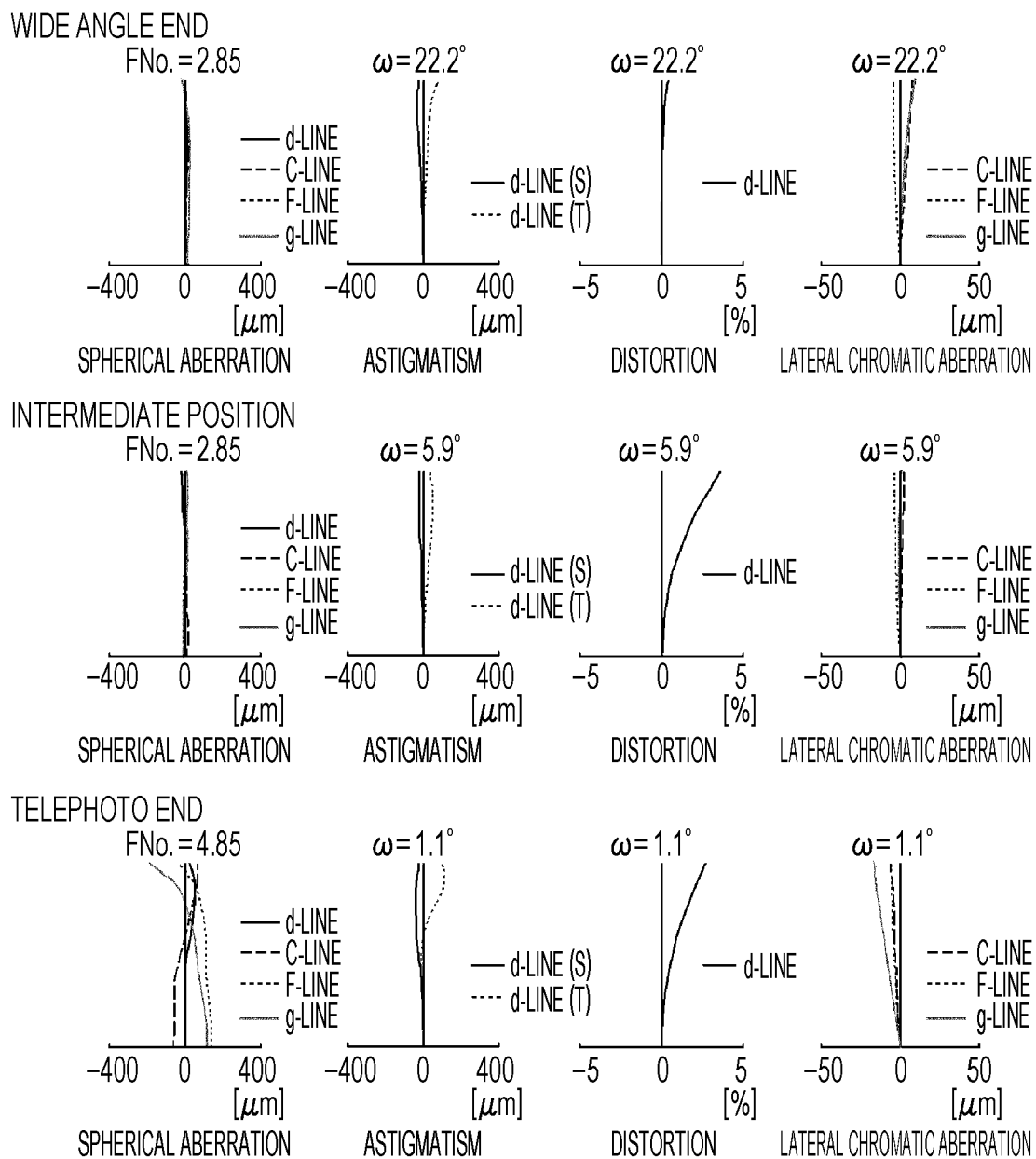
FIG. 14 provides aberration diagrams of the zoom lens according to Example 3 of the invention.

A zoom lens according to Example 3 is described next. FIG. 3 provides cross-sectional views illustrating a lens configuration of the zoom lens according to Example 3. The zoom lens according to Example 3 has the same lens number configuration as that of the zoom lens according to Example 1. Table 9 shows basic lens data of the zoom lens according to Example 3, Table 10 shows data relating to specifications, Table 11 shows data relating to surface distances that change, and Table 12 shows data relating to aspherical coefficients. FIG. 14 shows aberrations.

TABLE 9

Example 3, lens data (nd, vd for d-line)

| Surface number | Curvature radius | Surface distance | nd | vd | θgF |
|---|---|---|---|---|---|
| 1 | 31335.06747 | 5.980 | 1.77250 | 49.60 | 0.55212 |
| 2 | 489.39985 | 16.475 |  |  |  |
| 3 | −607.98263 | 4.800 | 1.80400 | 46.58 | 0.55730 |
| 4 | 338.23443 | 2.500 |  |  |  |
| 5 | 351.80001 | 12.000 | 1.84139 | 24.56 | 0.61274 |
| 6 | 5645.25277 | 4.829 |  |  |  |
| 7 | 5037.54253 | 5.000 | 1.80000 | 29.84 | 0.60178 |
| 8 | 416.86150 | 18.270 | 1.49700 | 81.54 | 0.53748 |
| 9 | −440.71712 | 0.125 |  |  |  |
| 10 | 999.99521 | 10.829 | 1.63246 | 63.77 | 0.54215 |
| 11 | −1249.81060 | 35.076 |  |  |  |
| 12 | 341.50810 | 23.000 | 1.43387 | 95.18 | 0.53733 |
| 13 | −555.44540 | 1.826 |  |  |  |
| 14 | 218.29118 | 6.257 | 1.62004 | 36.26 | 0.58800 |
| 15 | 143.35678 | 28.012 | 1.43875 | 94.94 | 0.53433 |
| 16 | 9804.77077 | 3.126 |  |  |  |
| 17 | 172.79153 | 17.500 | 1.43875 | 94.94 | 0.53433 |
| 18 | 472.57533 | DD [18] |  |  |  |
| 19 | 184.30388 | 4.485 | 1.95375 | 32.32 | 0.59015 |
| 20 | 86.21375 | 12.779 |  |  |  |
| 21 | −327.42076 | 3.061 | 1.55032 | 75.50 | 0.54001 |
| 22 | 61.43736 | 4.500 | 1.54814 | 45.78 | 0.56859 |
| 23 | 77.86458 | 9.830 |  |  |  |
| 24 | −144.01651 | 2.155 | 1.49700 | 81.54 | 0.53748 |
| 25 | 96.10729 | 7.000 | 1.84139 | 24.56 | 0.61274 |
| 26 | −679.42572 | 5.898 |  |  |  |
| 27 | −75.75003 | 2.125 | 1.43875 | 94.94 | 0.53433 |
| 28 | 1478.43455 | DD [28] |  |  |  |
| 29 | 4567.42296 | 7.086 | 1.43875 | 94.66 | 0.53402 |
| 30 | −138.46671 | 0.166 |  |  |  |
| 31 | 2111.50348 | 7.813 | 1.43875 | 94.66 | 0.53402 |
| 32 | −126.19862 | 2.268 | 1.94652 | 32.80 | 0.58853 |
| 33 | −185.32437 | DD [33] |  |  |  |
| 34 | 124.52210 | 6.889 | 1.80381 | 32.49 | 0.59305 |
| 35 | 90.89636 | 10.023 | 1.43875 | 94.66 | 0.53402 |
| 36 | −186927.49799 | 2.117 |  |  |  |
| 37 | 829.24124 | 6.060 | 1.43875 | 94.66 | 0.53402 |
| *38 | −343.97598 | DD [38] |  |  |  |
| 39 (diaphragm) | ∞ | 7.702 |  |  |  |
| 40 | −170.75799 | 4.421 | 1.51777 | 61.27 | 0.54254 |
| 41 | 1475.89688 | 1.393 |  |  |  |
| 42 | 850.55831 | 4.352 | 1.84139 | 24.56 | 0.61274 |
| 43 | −305.31634 | 3.654 | 1.83481 | 42.72 | 0.56486 |
| 44 | 413.48017 | 22.576 |  |  |  |
| 45 | −124.89221 | 2.963 | 1.63709 | 35.15 | 0.58659 |
| 46 | 549.68685 | 5.103 | 1.84139 | 24.56 | 0.61274 |
| 47 | −187.85314 | 0.562 |  |  |  |
| 48 | 59.64886 | 5.814 | 1.73577 | 53.93 | 0.54453 |
| 49 | 1254.69959 | 3.520 | 1.72411 | 29.00 | 0.60099 |
| 50 | 86.06614 | 19.253 |  |  |  |
| 51 | 144.26045 | 7.882 | 1.74352 | 40.78 | 0.57414 |
| 52 | −63.37168 | 2.504 | 1.92475 | 36.38 | 0.57718 |
| 53 | 98.95567 | 14.864 |  |  |  |
| 54 | 341.41408 | 5.047 | 1.84139 | 24.56 | 0.61274 |
| 55 | −97.75851 | 13.082 |  |  |  |
| 56 | 221.61374 | 4.531 | 1.52295 | 50.71 | 0.55785 |
| 57 | 21.13749 | 6.600 | 1.49700 | 81.54 | 0.53748 |
| 58 | 48.16130 | 8.031 |  |  |  |
| 59 | 94.87124 | 6.958 | 1.49700 | 81.54 | 0.53748 |
| 60 | −37.45970 | 2.870 | 1.95375 | 32.32 | 0.59015 |
| 61 | −258.87634 | 9.967 |  |  |  |
| 62 | 55.96570 | 4.807 | 1.53491 | 57.92 | 0.54796 |
| 63 | −390.17281 | 2.000 |  |  |  |
| 64 | ∞ | 1.500 | 1.51633 | 64.14 | 0.53531 |
| 65 | ∞ | 0.000 |  |  |  |
| 66 | ∞ | 3.690 | 1.51633 | 64.14 | 0.53531 |
| 67 | ∞ | 35.273 |  |  |  |

TABLE 10

Example 3, specifications (d-line)

|  | Wide angle end | Intermediate position | Telephoto end |
|---|---|---|---|
| Zoom magnification | 1.0 | 3.8 | 20.0 |
| f | 34.989 | 134.359 | 699.788 |
| FNo. | 2.85 | 2.85 | 4.85 |
| 2ω[°] | 44.4 | 11.8 | 2.2 |

TABLE 11

Example 3, zoom distance

|  | Wide angle end | Intermediate position | Telephoto end |
|---|---|---|---|
| DD [18] | 5.867 | 85.721 | 118.204 |
| DD [28] | 232.487 | 133.483 | 3.402 |
| DD [33] | 24.441 | 5.855 | 2.323 |
| DD [38] | 2.695 | 40.431 | 141.560 |

TABLE 12

Example 3, aspherical coefficient

| Surface number | 38 |
|---|---|
| KA | −6.0659990E+00 |
| A3 | 0.0000000E+00 |
| A4 | 7.5934682E−09 |
| A5 | −1.2082285E−09 |
| A6 | 5.9533640E−11 |
| A7 | 5.6310087E−14 |
| A8 | 6.4475101E−14 |
| A9 | −1.0442256E−14 |
| A10 | 6.3094636E−17 |
| A11 | 2.0953831E−17 |
| A12 | −6.5812003E−19 |
| A13 | 5.7283785E−21 |
| A14 | −1.3871386E−22 |
| A15 | 6.1553364E−24 |
| A16 | −6.9270089E−26 |

Figure 4:
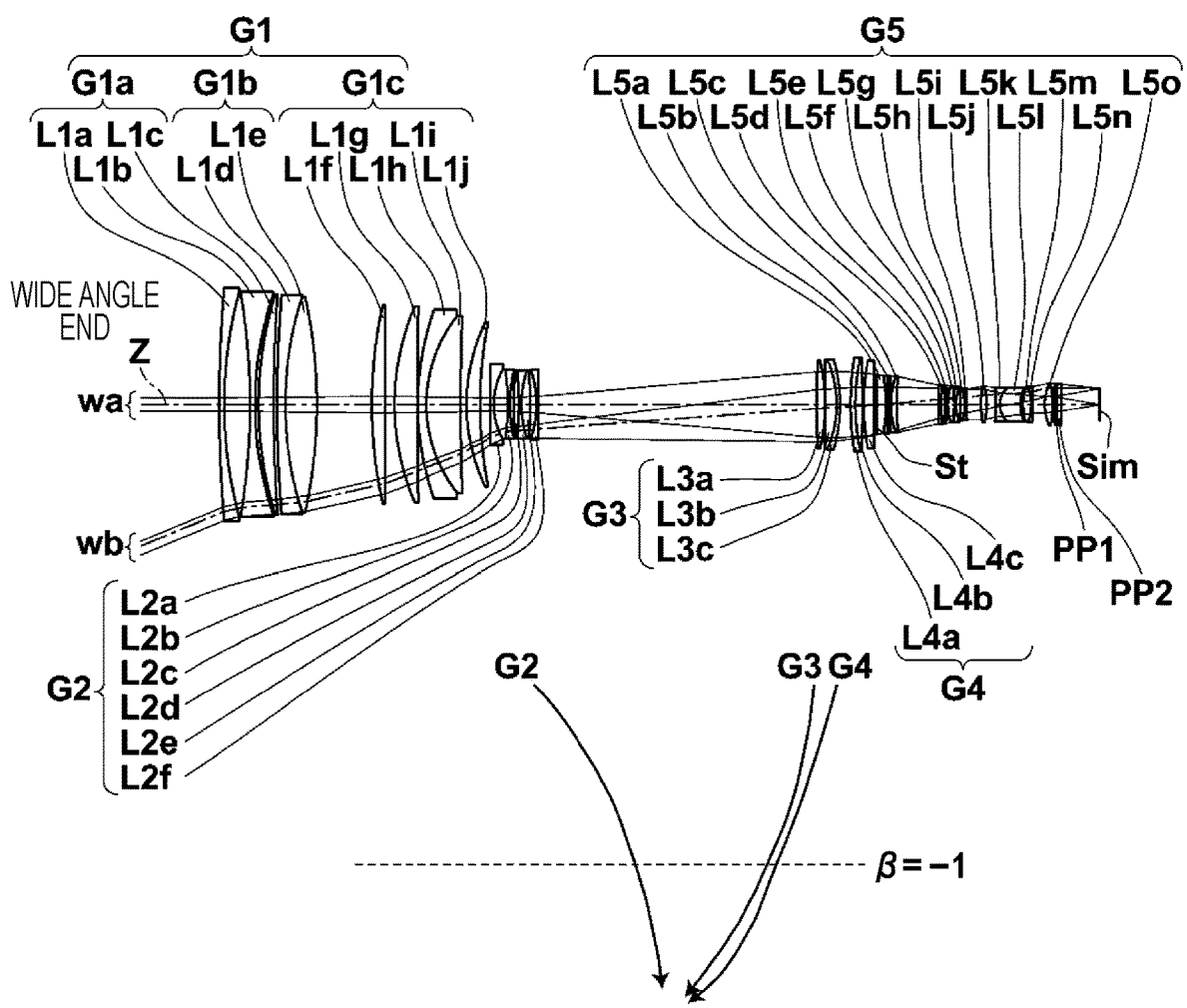
FIG. 4 provides cross-sectional views illustrating a lens configuration of a zoom lens according to Example 4 of the invention.
Figure 4:
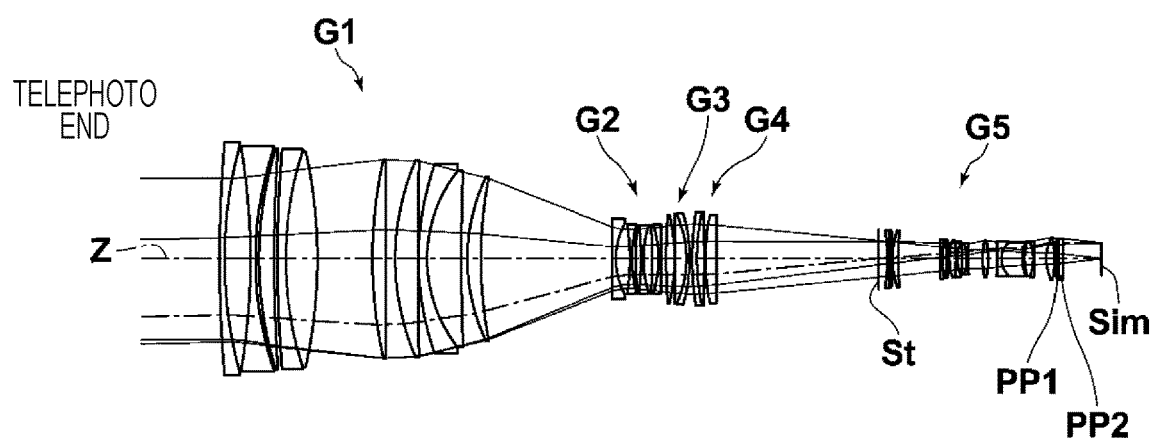

A zoom lens according to Example 4 is described next. FIG. 4 provides cross-sectional views illustrating a lens configuration of the zoom lens according to Example 4.

The zoom lens according to Example 4 differs from the zoom lens according to Example 1 only for the lens number configuration of a first lens group G1. The first lens group G1 is composed of a 1a lens group G1a consisting of three lenses of a lens L1a to a lens L1c, a 1b lens group G1b consisting of two lenses of a lens L1d and a lens L1e, and a 1c lens group G1c consisting of five lenses of a lens L1f to a lens L1j.

Figure 15:
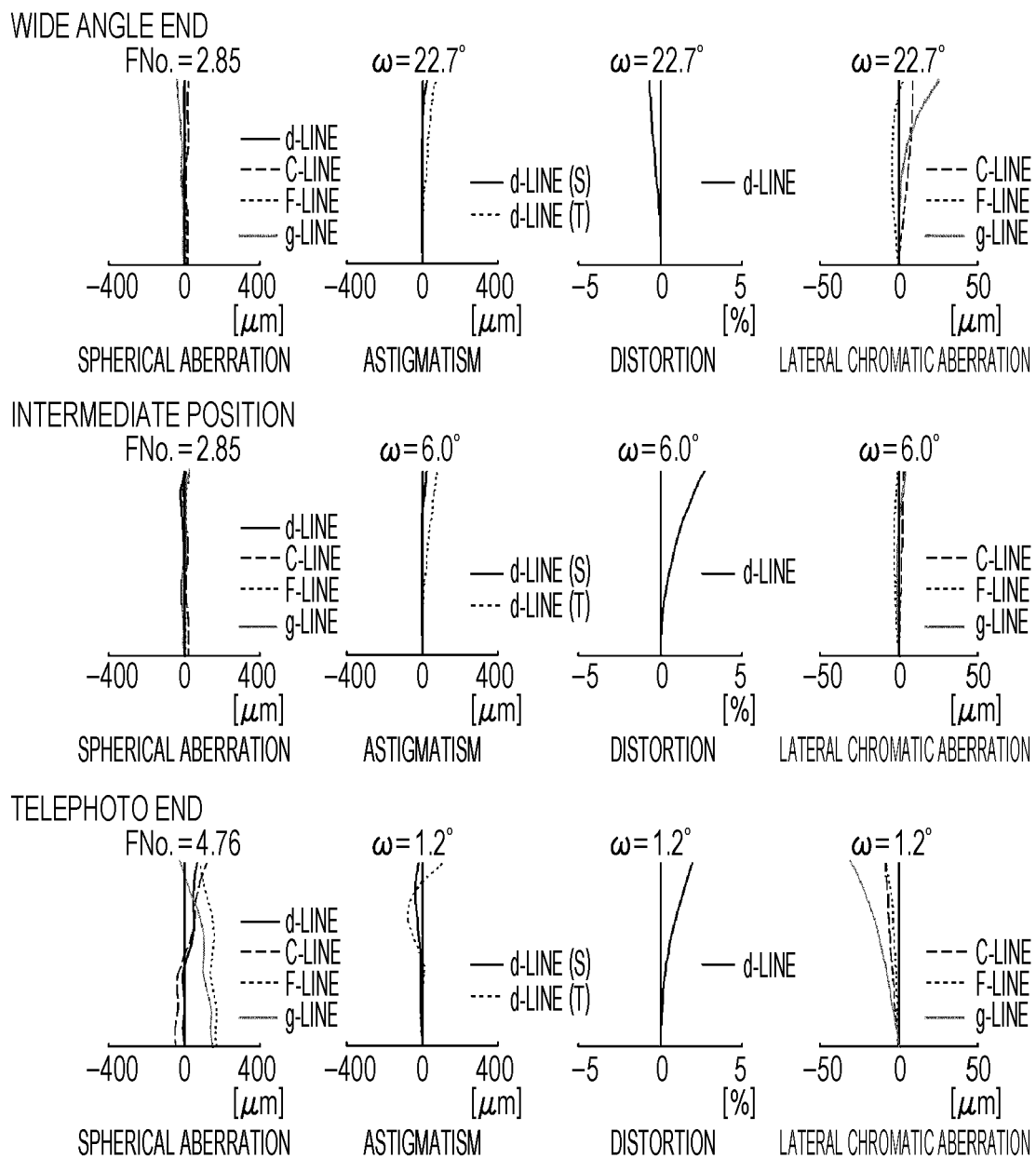
FIG. 15 provides aberration diagrams of the zoom lens according to Example 4 of the invention.

Table 13 shows basic lens data of the zoom lens according to Example 4, Table 14 shows data relating to specifications, Table 15 shows data relating to surface distances that change, and Table 16 shows data relating to aspherical coefficients. FIG. 15 shows aberrations.

TABLE 13

Example 4, lens data (nd, νd for d-line)

| Surface number | Curvature radius | Surface distance | nd | νd | θgF |
|---|---|---|---|---|---|
| 1 | 1203.32487 | 4.400 | 1.88300 | 40.76 | 0.56679 |
| 2 | 388.55765 | 22.500 | | | |
| 3 | −592.83878 | 4.400 | 1.65113 | 55.89 | 0.54672 |
| 4 | 307.63955 | 3.009 | | | |
| 5 | 329.25013 | 13.266 | 1.84139 | 24.56 | 0.61274 |
| 6 | 1422.51599 | 2.995 | | | |
| 7 | 1227.16435 | 7.230 | 1.54072 | 47.23 | 0.56511 |
| 8 | 303.53553 | 28.076 | 1.43875 | 94.94 | 0.53433 |
| 9 | −436.87379 | 47.872 | | | |
| 10 | 411.84229 | 11.251 | 1.69400 | 56.29 | 0.54506 |
| 11 | ∞ | 8.520 | | | |
| 12 | 221.02501 | 20.000 | 1.43387 | 95.18 | 0.53733 |
| 13 | 3784.25046 | 0.250 | | | |
| 14 | 253.15612 | 7.500 | 1.69895 | 30.05 | 0.60290 |
| 15 | 127.15122 | 30.030 | 1.43875 | 94.94 | 0.53433 |
| 16 | 2555.29938 | 5.000 | | | |
| 17 | 168.85857 | 11.910 | 1.49700 | 81.54 | 0.53748 |

TABLE 13-continued

Example 4, lens data (nd, νd for d-line)

| Surface number | Curvature radius | Surface distance | nd | νd | θgF |
|---|---|---|---|---|---|
| 18 | 385.87126 | DD [18] | | | |
| 19 | 2766.24481 | 3.250 | 1.71299 | 53.87 | 0.54587 |
| 20 | 64.32982 | 12.471 | | | |
| 21 | −200.04038 | 1.820 | 1.83481 | 42.72 | 0.56486 |
| 22 | 131.40042 | 3.000 | 1.84139 | 24.56 | 0.61274 |
| 23 | 227.27773 | 4.788 | | | |
| 24 | −263.90206 | 2.032 | 1.49700 | 81.54 | 0.53748 |
| 25 | 96.99160 | 7.818 | 1.78472 | 25.68 | 0.61621 |
| 26 | −394.03764 | 5.500 | | | |
| 27 | −97.99682 | 2.000 | 1.43875 | 94.94 | 0.53433 |
| 28 | −2704.70097 | DD [28] | | | |
| 29 | 571.03169 | 7.574 | 1.43875 | 94.66 | 0.53402 |
| 30 | −175.34201 | 0.125 | | | |
| 31 | −5273.85855 | 9.925 | 1.43875 | 94.66 | 0.53402 |
| 32 | −99.81994 | 3.000 | 1.80000 | 29.84 | 0.60178 |
| 33 | −143.78222 | DD [33] | | | |
| 34 | 288.39088 | 4.000 | 1.80000 | 29.84 | 0.60178 |
| 35 | 189.38496 | 6.545 | 1.43875 | 94.66 | 0.53402 |
| 36 | −1294.84337 | 0.757 | | | |
| 37 | 195.15150 | 9.750 | 1.43875 | 94.66 | 0.53402 |
| *38 | −3419.85116 | DD [38] | | | |
| 39 (diaphragm) | ∞ | 7.602 | | | |
| 40 | −154.21325 | 1.520 | 1.83481 | 42.72 | 0.56486 |
| 41 | 1055.59942 | 2.568 | 1.84139 | 24.56 | 0.61274 |
| 42 | −481.20610 | 0.200 | | | |
| 43 | 75.70122 | 4.890 | 1.56384 | 60.83 | 0.54082 |
| 44 | 242.81541 | 36.671 | | | |
| 45 | −2628.86635 | 2.000 | 1.80610 | 33.27 | 0.58845 |
| 46 | 97.76108 | 3.437 | | | |
| 47 | −173.65554 | 2.443 | 1.95906 | 17.47 | 0.65993 |
| 48 | −87.49658 | 0.300 | | | |
| 49 | 52.59563 | 5.624 | 1.77250 | 49.62 | 0.55186 |
| 50 | −130.79828 | 1.306 | 1.53172 | 48.84 | 0.56558 |
| 51 | 39.25083 | 4.064 | | | |
| 52 | −1280.59765 | 4.032 | 1.63854 | 55.38 | 0.54858 |
| 53 | −44.12784 | 1.000 | 1.95375 | 32.32 | 0.59015 |
| 54 | 121.20174 | 13.118 | | | |
| 55 | 119.12162 | 4.416 | 1.84139 | 24.56 | 0.61274 |
| 56 | −95.72269 | 8.375 | | | |
| 57 | −129.53488 | 3.388 | 1.51200 | 52.12 | 0.56018 |
| 58 | 20.51211 | 18.000 | 1.49700 | 81.54 | 0.53748 |
| 59 | 36.16294 | 2.323 | | | |
| 60 | 58.70246 | 7.174 | 1.49700 | 81.54 | 0.53748 |
| 61 | −42.75542 | 1.526 | 2.00100 | 29.13 | 0.59952 |
| 62 | −166.65679 | 10.250 | | | |
| 63 | 51.72062 | 6.662 | 1.51742 | 52.43 | 0.55649 |
| 64 | −117.33300 | 2.000 | | | |
| 65 | ∞ | 1.500 | 1.51633 | 64.14 | 0.53531 |
| 66 | ∞ | 0.000 | | | |
| 67 | ∞ | 3.690 | 1.51633 | 64.14 | 0.53531 |
| 68 | ∞ | 33.477 | | | |

TABLE 14

Example 4, specifications (d-line)

|  | Wide angle end | Intermediate position | Telephoto end |
|---|---|---|---|
| Zoom magnification | 1.0 | 3.8 | 19.6 |
| f | 34.589 | 132.822 | 677.946 |
| FNo. | 2.85 | 2.85 | 4.76 |
| 2ω[°] | 45.4 | 12.0 | 2.4 |

TABLE 15

Example 4, zoom distance

|  | Wide angle end | Intermediate position | Telephoto end |
|---|---|---|---|
| DD [18] | 8.534 | 82.112 | 114.634 |
| DD [28] | 242.787 | 134.807 | 4.410 |
| DD [33] | 9.113 | 3.407 | 2.249 |
| DD [38] | 2.730 | 42.838 | 141.870 |

TABLE 16

Example 4, aspherical coefficient

| Surface number | 38 |
|---|---|
| KA | 1.0000000E+00 |
| A3 | 0.0000000E+00 |
| A4 | −4.7142041E−08 |
| A5 | 2.3491920E−08 |
| A6 | −4.2313783E−09 |
| A7 | 4.0862089E−10 |
| A8 | −2.4055326E−11 |
| A9 | 9.6758230E−13 |
| A10 | −2.9523189E−14 |
| A11 | 6.1417894E−16 |
| A12 | 6.1911610E−19 |
| A13 | −5.8240543E−19 |
| A14 | 1.9090551E−20 |
| A15 | −2.7279816E−22 |
| A16 | 1.5134108E−24 |

Figure 5:
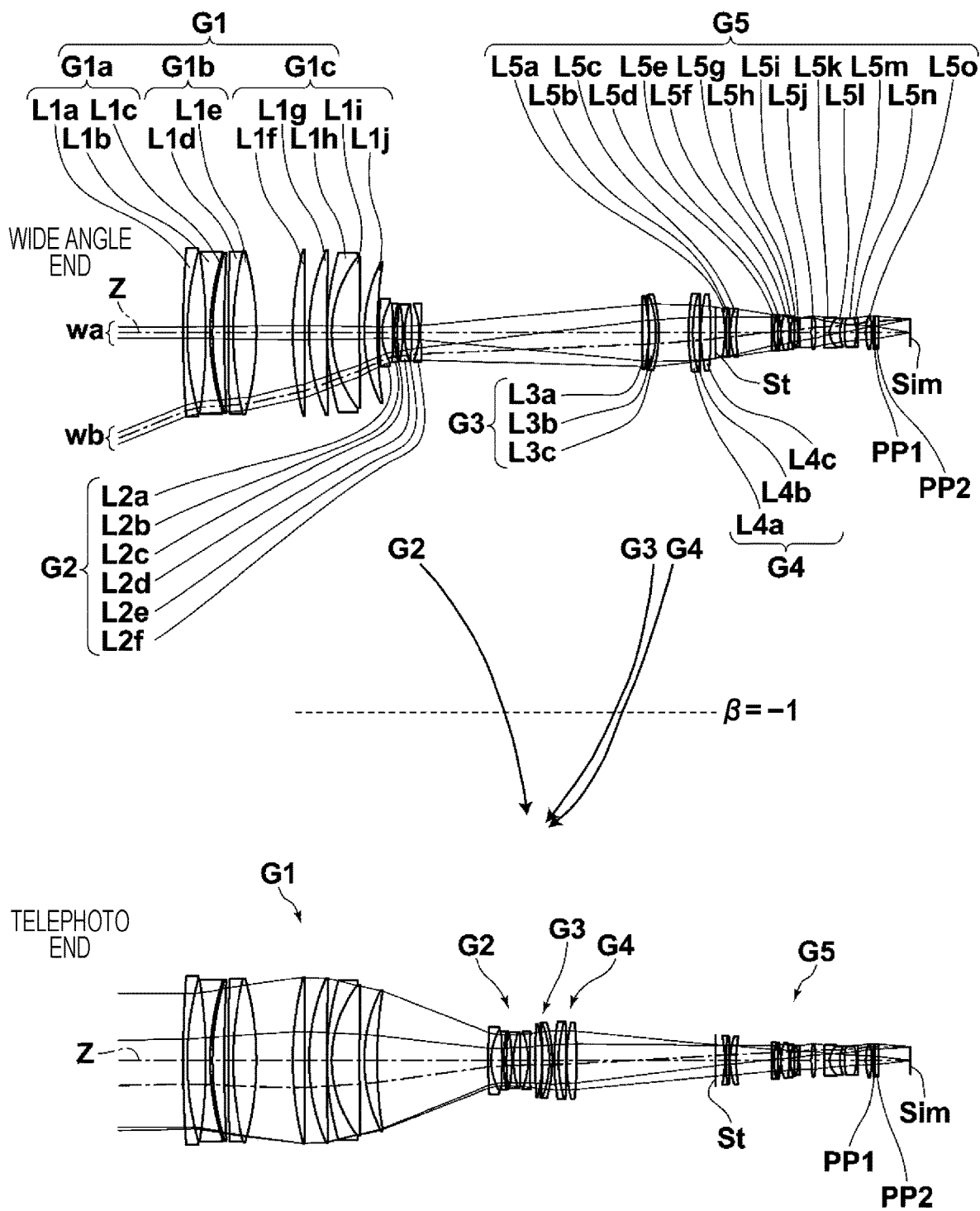
FIG. 5 provides cross-sectional views illustrating a lens configuration of a zoom lens according to Example 5 of the invention.
Figure 16:
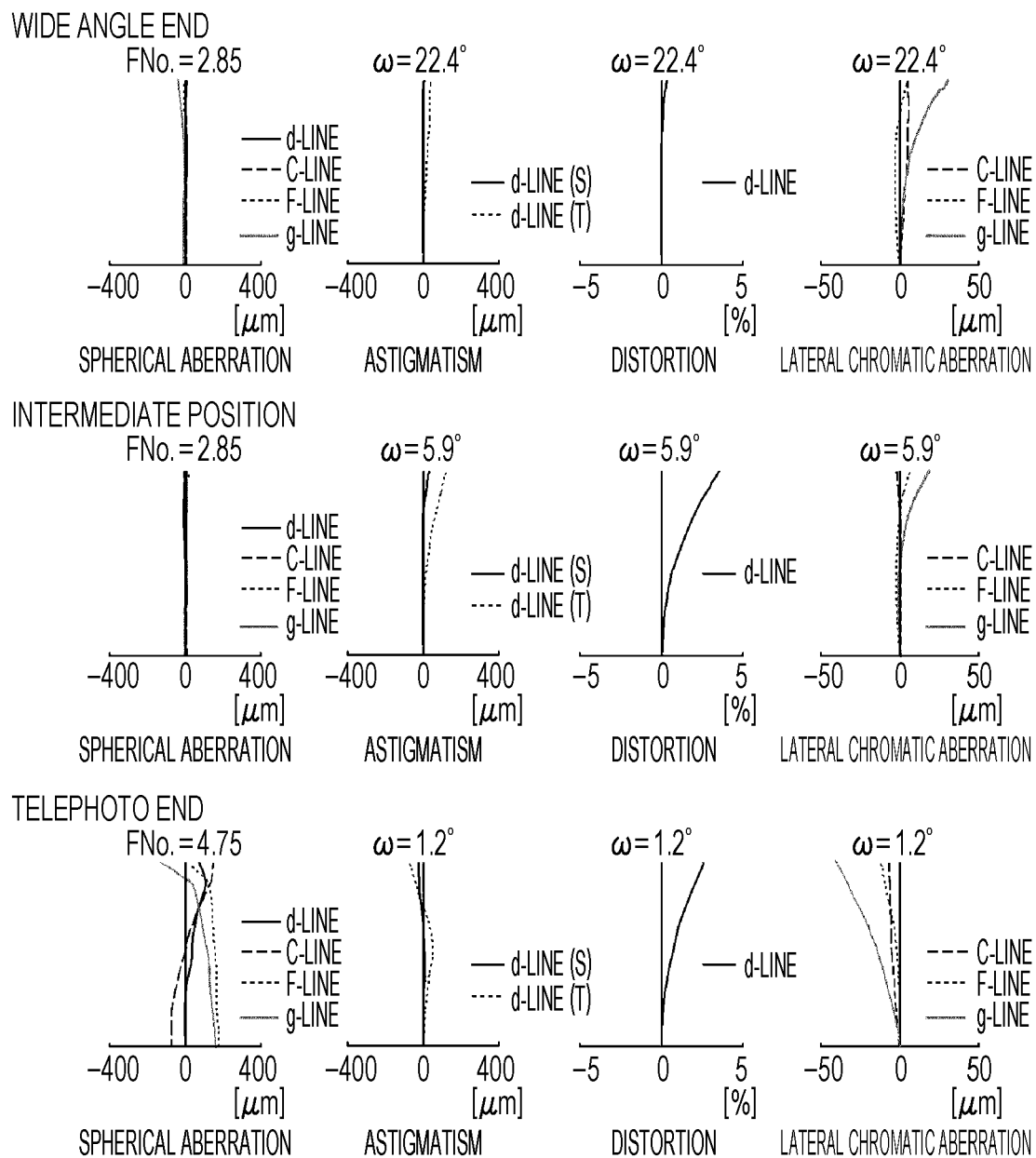
FIG. 16 provides aberration diagrams of the zoom lens according to Example 5 of the invention.

A zoom lens according to Example 5 is described next. FIG. 5 provides cross-sectional views illustrating a lens configuration of the zoom lens according to Example 5. The zoom lens according to Example 5 has the same lens number configuration as that of the zoom lens according to Example 4. Table 17 shows basic lens data of the zoom lens according to Example 5, Table 18 shows data relating to specifications, Table 19 shows data relating to surface distances that change, and Table 20 shows data relating to aspherical coefficients. FIG. 16 shows aberrations.

TABLE 17

Example 5, lens data (nd, νd for d-line)

| Surface number | Curvature radius | Surface distance | nd | νd | θgF |
|---|---|---|---|---|---|
| 1 | 1274.22298 | 4.400 | 1.88300 | 40.76 | 0.56679 |
| 2 | 326.74501 | 19.684 | | | |
| 3 | −548.17143 | 4.400 | 1.65113 | 55.89 | 0.54672 |
| 4 | 279.55876 | 2.619 | | | |
| 5 | 295.45890 | 12.485 | 1.84139 | 24.56 | 0.61274 |
| 6 | 1744.32995 | 4.294 | | | |
| 7 | 2819.10370 | 5.030 | 1.54072 | 47.23 | 0.56511 |
| 8 | 353.73687 | 25.000 | 1.43875 | 94.94 | 0.53433 |
| 9 | −334.96231 | 38.468 | | | |
| 10 | 364.50249 | 12.791 | 1.69400 | 56.29 | 0.54506 |
| 11 | ∞ | 4.393 | | | |
| 12 | 222.74581 | 18.826 | 1.43587 | 95.18 | 0.53733 |
| 13 | 3082.74950 | 0.165 | | | |
| 14 | 303.40519 | 5.054 | 1.69895 | 30.05 | 0.60290 |
| 15 | 132.44104 | 29.250 | 1.43875 | 94.94 | 0.53433 |
| 16 | 3846.74680 | 5.000 | | | |
| 17 | 169.82659 | 13.641 | 1.49700 | 81.54 | 0.53748 |
| 18 | 483.48570 | DD [18] | | | |
| 19 | 617.86280 | 2.977 | 1.71299 | 53.87 | 0.54587 |
| 20 | 65.00898 | 11.459 | | | |
| 21 | −503.11416 | 1.820 | 1.83481 | 42.72 | 0.56486 |
| 22 | 153.06550 | 3.000 | 1.84139 | 24.56 | 0.61274 |
| 23 | 298.42399 | 5.513 | | | |
| 24 | −159.10770 | 2.032 | 1.49700 | 81.54 | 0.53748 |
| 25 | 96.50142 | 7.218 | 1.78472 | 25.68 | 0.61621 |
| 26 | −681.45993 | 7.903 | | | |
| 27 | −83.70584 | 2.000 | 1.43875 | 94.94 | 0.53433 |
| 28 | 637.96362 | DD [28] | | | |
| 29 | 2166.99695 | 6.963 | 1.43875 | 94.66 | 0.53402 |
| 30 | −161.11101 | 0.125 | | | |
| 31 | −405.05862 | 7.540 | 1.43875 | 94.66 | 0.53402 |
| 32 | −105.61287 | 3.000 | 1.80000 | 29.84 | 0.60178 |
| 33 | −144.13129 | DD [33] | | | |
| 34 | 242.43997 | 4.431 | 1.80000 | 29.84 | 0.60178 |
| 35 | 151.75864 | 7.723 | 1.43875 | 94.66 | 0.53402 |
| 36 | −2815.57106 | 0.757 | | | |
| 37 | 181.60265 | 10.556 | 1.43875 | 94.66 | 0.53402 |
| *38 | −377.38727 | DD [38] | | | |
| 39 (diaphragm) | ∞ | 9.860 | | | |
| 40 | −133.65484 | 1.520 | 1.83481 | 42.72 | 0.56486 |
| 41 | 288.73885 | 3.709 | 1.84139 | 24.56 | 0.61274 |
| 42 | −382.22988 | 0.632 | | | |
| 43 | 78.52091 | 6.301 | 1.57328 | 61.52 | 0.54253 |
| 44 | 155.19645 | 37.811 | | | |
| 45 | 1799.38883 | 2.114 | 1.78321 | 25.97 | 0.60975 |
| 46 | 87.15520 | 3.914 | | | |
| 47 | −531.25079 | 3.149 | 1.82905 | 26.59 | 0.60918 |
| 48 | −100.44400 | 0.393 | | | |
| 49 | 55.45392 | 8.694 | 1.71006 | 50.50 | 0.55448 |
| 50 | −119.85496 | 1.310 | 1.56200 | 43.51 | 0.57039 |
| 51 | 47.74047 | 3.703 | | | |
| 52 | 551.26851 | 4.508 | 1.62780 | 49.87 | 0.56027 |
| 53 | −52.32986 | 1.000 | 1.94317 | 33.43 | 0.58644 |
| 54 | 142.62331 | 12.620 | | | |
| 55 | 118.28005 | 4.603 | 1.85354 | 22.52 | 0.62153 |
| 56 | −106.22412 | 9.303 | | | |
| 57 | −4540.69688 | 5.705 | 1.51772 | 55.43 | 0.55082 |
| 58 | 20.05508 | 10.796 | 1.49700 | 81.54 | 0.53748 |
| 59 | 35.96189 | 4.756 | | | |
| 60 | 65.96374 | 12.822 | 1.49700 | 81.54 | 0.53748 |
| 61 | −42.55351 | 1.200 | 1.96979 | 30.71 | 0.59530 |
| 62 | −2057.26456 | 8.437 | | | |
| 63 | 60.38503 | 5.578 | 1.53899 | 52.35 | 0.55624 |
| 64 | −107.26704 | 2.000 | | | |
| 65 | ∞ | 1.500 | 1.51633 | 64.14 | 0.53531 |
| 66 | ∞ | 0.000 | | | |
| 67 | ∞ | 3.690 | 1.51633 | 64.05 | 0.53463 |
| 68 | ∞ | 33.854 | | | |

TABLE 18

Example 5, specifications (d-line)

|  | Wide angle end | Intermediate position | Telephoto end |
|---|---|---|---|
| Zoom magnification | 1.0 | 3.8 | 19.6 |
| f | 34.658 | 133.088 | 679.304 |
| FNo. | 2.85 | 2.85 | 4.75 |
| 2ω[°] | 44.8 | 11.8 | 2.4 |

TABLE 19

Example 5, zoom distance

|  | Wide angle end | Intermediate position | Telephoto end |
|---|---|---|---|
| DD [18] | 2.263 | 82.338 | 117.906 |
| DD [28] | 234.237 | 130.599 | 6.030 |
| DD [33] | 31.332 | 11.588 | 2.249 |
| DD [38] | 5.447 | 48.754 | 147.095 |

TABLE 20

Example 5, aspherical coefficient

| Surface number | 38 |
|---|---|
| KA | 1.0000000E+00 |
| A3 | 0.0000000E+00 |
| A4 | 2.5373147E−08 |
| A5 | −3.1896159E−09 |
| A6 | 4.9719239E−10 |
| A7 | −3.4019825E−11 |
| A8 | 9.1983859E−13 |
| A9 | 1.0565892E−14 |
| A10 | −1.3331255E−15 |
| A11 | 3.5450551E−17 |
| A12 | −6.1939046E−19 |
| A13 | 1.7369551E−20 |
| A14 | −4.7811217E−22 |
| A15 | 6.8387262E−24 |
| A16 | −3.7656702E−26 |

Figure 6:
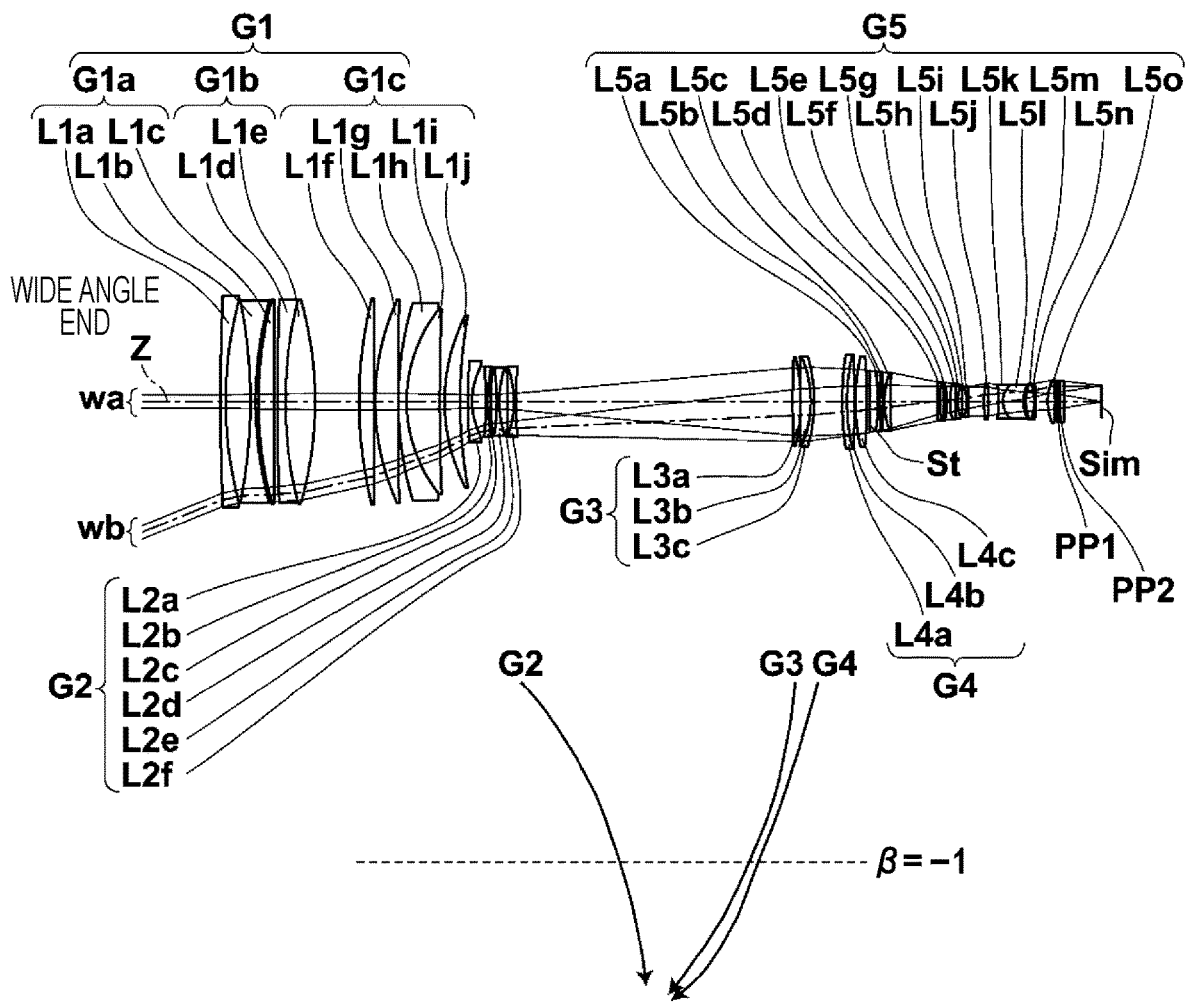
FIG. 6 provides cross-sectional views illustrating a lens configuration of a zoom lens according to Example 6 of the invention.
Figure 17:
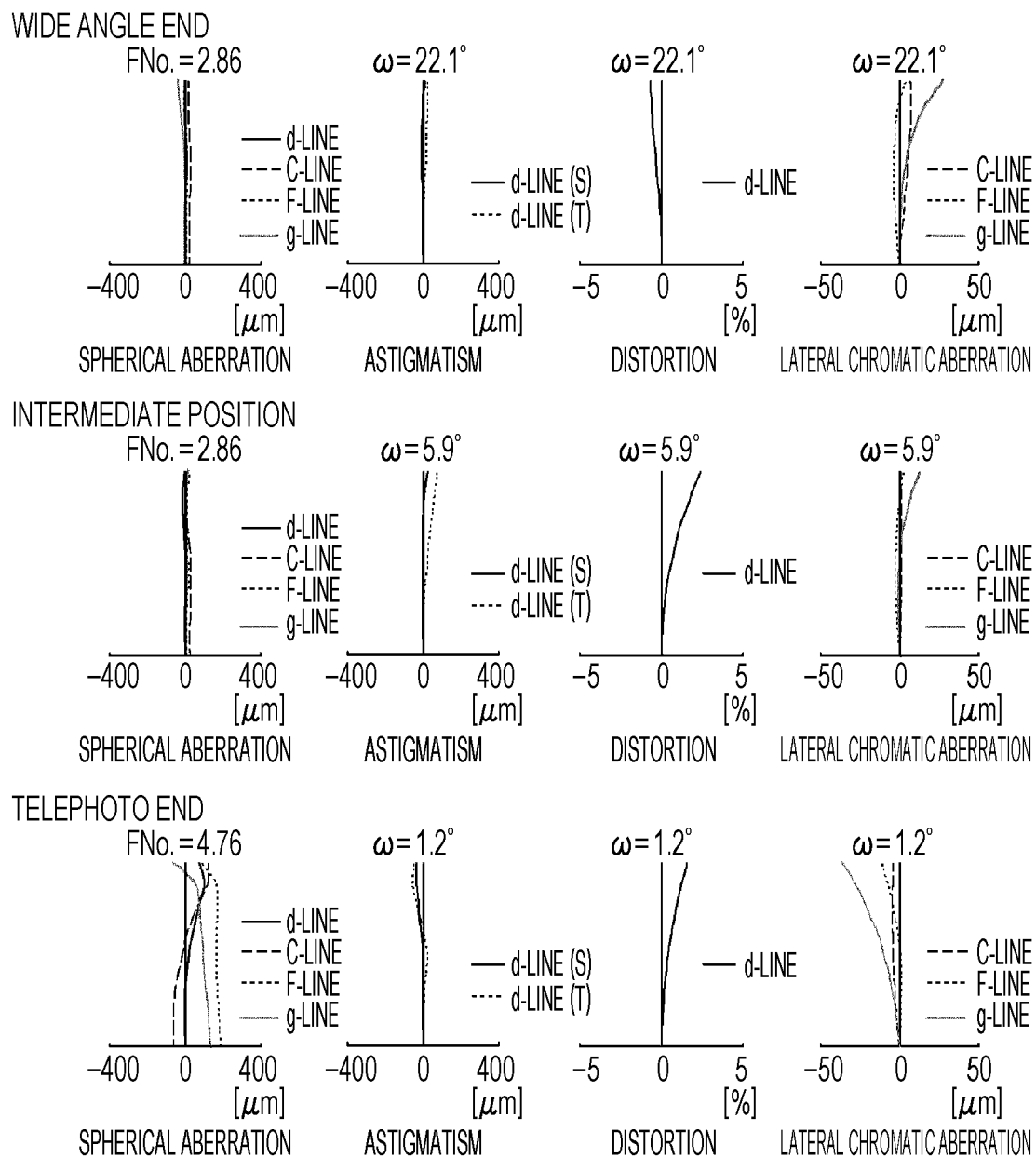
FIG. 17 provides aberration diagrams of the zoom lens according to Example 6 of the invention.

A zoom lens according to Example 6 is described next. FIG. 6 provides cross-sectional views illustrating a lens configuration of the zoom lens according to Example 6. The zoom lens according to Example 6 has the same lens number configuration as that of the zoom lens according to Example 4. Table 21 shows basic lens data of the zoom lens according to Example 6, Table 22 shows data relating to specifications, Table 23 shows data relating to surface distances that change, and Table 24 shows data relating to aspherical coefficients. FIG. 17 shows aberrations.

TABLE 21

Example 6, lens data (nd, vd for d-line)

| Surface number | Curvature radius | Surface distance | nd | vd | θgF |
|---|---|---|---|---|---|
| 1 | 2216.47396 | 4.400 | 1.88300 | 40.76 | 0.56679 |
| 2 | 348.74419 | 21.647 | | | |
| 3 | −456.42458 | 4.400 | 1.65113 | 55.89 | 0.54672 |
| 4 | 335.83718 | 2.549 | | | |
| 5 | 355.21879 | 13.626 | 1.84139 | 24.56 | 0.61274 |
| 6 | −16713.99573 | 2.832 | | | |
| 7 | 2387.81519 | 7.230 | 1.54072 | 47.23 | 0.56511 |
| 8 | 355.83781 | 26.378 | 1.43875 | 94.94 | 0.53433 |
| 9 | −327.41035 | 38.235 | | | |
| 10 | 379.42749 | 12.852 | 1.69400 | 56.29 | 0.54506 |
| 11 | ∞ | 1.200 | | | |
| 12 | 221.02097 | 20.000 | 1.43387 | 95.18 | 0.53733 |
| 13 | 3782.88841 | 0.204 | | | |
| 14 | 308.20464 | 7.227 | 1.69895 | 30.05 | 0.60290 |
| 15 | 132.61749 | 28.875 | 1.43875 | 94.94 | 0.53433 |
| 16 | 1868.31531 | 4.272 | | | |
| 17 | 169.86664 | 13.502 | 1.49700 | 81.54 | 0.53748 |
| 18 | 430.57733 | DD [18] | | | |
| 19 | 1103.58993 | 3.250 | 1.71299 | 53.87 | 0.54587 |
| 20 | 68.01115 | 11.907 | | | |
| 21 | −326.98300 | 1.820 | 1.83481 | 42.72 | 0.56486 |
| 22 | 169.63947 | 2.628 | 1.84139 | 24.56 | 0.61274 |
| 23 | 290.89410 | 5.315 | | | |
| 24 | −168.64444 | 2.032 | 1.49700 | 81.54 | 0.53748 |
| 25 | 102.42927 | 7.392 | 1.78472 | 25.68 | 0.61621 |
| 26 | −400.80737 | 5.500 | | | |
| 27 | −89.08531 | 2.000 | 1.43875 | 94.94 | 0.53433 |
| 28 | 591.05707 | DD [28] | | | |
| 29 | 1022.51482 | 6.867 | 1.43875 | 94.66 | 0.53402 |
| 30 | −173.29128 | 0.125 | | | |
| 31 | −963.77281 | 8.813 | 1.43875 | 94.66 | 0.53402 |
| 32 | −103.46118 | 3.000 | 1.80000 | 29.84 | 0.60178 |
| 33 | −145.63723 | DD [33] | | | |
| 34 | 307.20795 | 4.000 | 1.80000 | 29.84 | 0.60178 |
| 35 | 187.24071 | 6.734 | 1.43875 | 94.66 | 0.53402 |
| 36 | −1295.29211 | 0.757 | | | |
| 37 | 190.80292 | 9.750 | 1.43875 | 94.66 | 0.53402 |
| *38 | −574.80733 | DD [38] | | | |
| 39 (diaphragm) | ∞ | 7.835 | | | |
| 40 | −157.05449 | 1.520 | 1.83481 | 42.72 | 0.56486 |
| 41 | 729.25837 | 2.638 | 1.84139 | 24.56 | 0.61274 |
| 42 | −554.56625 | 1.173 | | | |
| 43 | 75.91858 | 5.086 | 1.56384 | 60.83 | 0.54082 |
| 44 | 249.98807 | 41.357 | | | |
| 45 | −3774.71446 | 2.000 | 1.80610 | 33.27 | 0.58845 |
| 46 | 94.85869 | 3.623 | | | |
| 47 | −173.43860 | 2.415 | 1.95906 | 17.47 | 0.65993 |
| 48 | −86.94731 | 2.606 | | | |
| 49 | 51.63691 | 5.569 | 1.77250 | 49.62 | 0.55186 |
| 50 | −119.22975 | 1.220 | 1.53172 | 48.84 | 0.56558 |
| 51 | 38.99544 | 3.956 | | | |
| 52 | −1598.56178 | 3.981 | 1.63854 | 55.38 | 0.54858 |
| 53 | −42.95369 | 1.264 | 1.95375 | 32.32 | 0.59015 |
| 54 | 107.69108 | 13.785 | | | |
| 55 | 117.37581 | 4.235 | 1.84139 | 24.56 | 0.61274 |
| 56 | −98.37784 | 8.474 | | | |
| 57 | −144.27087 | 3.922 | 1.51200 | 52.12 | 0.56018 |
| 58 | 21.27734 | 17.951 | 1.49700 | 81.54 | 0.53748 |
| 59 | 36.86550 | 2.070 | | | |
| 60 | 54.29072 | 7.322 | 1.49700 | 81.54 | 0.53748 |
| 61 | −46.00893 | 1.200 | 2.00100 | 29.13 | 0.59952 |
| 62 | −179.99726 | 10.250 | | | |
| 63 | 46.73203 | 6.560 | 1.51742 | 52.43 | 0.55649 |
| 64 | −180.74015 | 2.000 | | | |
| 65 | ∞ | 1.500 | 1.51633 | 64.14 | 0.53531 |
| 66 | ∞ | 0.000 | | | |
| 67 | ∞ | 3.690 | 1.51633 | 64.05 | 0.53463 |
| 68 | ∞ | 32.967 | | | |

TABLE 22

Example 6, specifications (d-line)

| | Wide angle end | Intermediate position | Telephoto end |
|---|---|---|---|
| Zoom magnification | 1.0 | 3.8 | 19.6 |
| f | 35.510 | 136.357 | 695.987 |
| FNo. | 2.86 | 2.86 | 4.75 |
| 2ω[°] | 44.2 | 11.8 | 2.4 |

TABLE 23

Example 6, zoom distance

| | Wide angle end | Intermediate position | Telephoto end |
|---|---|---|---|
| DD [18] | 7.151 | 86.917 | 122.100 |
| DD [28] | 241.513 | 134.564 | 5.603 |
| DD [33] | 24.459 | 8.405 | 2.178 |
| DD [38] | 2.711 | 45.948 | 145.953 |

TABLE 24

Example 6, aspherical coefficient

| Surface number | 38 |
|---|---|
| KA | 1.0000000E+00 |
| A3 | 0.0000000E+00 |
| A4 | 4.7590627E−09 |
| A5 | 1.7107487E−09 |
| A6 | −2.7096195E−10 |
| A7 | 2.4286712E−11 |
| A8 | −1.2588015E−12 |

TABLE 24-continued

Example 6, aspherical coefficient

| Surface number | 38 |
|---|---|
| A9 | 3.9012037E−14 |
| A10 | −9.7460038E−16 |
| A11 | 3.1118871E−17 |
| A12 | −6.6381916E−19 |
| A13 | −7.9197859E−21 |
| A14 | 7.3028040E−22 |
| A15 | −1.3743077E−23 |
| A16 | 8.7579813E−26 |

Figure 7:
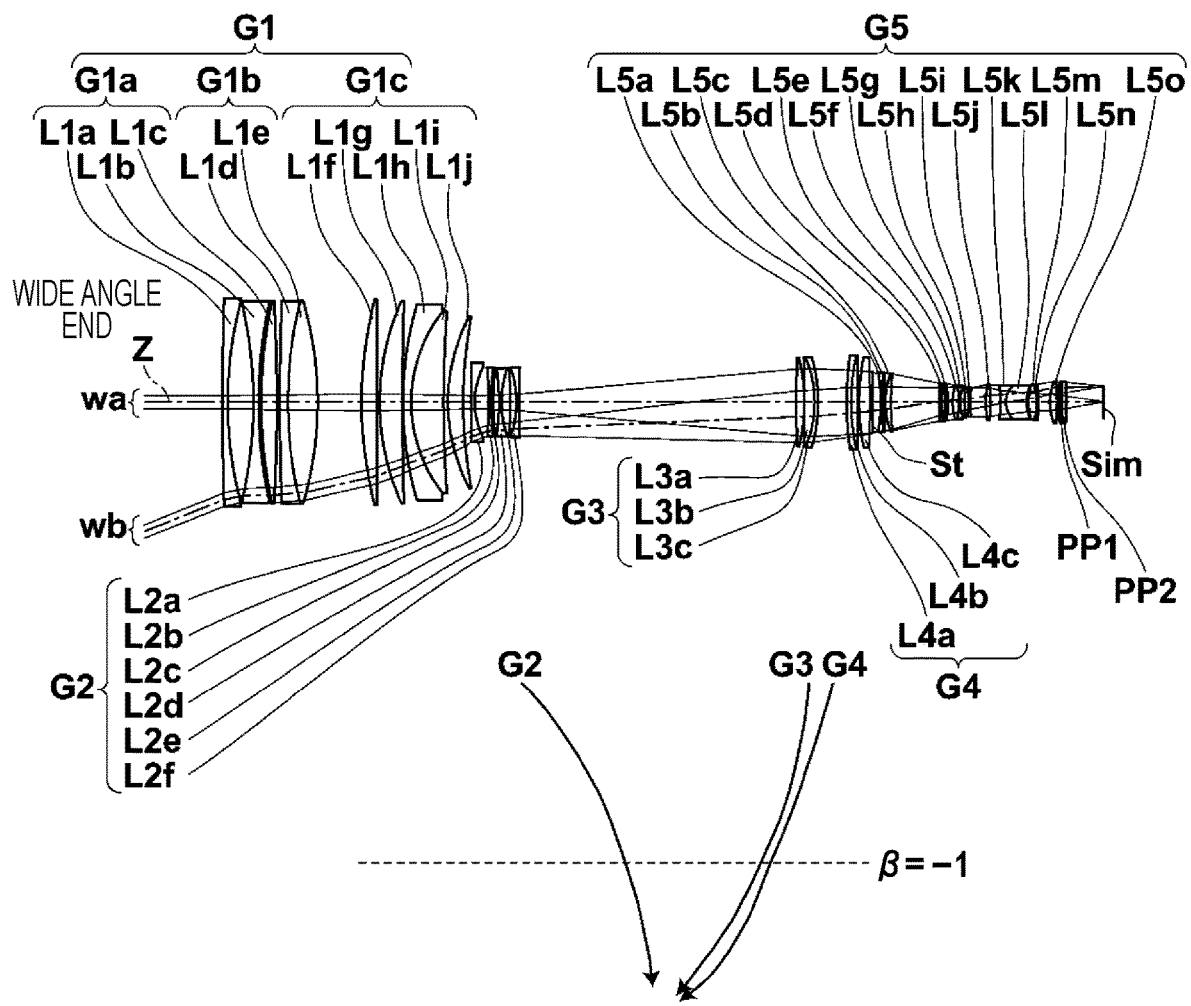
FIG. 7 provides cross-sectional views illustrating a lens configuration of a zoom lens according to Example 7 of the invention.
Figure 7:
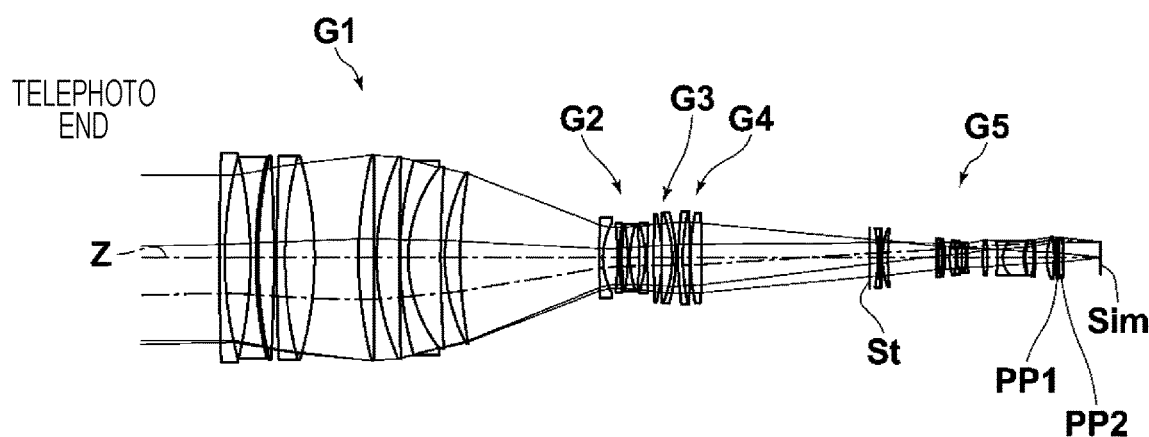
Figure 18:
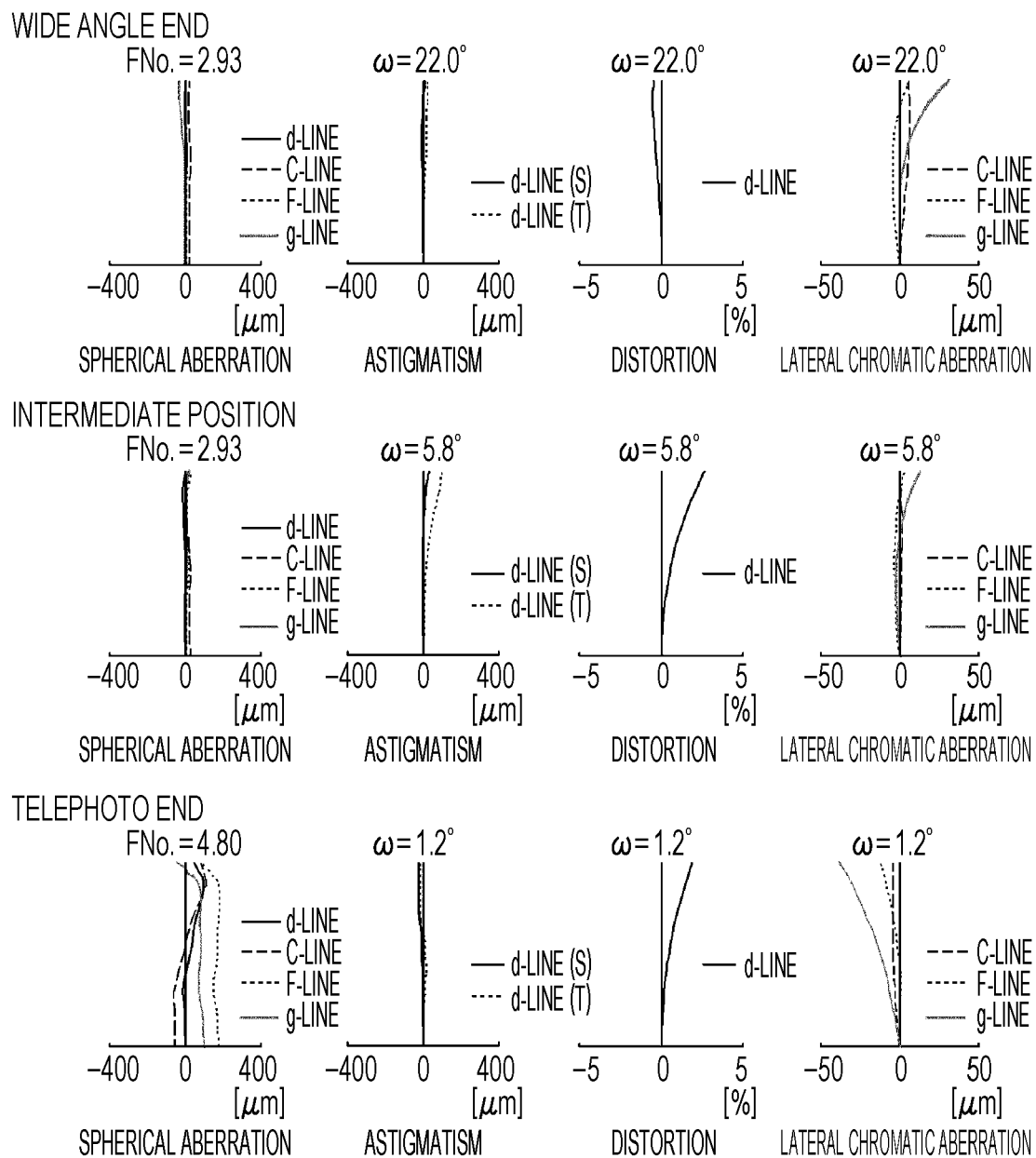
FIG. 18 provides aberration diagrams of the zoom lens according to Example 7 of the invention.

A zoom lens according to Example 7 is described next. FIG. 7 provides cross-sectional views illustrating a lens configuration of the zoom lens according to Example 7. The zoom lens according to Example 7 has the same lens number configuration as that of the zoom lens according to Example 4. Table 25 shows basic lens data of the zoom lens according to Example 7, Table 26 shows data relating to specifications, Table 27 shows data relating to surface distances that change, and Table 28 shows data relating to aspherical coefficients. FIG. 18 shows aberrations.

TABLE 25

Example 7, lens data (nd, νd for d-line)

| Surface number | Curvature radius | Surface distance | nd | νd | θgF |
|---|---|---|---|---|---|
| 1 | 3115.22902 | 4.400 | 1.88300 | 40.76 | 0.56679 |
| 2 | 349.55385 | 22.499 | | | |
| 3 | −388.68497 | 4.432 | 1.65113 | 55.89 | 0.54672 |
| 4 | 411.65471 | 2.342 | | | |
| 5 | 429.44340 | 13.552 | 1.84139 | 24.56 | 0.61274 |
| 6 | −1689.09587 | 2.687 | | | |
| 7 | 2385.11397 | 7.230 | 1.54072 | 47.23 | 0.56511 |
| 8 | 357.62308 | 26.396 | 1.43875 | 94.94 | 0.53433 |
| 9 | −318.17967 | 38.273 | | | |
| 10 | 368.41048 | 13.143 | 1.69400 | 56.29 | 0.54506 |
| 11 | ∞ | 2.653 | | | |
| 12 | 220.84589 | 19.997 | 1.43387 | 95.18 | 0.53733 |
| 13 | 3693.07273 | 0.224 | | | |
| 14 | 313.75805 | 7.240 | 1.69895 | 30.05 | 0.60290 |
| 15 | 131.42301 | 28.304 | 1.43875 | 94.94 | 0.53433 |
| 16 | 1146.73703 | 3.740 | | | |
| 17 | 164.75208 | 13.328 | 1.49700 | 81.54 | 0.53748 |
| 18 | 414.73079 | DD [18] | | | |
| 19 | 1326.38078 | 3.183 | 1.71299 | 53.87 | 0.54587 |
| 20 | 67.44642 | 12.498 | | | |
| 21 | −286.53431 | 1.820 | 1.83481 | 42.72 | 0.56486 |
| 22 | 188.08010 | 2.110 | 1.84139 | 24.56 | 0.61274 |
| 23 | 275.09448 | 5.138 | | | |
| 24 | −176.55465 | 2.032 | 1.49700 | 81.54 | 0.53748 |
| 25 | 100.95140 | 7.702 | 1.78472 | 25.68 | 0.61621 |
| 26 | −329.77942 | 5.500 | | | |
| 27 | −88.87861 | 2.000 | 1.43875 | 94.94 | 0.53433 |
| 28 | 714.95128 | DD [28] | | | |
| 29 | 928.29470 | 7.168 | 1.43875 | 94.66 | 0.53402 |
| 30 | −166.00053 | 0.125 | | | |
| 31 | −1289.47173 | 8.913 | 1.43875 | 94.66 | 0.53402 |
| 32 | −103.32262 | 3.000 | 1.80000 | 29.84 | 0.60178 |
| 33 | −148.26931 | DD [33] | | | |
| 34 | 308.89930 | 4.000 | 1.80000 | 29.84 | 0.60178 |
| 35 | 192.07672 | 6.038 | 1.43875 | 94.66 | 0.53402 |
| 36 | −1294.71907 | 0.757 | | | |
| 37 | 196.66541 | 9.750 | 1.43875 | 94.66 | 0.53402 |
| *38 | −720.72252 | DD [38] | | | |
| 39 (diaphragm) | ∞ | 7.195 | | | |
| 40 | −156.68264 | 1.520 | 1.83481 | 42.72 | 0.56486 |
| 41 | 842.45166 | 2.150 | 1.84139 | 24.56 | 0.61274 |
| 42 | −586.07745 | 0.200 | | | |
| 43 | 75.34448 | 4.999 | 1.56384 | 60.83 | 0.54082 |
| 44 | 249.99493 | 42.069 | | | |
| 45 | −2883.82574 | 2.000 | 1.80610 | 33.27 | 0.58845 |
| 46 | 94.42916 | 3.286 | | | |
| 47 | −178.38958 | 2.280 | 1.95906 | 17.47 | 0.65993 |
| 48 | −87.12464 | 4.073 | | | |
| 49 | 51.00959 | 5.290 | 1.77250 | 49.62 | 0.55186 |
| 50 | −121.12174 | 1.222 | 1.53172 | 48.84 | 0.56558 |
| 51 | 38.98139 | 3.994 | | | |
| 52 | −1400.07367 | 3.970 | 1.63854 | 55.38 | 0.54858 |
| 53 | −42.71093 | 1.000 | 1.95375 | 32.32 | 0.59015 |
| 54 | 98.29809 | 13.516 | | | |
| 55 | 107.32507 | 4.265 | 1.84139 | 24.56 | 0.61274 |
| 56 | −99.07220 | 8.352 | | | |
| 57 | −142.68824 | 4.922 | 1.51200 | 52.12 | 0.56018 |
| 58 | 21.77806 | 18.000 | 1.49700 | 81.54 | 0.53748 |
| 59 | 37.19255 | 1.682 | | | |
| 60 | 52.96086 | 7.467 | 1.49700 | 81.54 | 0.53748 |
| 61 | −45.25620 | 1.200 | 2.00100 | 29.13 | 0.59952 |
| 62 | −177.03293 | 9.775 | | | |
| 63 | 49.57904 | 6.438 | 1.51742 | 52.43 | 0.55649 |
| 64 | −157.84741 | 2.000 | | | |
| 65 | ∞ | 1.500 | 1.51633 | 64.14 | 0.53531 |
| 66 | ∞ | 0.000 | | | |
| 67 | ∞ | 3.690 | 1.51633 | 64.05 | 0.53463 |
| 68 | ∞ | 32.964 | | | |

TABLE 26

Example 7, specifications (d-line)

| | Wide angle end | Intermediate position | Telephoto end |
|---|---|---|---|
| Zoom magnification | 1.0 | 3.8 | 19.6 |
| f' | 35.753 | 137.290 | 700.753 |
| FNo. | 2.93 | 2.93 | 4.80 |
| 2ω[°] | 44.0 | 11.6 | 2.4 |

TABLE 27

Example 7, zoom distance

| | Wide angle end | Intermediate position | Telephoto end |
|---|---|---|---|
| DD [18] | 6.643 | 87.122 | 121.889 |
| DD [28] | 242.174 | 135.517 | 5.350 |
| DD [33] | 24.794 | 8.161 | 2.147 |
| DD [38] | 2.646 | 45.457 | 146.871 |

TABLE 28

Example 7, aspherical coefficient

| Surface number | 38 |
|---|---|
| KA | 1.0000000E+00 |
| A3 | 0.0000000E+00 |
| A4 | −2.0798385E−08 |
| A5 | 1.4657683E−08 |
| A6 | −3.2730034E−09 |
| A7 | 3.7528927E−10 |
| A8 | −2.3490790E−11 |
| A9 | 7.3529647E−13 |
| A10 | −3.8695741E−15 |
| A11 | −4.2162522E−16 |
| A12 | 7.4099281E−18 |
| A13 | 2.5167013E−19 |

TABLE 28-continued

Example 7, aspherical coefficient

| Surface number | 38 |
|---|---|
| A14 | −1.1222166E−20 |
| A15 | 1.6156810E−22 |
| A16 | −8.4641640E−25 |

Figure 8:
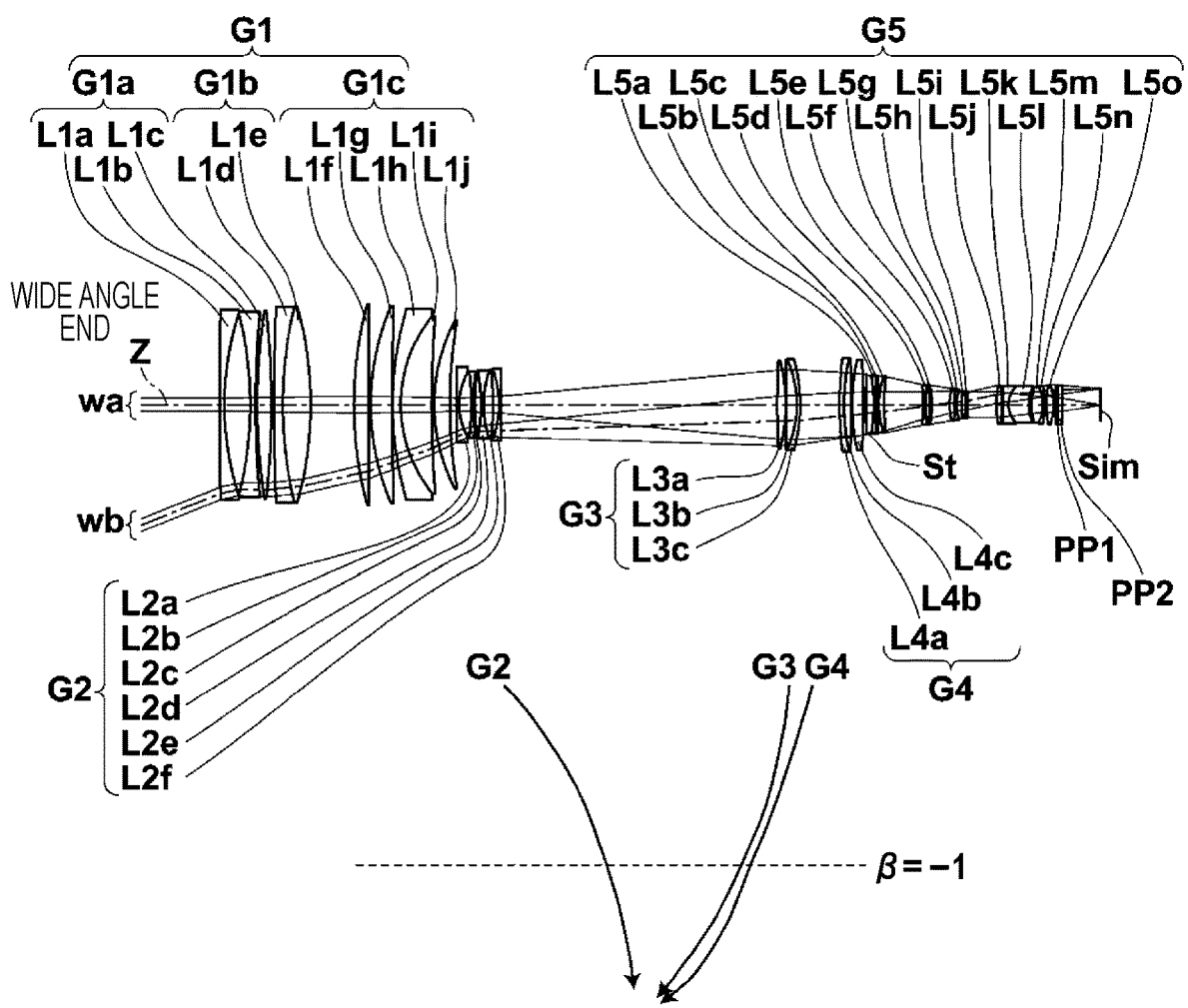
FIG. 8 provides cross-sectional views illustrating a lens configuration of a zoom lens according to Example 8 of the invention.
Figure 8:
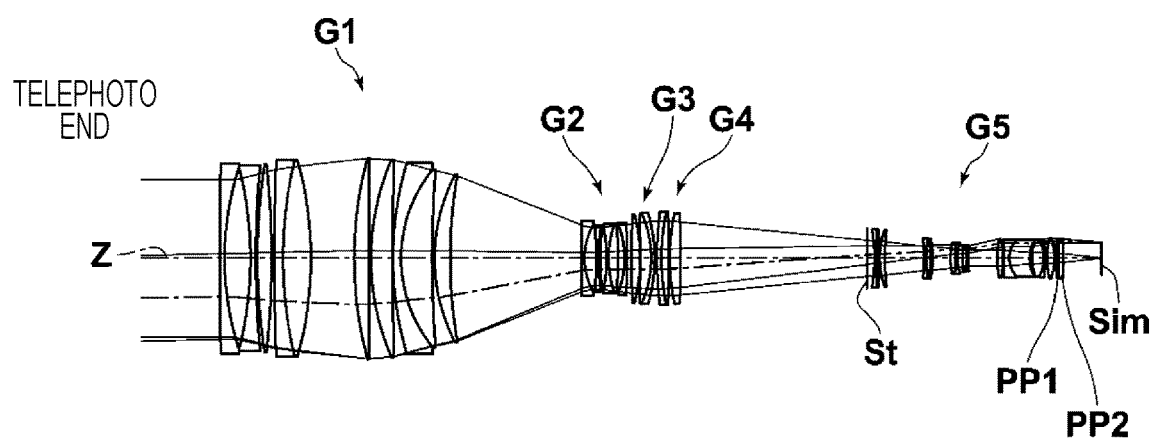
Figure 19:
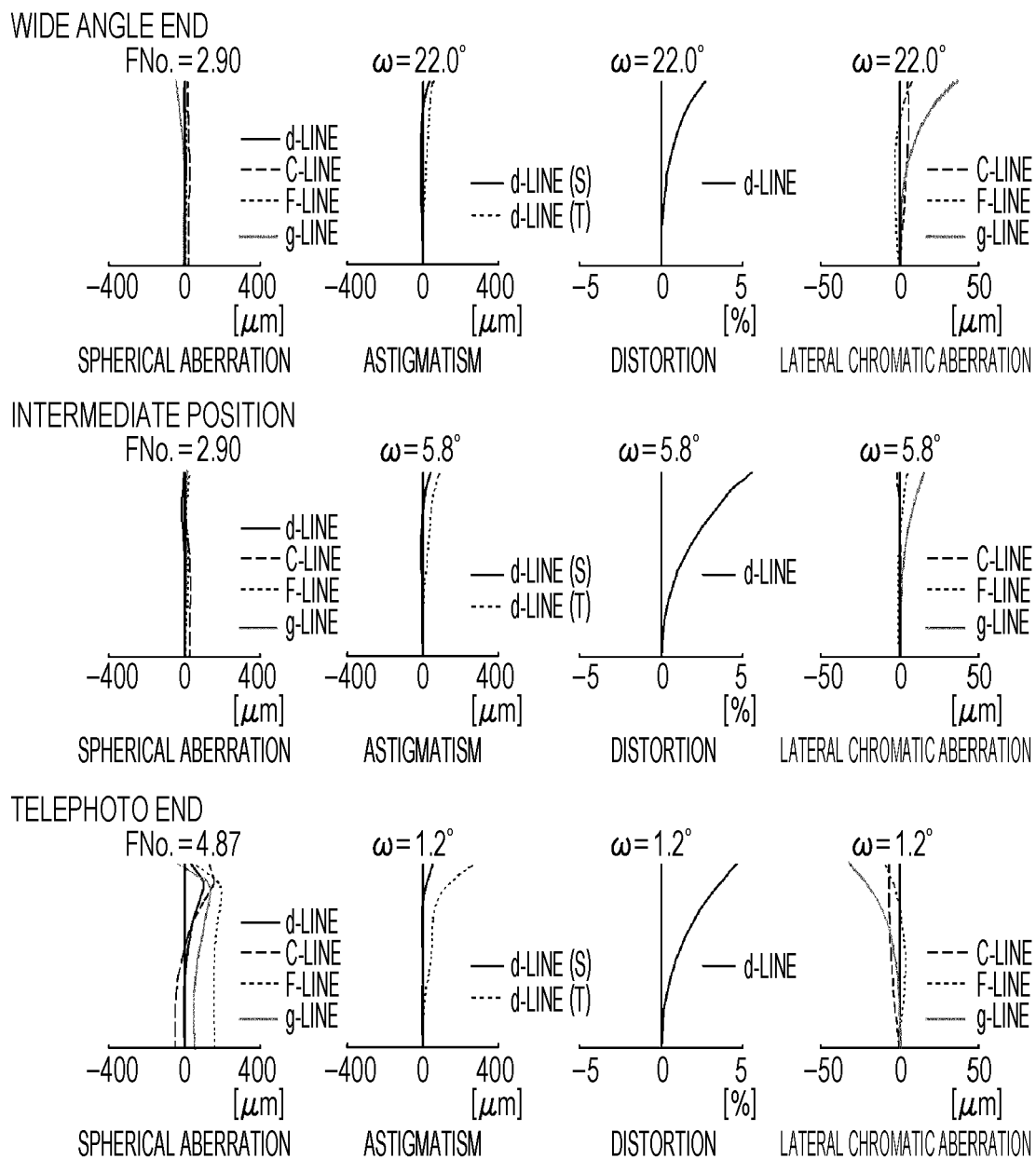
FIG. 19 provides aberration diagrams of the zoom lens according to Example 8 of the invention.

A zoom lens according to Example 8 is described next. FIG. 8 provides cross-sectional views illustrating a lens configuration of the zoom lens according to Example 8. The zoom lens according to Example 8 has the same lens number configuration as that of the zoom lens according to Example 4. Table 29 shows basic lens data of the zoom lens according to Example 8, Table 30 shows data relating to specifications, Table 31 shows data relating to surface distances that change, and Table 32 shows data relating to aspherical coefficients. FIG. 19 shows aberrations.

TABLE 29

Example 8, lens data (nd, νd for d-line)

| Surface number | Curvature radius | Surface distance | nd | νd | θgF |
|---|---|---|---|---|---|
| 1 | 3419.25761 | 4.400 | 1.88300 | 40.76 | 0.56679 |
| 2 | 268.72262 | 22.500 | | | |
| 3 | −325.39718 | 4.400 | 1.65113 | 55.89 | 0.54672 |
| 4 | 849.27595 | 1.590 | | | |
| 5 | 554.83719 | 12.404 | 1.84139 | 24.56 | 0.61274 |
| 6 | −772.13620 | 2.583 | | | |
| 7 | 2822.49348 | 7.230 | 1.54072 | 47.23 | 0.56511 |
| 8 | 349.62856 | 25.000 | 1.43875 | 94.94 | 0.53433 |
| 9 | −324.61950 | 37.610 | | | |
| 10 | 342.27383 | 13.390 | 1.69400 | 56.29 | 0.54506 |
| 11 | ∞ | 1.200 | | | |
| 12 | 221.03333 | 18.892 | 1.43387 | 95.18 | 0.53733 |
| 13 | 3787.89946 | 0.150 | | | |
| 14 | 296.51832 | 7.228 | 1.69895 | 30.05 | 0.60290 |
| 15 | 125.50723 | 27.114 | 1.43875 | 94.94 | 0.53433 |
| 16 | 1067.28694 | 1.925 | | | |
| 17 | 160.13272 | 13.806 | 1.49700 | 81.54 | 0.53748 |
| 18 | 439.05795 | DD [18] | | | |
| 19 | 2935.50028 | 2.539 | 1.71299 | 53.87 | 0.54587 |
| 20 | 61.35000 | 10.412 | | | |
| 21 | −282.10249 | 1.820 | 1.83481 | 42.72 | 0.56486 |
| 22 | 216.47851 | 1.663 | 1.84139 | 24.56 | 0.61274 |
| 23 | 266.36370 | 5.213 | | | |
| 24 | −160.05160 | 2.032 | 1.49700 | 81.54 | 0.53748 |
| 25 | 96.07282 | 8.233 | 1.78472 | 25.68 | 0.61621 |
| 26 | −320.14787 | 5.500 | | | |
| 27 | −89.66922 | 2.000 | 1.43875 | 94.94 | 0.53433 |
| 28 | −1822.66535 | DD [28] | | | |
| 29 | 819.89128 | 7.442 | 1.43875 | 94.66 | 0.53402 |
| 30 | −159.42426 | 0.125 | | | |
| 31 | −1769.47221 | 9.550 | 1.43875 | 94.66 | 0.53402 |
| 32 | −99.13897 | 3.000 | 1.80000 | 29.84 | 0.60178 |
| 33 | −145.00629 | DD [33] | | | |
| 34 | 329.57600 | 4.000 | 1.80000 | 29.84 | 0.60178 |
| 35 | 207.75429 | 6.202 | 1.43875 | 94.66 | 0.53402 |
| 36 | −1286.25470 | 0.757 | | | |
| 37 | 193.19837 | 9.750 | 1.43875 | 94.66 | 0.53402 |
| *38 | −747.54203 | DD [38] | | | |
| 39 (diaphragm) | ∞ | 7.178 | | | |
| 40 | −150.83111 | 1.520 | 1.83481 | 42.72 | 0.56486 |
| 41 | 1285.21087 | 2.578 | 1.84139 | 24.56 | 0.61274 |
| 42 | −402.71362 | 0.200 | | | |
| 43 | 75.19456 | 4.658 | 1.56384 | 60.83 | 0.54082 |
| 44 | 233.70941 | 33.600 | | | |
| 45 | −3742.13758 | 2.416 | 1.80610 | 33.27 | 0.58845 |
| 46 | 103.10491 | 3.370 | | | |
| 47 | −184.64656 | 2.369 | 1.95906 | 17.47 | 0.65993 |
| 48 | −91.36101 | 15.145 | | | |
| 49 | 49.98841 | 4.815 | 1.77250 | 49.62 | 0.55186 |

TABLE 29-continued

Example 8, lens data (nd, νd for d-line)

| Surface number | Curvature radius | Surface distance | nd | νd | θgF |
|---|---|---|---|---|---|
| 50 | −111.26701 | 1.360 | 1.53172 | 48.84 | 0.56558 |
| 51 | 36.04071 | 4.796 | | | |
| 52 | −1102.24855 | 3.551 | 1.63854 | 55.38 | 0.54858 |
| 53 | −38.37127 | 1.000 | 1.95375 | 32.32 | 0.59015 |
| 54 | 91.96782 | 25.244 | | | |
| 55 | 84.97889 | 4.905 | 1.84139 | 24.56 | 0.61274 |
| 56 | −116.46246 | 1.178 | | | |
| 57 | −334.60113 | 4.613 | 1.51200 | 52.12 | 0.56018 |
| 58 | 23.51602 | 17.561 | 1.49700 | 81.54 | 0.53748 |
| 59 | 32.71339 | 2.339 | | | |
| 60 | 50.00026 | 10.184 | 1.49700 | 81.54 | 0.53748 |
| 61 | −35.25465 | 1.200 | 2.00100 | 29.13 | 0.59952 |
| 62 | −170.98964 | 1.561 | | | |
| 63 | 79.30993 | 6.391 | 1.51742 | 52.43 | 0.55649 |
| 64 | −57.85791 | 2.000 | | | |
| 65 | ∞ | 1.500 | 1.51633 | 64.14 | 0.53531 |
| 66 | ∞ | 0.000 | | | |
| 67 | ∞ | 3.690 | 1.51633 | 64.05 | 0.53463 |
| 68 | ∞ | 33.445 | | | |

TABLE 30

Example 8, specifications (d-line)

| | Wide angle end | Intermediate position | Telephoto end |
|---|---|---|---|
| Zoom magnification | 1.0 | 3.8 | 19.6 |
| f | 34.588 | 132.820 | 677.934 |
| FNo. | 2.90 | 2.90 | 4.87 |
| 2ω[°] | 44.0 | 11.6 | 2.4 |

TABLE 31

Example 8, zoom distance

| | Wide angle end | Intermediate position | Telephoto end |
|---|---|---|---|
| DD [18] | 5.628 | 82.422 | 114.895 |
| DD [28] | 240.928 | 131.248 | 4.160 |
| DD [33] | 34.219 | 23.606 | 2.072 |
| DD [38] | 2.586 | 46.085 | 162.234 |

TABLE 32

Example 8, aspherical coefficient

| Surface number | 38 |
|---|---|
| KA | 1.0000000E+00 |
| A3 | 0.0000000E+00 |
| A4 | 4.9456135E−09 |
| A5 | 2.3747287E−10 |
| A6 | −1.9805341E−11 |
| A7 | −3.1856119E−13 |
| A8 | 1.9296610E−13 |
| A9 | −1.6150477E−14 |
| A10 | 5.7506215E−16 |
| A11 | −7.9406340E−18 |
| A12 | 4.5796409E−20 |
| A13 | −4.6008535E−21 |
| A14 | 1.8723305E−22 |
| A15 | −2.6908389E−24 |
| A16 | 1.2982256E−26 |

Figure 9:
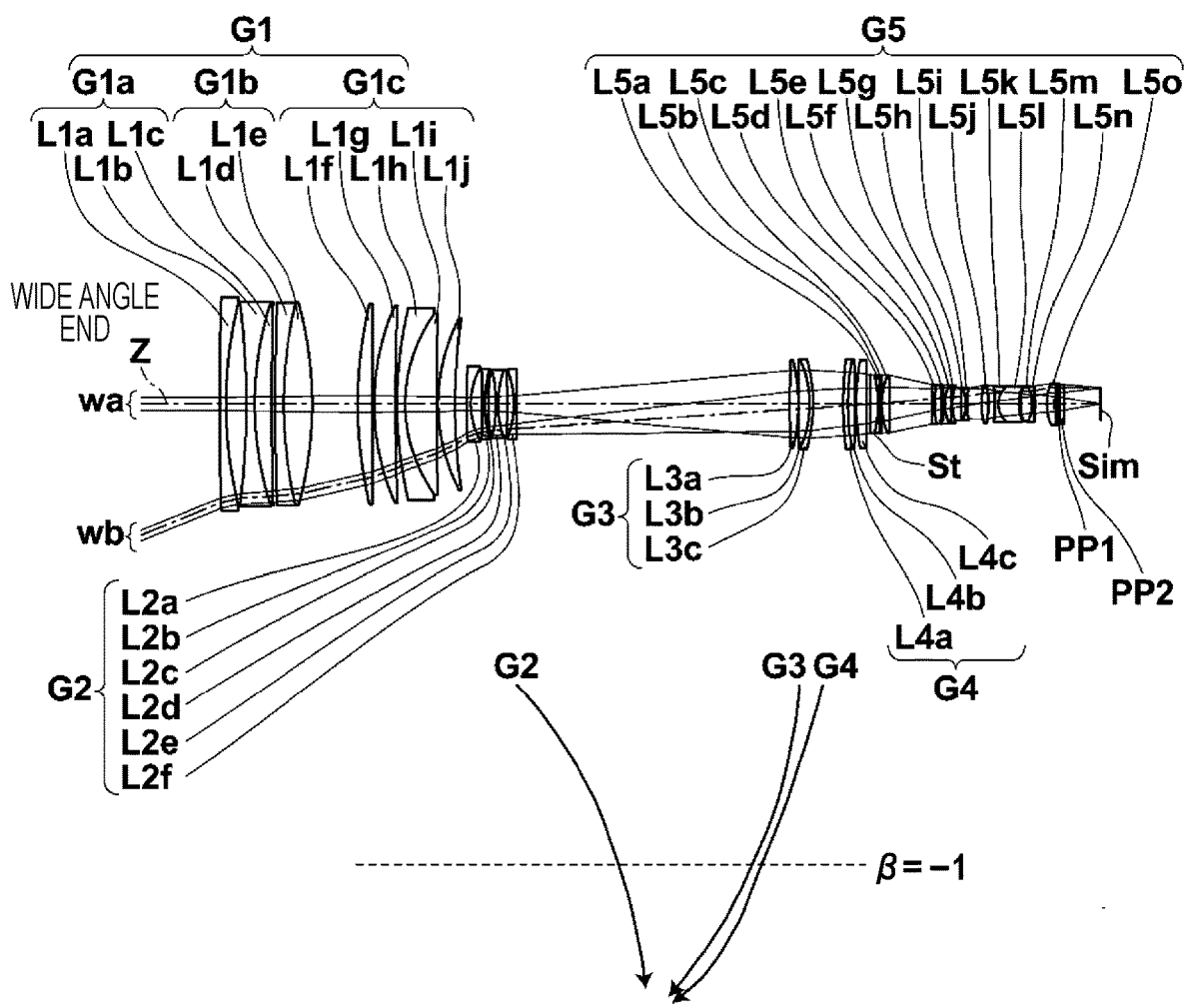
FIG. 9 provides cross-sectional views illustrating a lens configuration of a zoom lens according to Example 9 of the invention.
Figure 9:
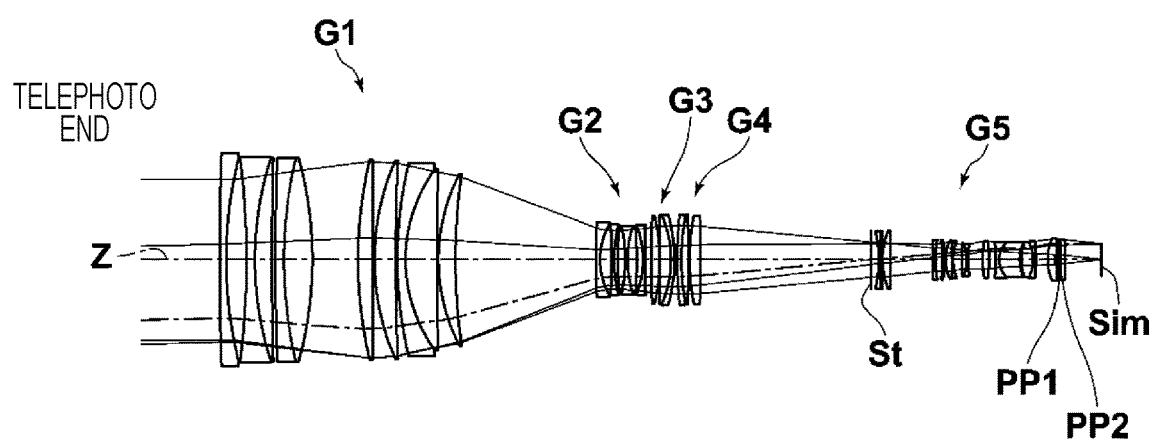
Figure 20:
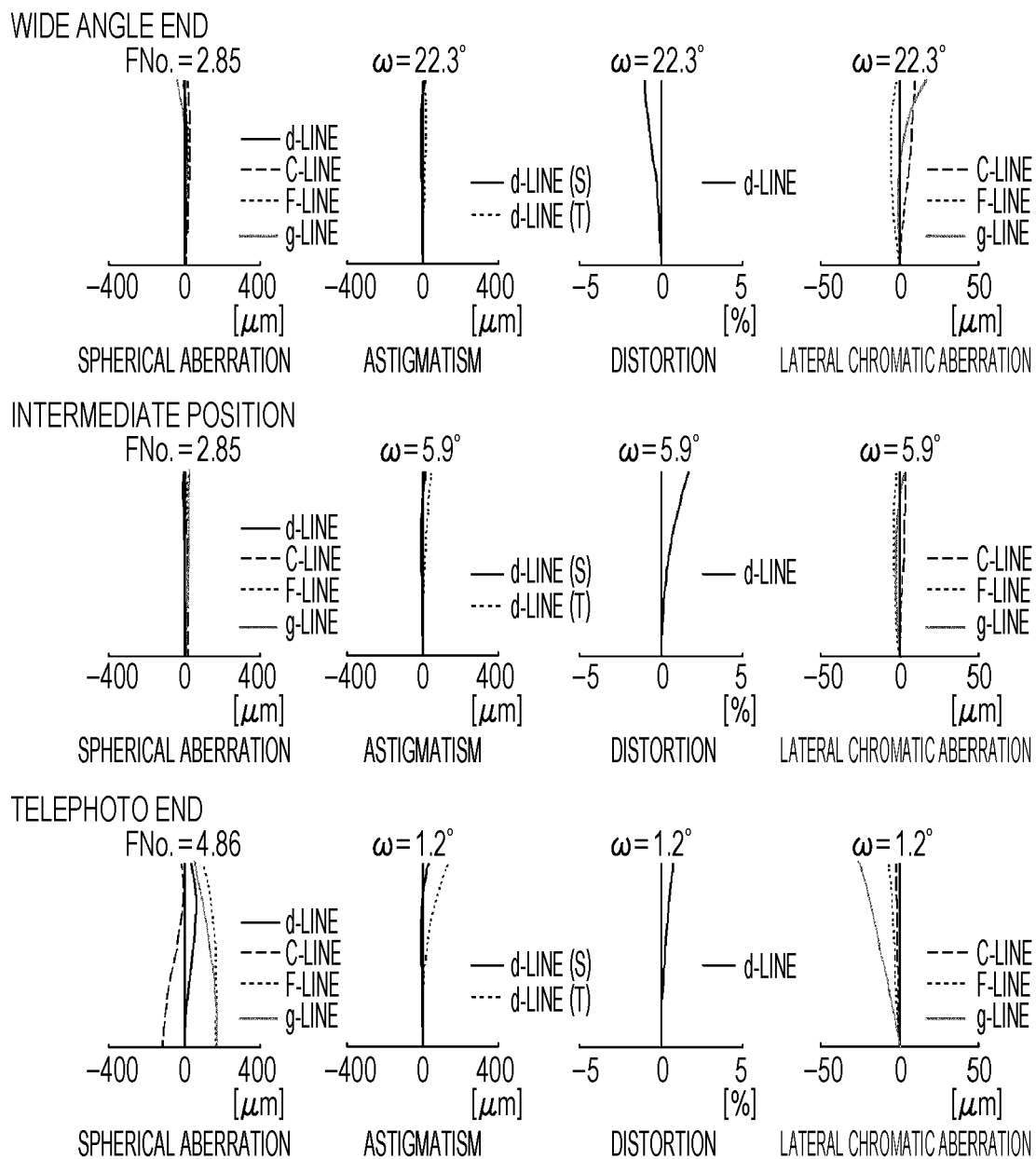
FIG. 20 provides aberration diagrams of the zoom lens according to Example 9 of the invention.

A zoom lens according to Example 9 is described next. FIG. 9 provides cross-sectional views illustrating a lens configuration of the zoom lens according to Example 9. The zoom lens according to Example 9 has the same lens number configuration as that of the zoom lens according to Example 4. Table 33 shows basic lens data of the zoom lens according to Example 9, Table 34 shows data relating to specifications, Table 35 shows data relating to surface distances that change, and Table 36 shows data relating to aspherical coefficients. FIG. 20 shows aberrations.

TABLE 33

| Example 9, lens data (nd, vd for d-line) | | | | | |
|---|---|---|---|---|---|
| Surface number | Curvature radius | Surface distance | nd | vd | θgF |
| 1 | 2717.73485 | 5.700 | 1.88300 | 40.76 | 0.56679 |
| 2 | 380.86224 | 17.798 | | | |
| 3 | −726.84477 | 7.258 | 1.77250 | 49.60 | 0.55212 |
| 4 | 292.30100 | 15.088 | 1.84139 | 24.56 | 0.61274 |
| 5 | 3628.20361 | 2.930 | | | |
| 6 | 2431.82575 | 7.530 | 1.54072 | 47.23 | 0.56511 |
| 7 | 371.94500 | 25.499 | 1.43875 | 94.94 | 0.53433 |
| 8 | −340.46372 | 40.037 | | | |
| 9 | 396.43767 | 12.437 | 1.77250 | 49.60 | 0.55212 |
| 10 | ∞ | 1.767 | | | |
| 11 | 219.67124 | 18.668 | 1.43387 | 95.18 | 0.53733 |
| 12 | 2215.77255 | 1.371 | | | |
| 13 | 369.04550 | 7.283 | 1.69895 | 30.13 | 0.60298 |
| 14 | 138.62300 | 27.558 | 1.43875 | 94.94 | 0.53433 |
| 15 | 3628.23215 | 1.114 | | | |
| 16 | 165.94924 | 15.000 | 1.49700 | 81.54 | 0.53748 |
| 17 | 529.27566 | DD [17] | | | |
| 18 | 1907.28239 | 3.250 | 1.69400 | 56.29 | 0.54506 |
| 19 | 65.14127 | 10.408 | | | |
| 20 | −551.87594 | 2.089 | 1.83481 | 42.72 | 0.56486 |
| 21 | 133.34200 | 3.000 | 1.84139 | 24.56 | 0.61274 |
| 22 | 225.37347 | 6.588 | | | |
| 23 | −142.82782 | 2.108 | 1.49700 | 81.54 | 0.53748 |
| 24 | 97.56200 | 8.061 | 1.75520 | 27.51 | 0.61033 |
| 25 | −346.22505 | 5.500 | | | |
| 26 | −88.09661 | 2.000 | 1.43875 | 94.94 | 0.53433 |
| 27 | 2023.15419 | DD [27] | | | |
| 28 | 764.60970 | 7.656 | 1.43875 | 94.66 | 0.53402 |
| 29 | −160.39950 | 0.125 | | | |
| 30 | −2955.12791 | 9.628 | 1.43875 | 94.66 | 0.53402 |
| 31 | −101.71700 | 3.000 | 1.80000 | 29.84 | 0.60178 |
| 32 | −149.23719 | DD [32] | | | |
| 33 | 343.80179 | 4.000 | 1.80000 | 29.84 | 0.60178 |
| 34 | 215.03300 | 6.274 | 1.43875 | 94.66 | 0.53402 |
| 35 | −950.99135 | 0.757 | | | |
| 36 | 207.51344 | 9.750 | 1.43875 | 94.66 | 0.53402 |
| *37 | −945.77432 | DD [37] | | | |
| 38 (diaphragm) | ∞ | 6.570 | | | |
| 39 | −121.16239 | 1.520 | 1.83481 | 42.72 | 0.56486 |
| 40 | 890.64800 | 1.744 | 1.84139 | 24.56 | 0.61274 |
| 41 | 2481.54127 | 0.201 | | | |
| 42 | 71.95464 | 6.910 | 1.56883 | 56.04 | 0.54853 |
| 43 | −783.03743 | 37.160 | | | |
| 44 | −3949.97334 | 2.001 | 1.91100 | 35.22 | 0.58360 |
| 45 | 79.02038 | 6.315 | | | |
| 46 | −136.72834 | 2.364 | 1.94595 | 17.98 | 0.65460 |
| 47 | −84.05991 | 0.300 | | | |
| 48 | 39.78194 | 5.517 | 1.74950 | 35.28 | 0.58704 |
| 49 | −605.08400 | 1.211 | 1.53172 | 48.84 | 0.56558 |
| 50 | 43.19462 | 7.880 | | | |
| 51 | 471.91802 | 4.027 | 1.67790 | 55.34 | 0.54726 |
| 52 | −43.48600 | 1.001 | 1.91100 | 35.22 | 0.58360 |
| 53 | 72.66977 | 12.993 | | | |
| 54 | 88.25253 | 5.643 | 1.84139 | 24.56 | 0.61274 |
| 55 | −114.64819 | 5.753 | | | |
| 56 | −169.31860 | 2.927 | 1.51200 | 52.12 | 0.56018 |
| 57 | 21.49700 | 17.948 | 1.49700 | 81.54 | 0.53748 |
| 58 | 39.43278 | 1.615 | | | |
| 59 | 46.61676 | 10.195 | 1.49700 | 81.54 | 0.53748 |
| 60 | −35.78600 | 2.572 | 2.00069 | 25.46 | 0.61364 |
| 61 | −180.29164 | 10.205 | | | |
| 62 | 48.67158 | 7.159 | 1.75550 | 45.59 | 0.55875 |
| 63 | 239.34644 | 2.000 | | | |
| 64 | ∞ | 1.500 | 1.51633 | 64.14 | 0.53531 |
| 65 | ∞ | 0.000 | | | |
| 66 | ∞ | 3.690 | 1.51633 | 64.14 | 0.53531 |
| 67 | ∞ | 32.404 | | | |

TABLE 34

Example 9, specifications (d-line)

|  | Wide angle end | Intermediate position | Telephoto end |
|---|---|---|---|
| Zoom magnification | 1.0 | 3.8 | 19.6 |
| f | 35.351 | 135.746 | 692.872 |
| FNo. | 2.85 | 2.85 | 4.86 |
| 2ω[°] | 44.6 | 11.8 | 2.4 |

TABLE 35

Example 9, zoom distance

|  | Wide angle end | Intermediate position | Telephoto end |
|---|---|---|---|
| DD [17] | 10.362 | 89.256 | 123.753 |
| DD [27] | 240.405 | 133.295 | 5.060 |
| DD [32] | 26.561 | 10.750 | 2.240 |
| DD [37] | 3.448 | 47.476 | 149.724 |

TABLE 36

Example 9, aspherical coefficient

| Surface number | 37 |
|---|---|
| KA | 1.0000000E+00 |
| A3 | 0.0000000E+00 |
| A4 | 4.6291418E−09 |
| A5 | −2.5245283E−11 |
| A6 | 1.8599768E−12 |
| A7 | −1.8274275E−13 |
| A8 | 1.2282884E−15 |
| A9 | 4.1929562E−16 |
| A10 | −9.0843634E−18 |
| A11 | −2.8977192E−19 |
| A12 | 2.0924759E−21 |
| A13 | 3.7948885E−22 |
| A14 | −4.1745995E−24 |
| A15 | −1.3050865E−25 |
| A16 | 1.9473717E−27 |

Figure 10:
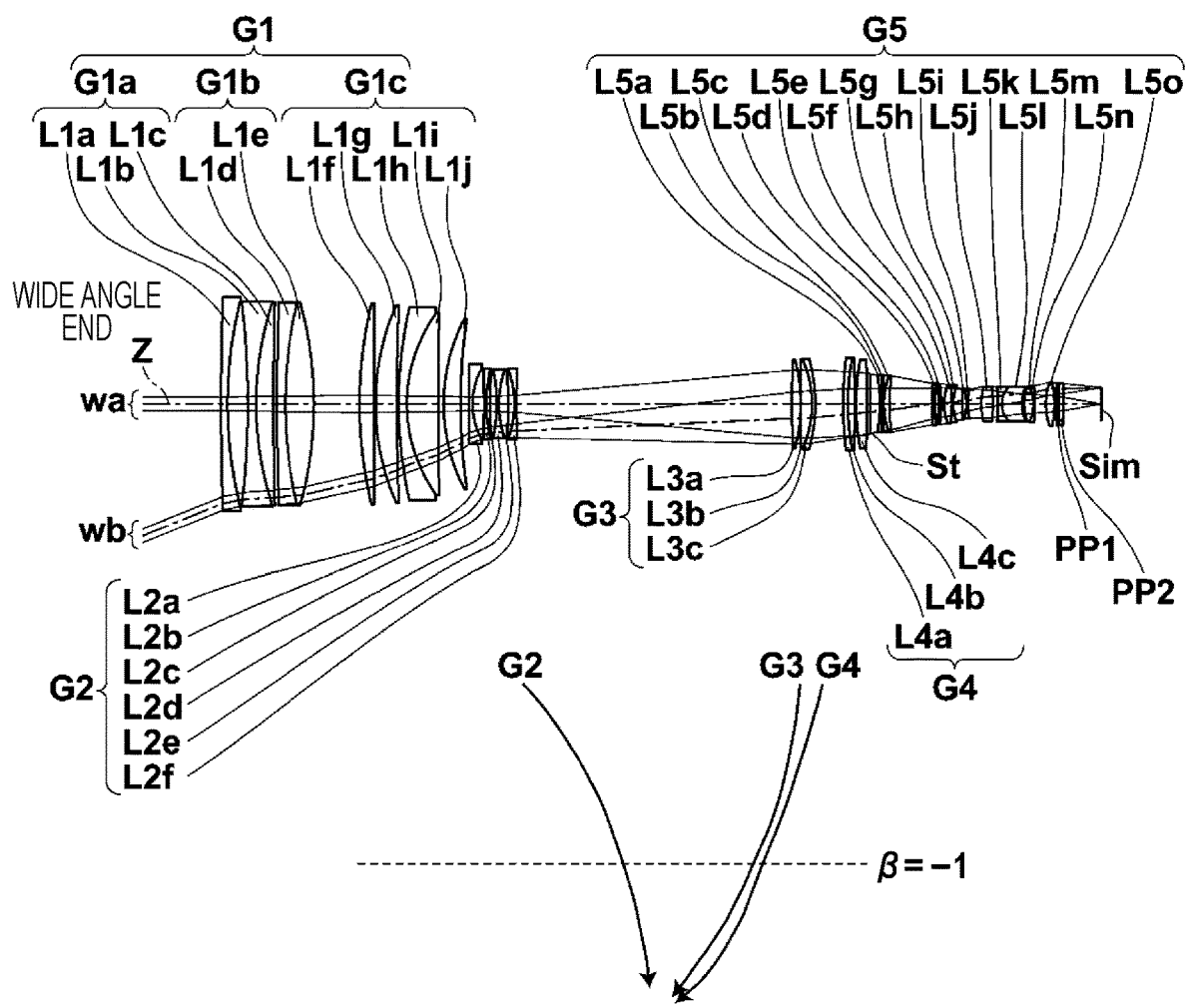
FIG. 10 provides cross-sectional views illustrating a lens configuration of a zoom lens according to Example 10 of the invention.
Figure 10:
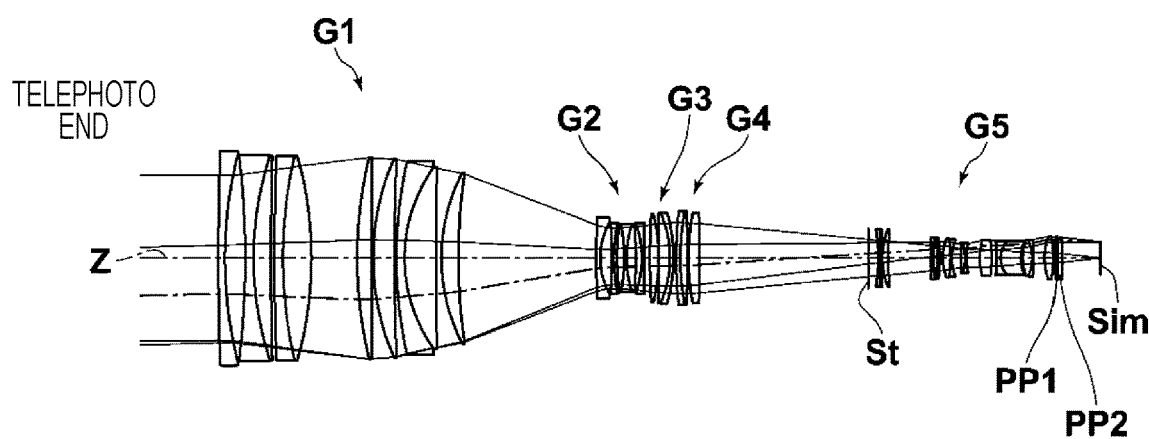
Figure 21:
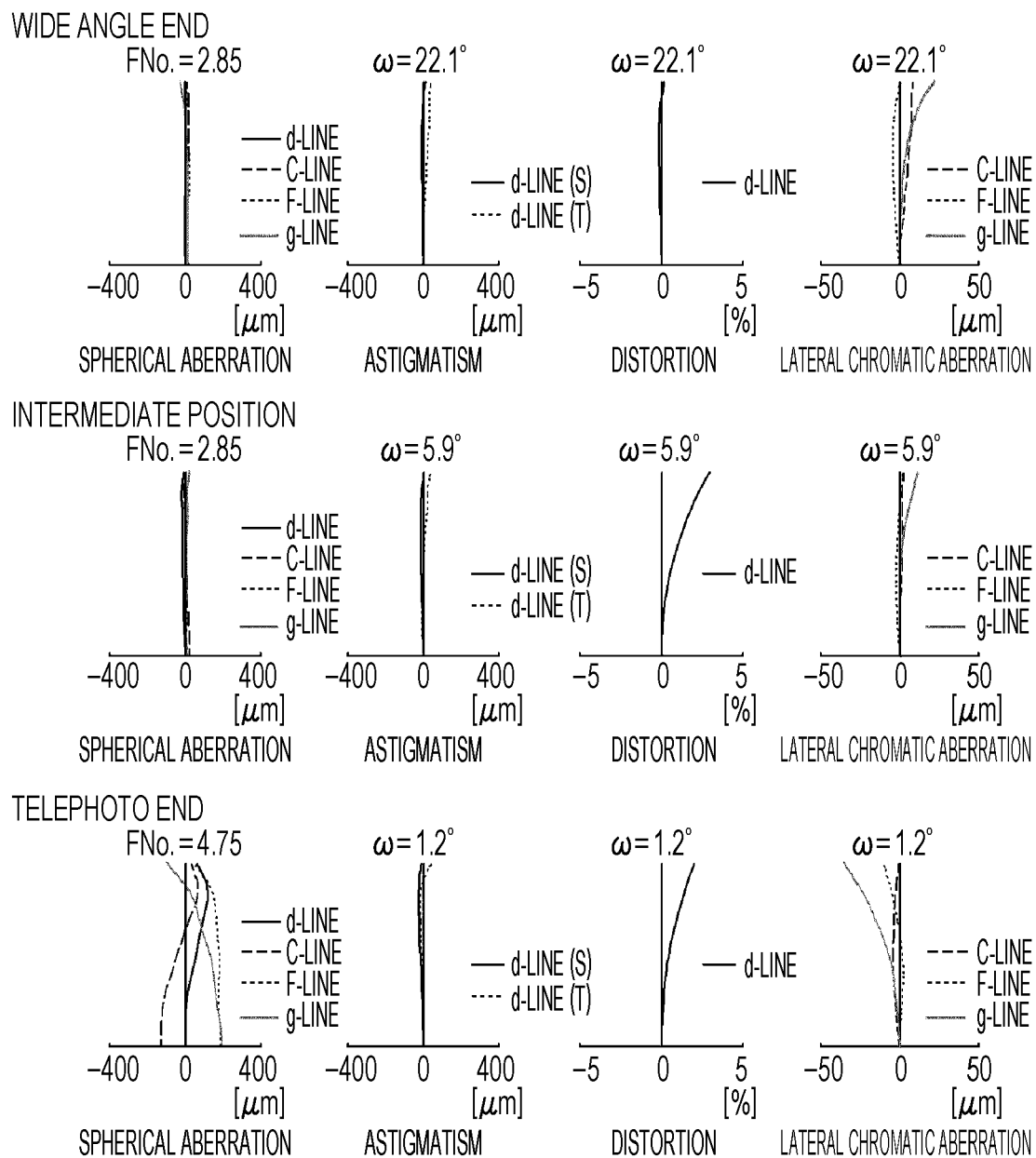
FIG. 21 provides aberration diagrams of the zoom lens according to Example 10 of the invention.

A zoom lens according to Example 10 is described next. FIG. 10 provides cross-sectional views illustrating a lens configuration of the zoom lens according to Example 10. The zoom lens according to Example 10 has the same lens number configuration as that of the zoom lens according to Example 4. Table 37 shows basic lens data of the zoom lens according to Example 10, Table 38 shows data relating to specifications, Table 39 shows data relating to surface distances that change, and Table 40 shows data relating to aspherical coefficients. FIG. 21 shows aberrations.

TABLE 37

Example 10, lens data (nd, νd for d-line)

| Surface number | Curvature radius | Surface distance | nd | νd | θgF |
|---|---|---|---|---|---|
| 1 | 2821.04454 | 5.700 | 1.88300 | 40.76 | 0.56679 |
| 2 | 381.28602 | 17.714 |  |  |  |
| 3 | −749.98024 | 7.258 | 1.77250 | 49.60 | 0.55212 |
| 4 | 287.45401 | 15.400 | 1.84139 | 24.56 | 0.61274 |
| 5 | 3786.57187 | 3.037 |  |  |  |
| 6 | 2684.13160 | 7.258 | 1.54072 | 47.23 | 0.56511 |
| 7 | 375.07381 | 25.623 | 1.43875 | 94.94 | 0.53433 |
| 8 | −336.45223 | 40.110 |  |  |  |
| 9 | 387.29043 | 12.707 | 1.77250 | 49.60 | 0.55212 |
| 10 | ∞ | 1.200 |  |  |  |
| 11 | 218.89802 | 18.721 | 1.43387 | 95.18 | 0.53733 |
| 12 | 2189.41419 | 1.633 |  |  |  |
| 13 | 390.73134 | 7.280 | 1.69895 | 30.13 | 0.60298 |
| 14 | 138.96143 | 27.412 | 1.43875 | 94.94 | 0.53433 |
| 15 | 3635.93962 | 4.732 |  |  |  |
| 16 | 163.67600 | 15.000 | 1.49700 | 81.54 | 0.53748 |
| 17 | 526.91202 | DD [17] |  |  |  |
| 18 | 2249.39184 | 3.250 | 1.69400 | 56.29 | 0.54506 |
| 19 | 65.53556 | 10.119 |  |  |  |
| 20 | −549.71572 | 1.820 | 1.83481 | 42.72 | 0.56486 |
| 21 | 133.34592 | 3.000 | 1.84139 | 24.56 | 0.61274 |
| 22 | 229.66815 | 6.263 |  |  |  |
| 23 | −144.76978 | 2.032 | 1.49700 | 81.54 | 0.53748 |
| 24 | 96.97187 | 7.943 | 1.75520 | 27.51 | 0.61033 |
| 25 | −349.60908 | 5.500 |  |  |  |
| 26 | −88.00025 | 2.000 | 1.43875 | 94.94 | 0.53433 |
| 27 | 1998.83442 | DD [27] |  |  |  |
| 28 | 760.48326 | 7.677 | 1.43875 | 94.66 | 0.53402 |
| 29 | −159.54485 | 0.125 |  |  |  |
| 30 | −2858.23392 | 9.662 | 1.43875 | 94.66 | 0.53402 |
| 31 | −101.02816 | 3.000 | 1.80000 | 29.84 | 0.60178 |
| 32 | −149.81389 | DD [32] |  |  |  |
| 33 | 340.11532 | 4.000 | 1.80000 | 29.84 | 0.60178 |
| 34 | 219.50376 | 6.260 | 1.43875 | 94.66 | 0.53402 |
| 35 | −907.02141 | 0.810 |  |  |  |
| 36 | 211.78810 | 9.785 | 1.43875 | 94.66 | 0.53402 |
| *37 | −1035.82026 | DD [37] |  |  |  |
| 38 (diaphragm) | ∞ | 8.841 |  |  |  |
| 39 | −154.31467 | 1.520 | 1.83481 | 42.72 | 0.56486 |
| 40 | 866.36903 | 1.894 | 1.84139 | 24.56 | 0.61274 |

TABLE 37-continued

Example 10, lens data (nd, νd for d-line)

| Surface number | Curvature radius | Surface distance | nd | νd | θgF |
|---|---|---|---|---|---|
| 41 | ∞ | 0.200 | | | |
| 42 | 70.46066 | 5.210 | 1.57250 | 57.74 | 0.54568 |
| 43 | 249.98594 | 37.750 | | | |
| 44 | −1045.94314 | 2.023 | 1.88100 | 40.14 | 0.57010 |
| 45 | 126.19585 | 3.026 | | | |
| 46 | −249.99766 | 2.482 | 1.95906 | 17.47 | 0.65993 |
| 47 | −106.36791 | 2.508 | | | |
| 48 | 46.20707 | 6.695 | 1.78800 | 47.37 | 0.55598 |
| 49 | −137.32023 | 1.265 | 1.51200 | 52.12 | 0.56018 |
| 50 | 40.99770 | 7.881 | | | |
| 51 | −3794.31214 | 3.748 | 1.66999 | 51.72 | 0.55362 |
| 52 | −44.84376 | 1.102 | 1.95375 | 32.32 | 0.59015 |
| 53 | 62.98844 | 12.025 | | | |
| 54 | 72.84718 | 9.864 | 1.84139 | 24.56 | 0.61274 |
| 55 | −141.37310 | 4.543 | | | |
| 56 | −127.87204 | 3.368 | 1.51200 | 52.12 | 0.56018 |
| 57 | 21.05592 | 17.703 | 1.49700 | 81.54 | 0.53748 |
| 58 | 34.99882 | 2.028 | | | |
| 59 | 50.00097 | 8.232 | 1.49700 | 81.54 | 0.53748 |
| 60 | −36.26075 | 1.300 | 2.00100 | 29.13 | 0.59952 |
| 61 | −139.97480 | 9.510 | | | |
| 62 | 59.29004 | 7.408 | 1.61405 | 54.99 | 0.55092 |
| 63 | −118.86952 | 2.000 | | | |
| 64 | ∞ | 1.500 | 1.51633 | 64.14 | 0.53531 |
| 65 | ∞ | 0.000 | | | |
| 66 | ∞ | 3.690 | 1.51633 | 64.05 | 0.53463 |
| 67 | ∞ | 33.351 | | | |

TABLE 38

Example 10, specifications (d-line)

| | Wide angle end | Intermediate position | Telephoto end |
|---|---|---|---|
| Zoom magnification | 1.0 | 3.8 | 19.6 |
| f | 35.348 | 135.736 | 692.819 |
| FNo. | 2.85 | 2.85 | 4.75 |
| 2ω[°] | 44.2 | 11.8 | 2.4 |

TABLE 39

Example 10, zoom distance

| | Wide angle end | Intermediate position | Telephoto end |
|---|---|---|---|
| DD [17] | 7.230 | 87.035 | 121.397 |
| DD [27] | 241.996 | 135.033 | 4.977 |
| DD [32] | 24.645 | 8.820 | 2.229 |
| DD [37] | 2.753 | 45.735 | 148.020 |

TABLE 40

Example 10, aspherical coefficient

| Surface number | 37 |
|---|---|
| KA | 1.0000000E+00 |
| A3 | 0.0000000E+00 |
| A4 | 5.4418965E−09 |
| A5 | −2.8145484E−09 |
| A6 | 4.9748646E−10 |
| A7 | −3.8597730E−11 |
| A8 | 1.4954479E−12 |
| A9 | −2.9419974E−14 |
| A10 | 3.5436025E−16 |
| A11 | −1.8610537E−18 |
| A12 | −3.0741467E−19 |
| A13 | 9.2999539E−21 |
| A14 | 1.1878876E−22 |
| A15 | −7.1645004E−24 |
| A16 | 6.8958760E−26 |

Figure 11:
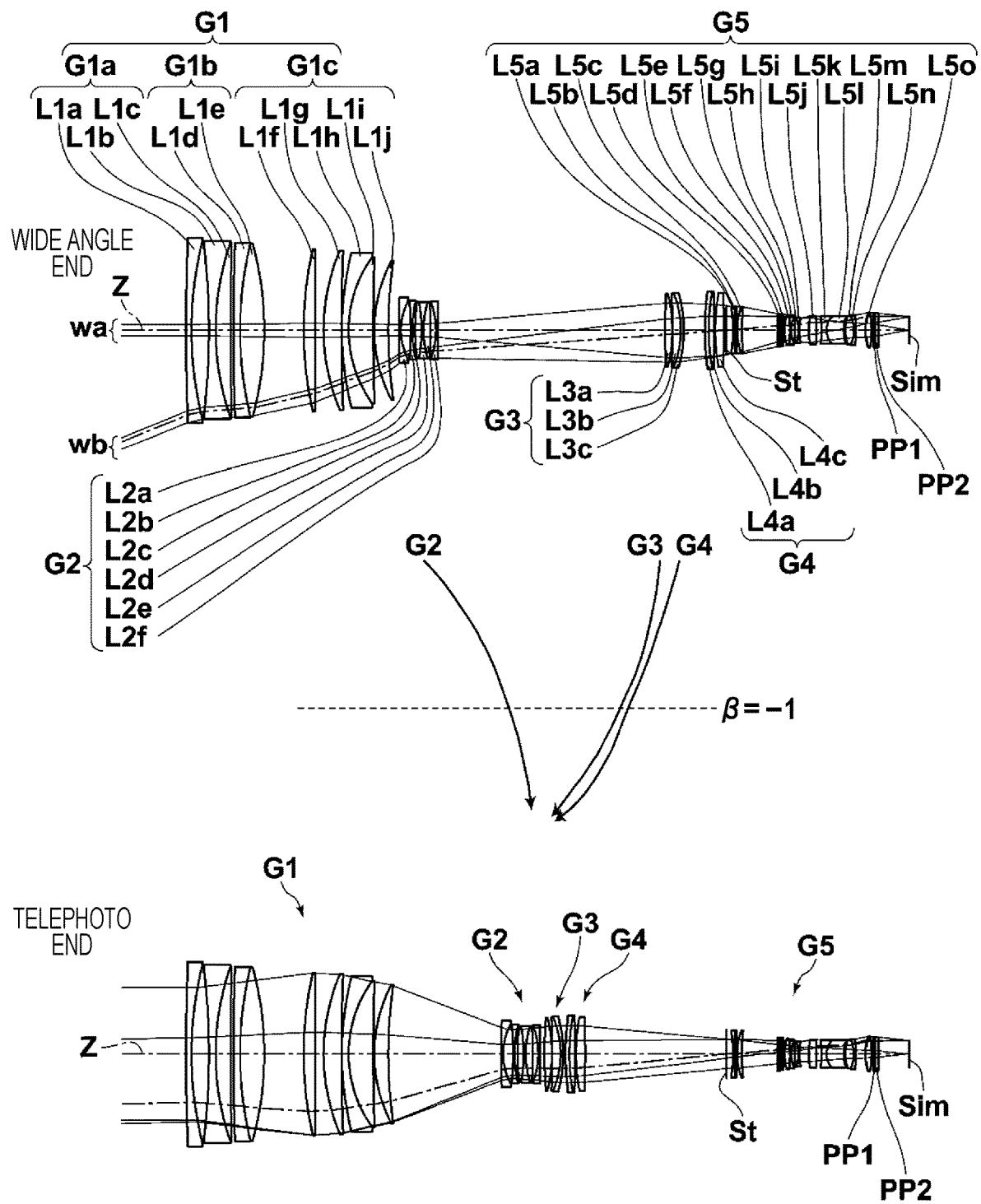
FIG. 11 provides cross-sectional views illustrating a lens configuration of a zoom lens according to Example 11 of the invention.
Figure 22:
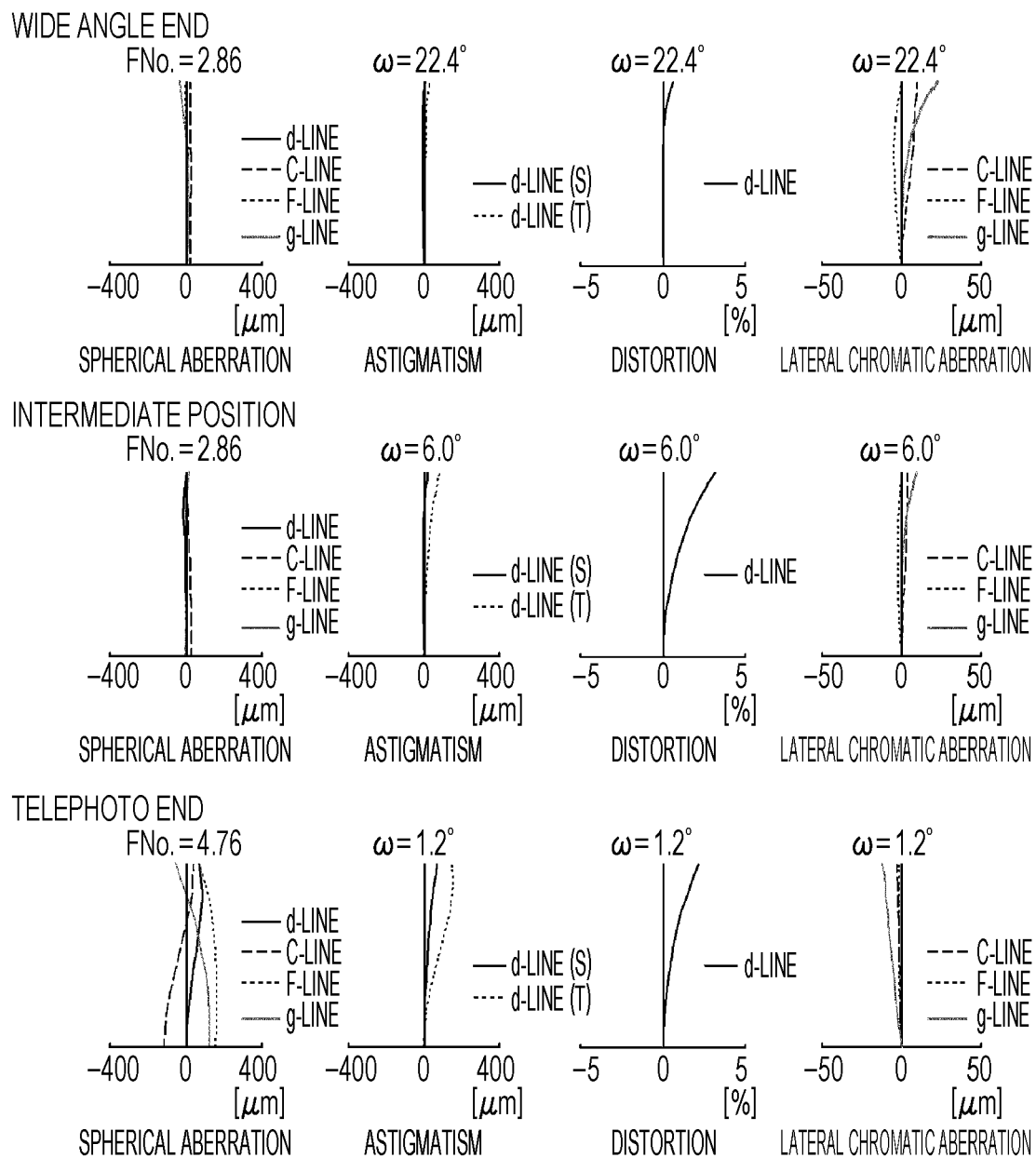
FIG. 22 provides aberration diagrams of the zoom lens according to Example 11 of the invention.

A zoom lens according to Example 11 is described next. FIG. 11 provides cross-sectional views illustrating a lens configuration of the zoom lens according to Example 11. The zoom lens according to Example 11 has the same lens number configuration as that of the zoom lens according to Example 4. Table 41 shows basic lens data of the zoom lens according to Example 11, Table 42 shows data relating to specifications, Table 43 shows data relating to surface distances that change, and Table 44 shows data relating to aspherical coefficients. FIG. 22 shows aberrations.

TABLE 41

Example 11, lens data (nd, νd for d-line)

| Surface number | Curvature radius | Surface distance | nd | νd | θgF |
|---|---|---|---|---|---|
| 1 | 2684.14212 | 5.700 | 1.88300 | 40.76 | 0.56679 |
| 2 | 395.27512 | 18.576 | | | |
| 3 | −792.78196 | 7.272 | 1.78518 | 49.48 | 0.55002 |

TABLE 41-continued

| Example 11, lens data (nd, vd for d-line) | | | | | |
|---|---|---|---|---|---|
| Surface number | Curvature radius | Surface distance | nd | vd | θgF |
| 4 | 289.89733 | 15.851 | 1.84139 | 24.56 | 0.61274 |
| 5 | 3638.26909 | 3.138 | | | |
| 6 | 2821.36273 | 7.336 | 1.54072 | 47.23 | 0.56511 |
| 7 | 391.43076 | 25.954 | 1.43875 | 94.94 | 0.53433 |
| 8 | −355.84946 | 41.986 | | | |
| 9 | 398.79061 | 11.899 | 1.74361 | 53.36 | 0.54499 |
| 10 | −22576.72445 | 9.288 | | | |
| 11 | 220.00226 | 19.259 | 1.43387 | 95.18 | 0.53733 |
| 12 | 2497.29073 | 0.191 | | | |
| 13 | 343.61911 | 7.228 | 1.69895 | 30.13 | 0.60298 |
| 14 | 135.93690 | 26.294 | 1.43875 | 94.94 | 0.53433 |
| 15 | 2296.14359 | 1.000 | | | |
| 16 | 161.44837 | 15.000 | 1.49700 | 81.54 | 0.53748 |
| 17 | 521.82401 | DD [17] | | | |
| 18 | 1234.67818 | 2.000 | 1.75233 | 52.76 | 0.54546 |
| 19 | 67.63069 | 10.347 | | | |
| 20 | −415.51840 | 1.833 | 1.83481 | 42.72 | 0.56486 |
| 21 | 139.22260 | 2.914 | 1.84139 | 24.56 | 0.61274 |
| 22 | 241.16621 | 6.927 | | | |
| 23 | −155.62015 | 2.067 | 1.49700 | 81.54 | 0.53748 |
| 24 | 106.46592 | 7.650 | 1.78062 | 25.97 | 0.60966 |
| 25 | −349.60438 | 5.500 | | | |
| 26 | −87.99877 | 2.000 | 1.43875 | 94.94 | 0.53433 |
| 27 | 2067.52418 | DD [27] | | | |
| 28 | 703.65478 | 7.710 | 1.43875 | 94.66 | 0.53402 |
| 29 | −161.39295 | 0.125 | | | |
| 30 | −1277.21106 | 9.111 | 1.43875 | 94.66 | 0.53402 |
| 31 | −102.96002 | 3.000 | 1.80000 | 29.84 | 0.60178 |
| 32 | −150.21585 | DD [32] | | | |
| 33 | 334.98142 | 4.000 | 1.80000 | 29.84 | 0.60178 |
| 34 | 212.22819 | 6.237 | 1.43875 | 94.66 | 0.53402 |
| 35 | −999.63269 | 0.757 | | | |
| 36 | 202.74653 | 9.750 | 1.43875 | 94.66 | 0.53402 |
| *37 | −964.81289 | DD [37] | | | |
| 38 (diaphragm) | ∞ | 7.119 | | | |
| 39 | −149.21456 | 1.520 | 1.83481 | 42.72 | 0.56486 |
| 40 | 645.75054 | 2.254 | 1.84139 | 24.56 | 0.61274 |
| 41 | −1165.98650 | 0.287 | | | |
| 42 | 69.74388 | 5.251 | 1.59066 | 61.51 | 0.54193 |
| 43 | 249.94345 | 37.751 | | | |
| 44 | −3787.62018 | 2.000 | 1.83353 | 39.15 | 0.57383 |
| 45 | 148.22854 | 2.680 | | | |
| 46 | −249.98962 | 2.422 | 1.95906 | 17.47 | 0.65993 |
| 47 | −105.12440 | 0.300 | | | |
| 48 | 49.46260 | 5.986 | 1.77838 | 49.81 | 0.54988 |
| 49 | −117.31813 | 1.222 | 1.51200 | 52.12 | 0.56018 |
| 50 | 38.12609 | 3.883 | | | |
| 51 | −3793.80471 | 3.965 | 1.65612 | 56.67 | 0.54632 |
| 52 | −43.73086 | 1.000 | 1.95375 | 32.32 | 0.59015 |
| 53 | 62.97157 | 9.757 | | | |
| 54 | 72.46573 | 8.521 | 1.84139 | 24.56 | 0.61274 |
| 55 | −153.89795 | 5.119 | | | |
| 56 | −131.77872 | 5.515 | 1.51200 | 52.12 | 0.56018 |
| 57 | 21.13542 | 18.000 | 1.49700 | 81.54 | 0.53748 |
| 58 | 34.98786 | 2.084 | | | |
| 59 | 49.99912 | 8.949 | 1.49700 | 81.54 | 0.53748 |
| 60 | −36.49976 | 2.260 | 2.00100 | 29.13 | 0.59952 |
| 61 | −139.97485 | 10.019 | | | |
| 62 | 64.23425 | 6.062 | 1.60862 | 44.87 | 0.56919 |
| 63 | −104.15702 | 2.000 | | | |
| 64 | ∞ | 1.500 | 1.51633 | 64.14 | 0.53531 |
| 65 | ∞ | 0.000 | | | |
| 66 | ∞ | 3.690 | 1.51633 | 64.05 | 0.53463 |
| 67 | ∞ | 33.067 | | | |

TABLE 42

Example 11, specifications (d-line)

|  | Wide angle end | Intermediate position | Telephoto end |
|---|---|---|---|
| Zoom magnification | 1.0 | 3.8 | 19.6 |
| f | 34.648 | 133.050 | 679.108 |
| FNo. | 2.86 | 2.86 | 4.76 |
| 2ω[°] | 44.8 | 12.0 | 2.4 |

TABLE 43

Example 11, zoom distance

|  | Wide angle end | Intermediate position | Telephoto end |
|---|---|---|---|
| DD [17] | 11.379 | 88.042 | 120.833 |
| DD [27] | 242.588 | 135.762 | 4.917 |
| DD [32] | 22.479 | 10.061 | 2.324 |
| DD [37] | 2.841 | 45.422 | 151.212 |

TABLE 44

Example 11, aspherical coefficient

| Surface number | 37 |
|---|---|
| KA | 1.0000000E+00 |
| A3 | 0.0000000E+00 |
| A4 | 1.0039594E−08 |
| A5 | −9.3566687E−10 |
| A6 | 1.4321577E−10 |
| A7 | −1.2520245E−11 |
| A8 | 5.7038314E−13 |
| A9 | −1.1557814E−14 |

TABLE 44-continued

Example 11, aspherical coefficient

| Surface number | 37 |
|---|---|
| A10 | 1.0973141E−16 |
| A11 | −7.8764284E−18 |
| A12 | 3.2779969E−19 |
| A13 | 3.7563202E−22 |
| A14 | −2.5604028E−22 |
| A15 | 5.0659680E−24 |
| A16 | −3.0804518E−26 |

Table 45 shows values corresponding to the conditional expressions (1) to (9) of the zoom lenses according to Examples 1 to 11. In all examples, the d-line is used as the reference wavelength. The values shown in Table 45 provided below are for the reference wavelength.

TABLE 45

| Expression No. | Conditional expression | Example 1 | Example 2 | Example 3 | Example 4 | Example 5 | Example 6 |
|---|---|---|---|---|---|---|---|
| (1) | (L1ar + L1bf)/(L1ar − L1bf) | −0.072 | −0.046 | −0.108 | −0.208 | −0.253 | −0.134 |
| (2) | d2/tt1 | 0.084 | 0.085 | 0.084 | 0.099 | 0.096 | 0.103 |
| (3) | f1/f2 | −4.353 | −4.380 | −4.421 | −4.185 | −4.184 | −4.214 |
| (4) | f1/f1a | −0.611 | −0.621 | −0.607 | −0.535 | −0.609 | −0.607 |
| (5) | f1/f1ab | −0.226 | −0.241 | −0.215 | −0.296 | −0.338 | −0.311 |
| (6) | f1c_vd_ave | 90.553 | 86.087 | 95.020 | 81.988 | 81.988 | 81.988 |
| (7) | f1/f1c | 1.014 | 1.025 | 1.011 | 1.037 | 1.060 | 1.042 |
| (8) | (L1avd + L1bvd)/2 − L1cvd | 23.530 | 23.530 | 23.530 | 23.770 | 23.770 | 23.770 |
| (9) | (L1br − L1cf)/(L1br + L1cf) | −0.020 | −0.021 | −0.020 | −0.034 | −0.028 | −0.028 |

| Expression No. | Conditional expression | Example 7 | Example 8 | Example 9 | Example 10 | Example 11 |
|---|---|---|---|---|---|---|
| (1) | (L1ar + L1bf)/(L1ar − L1bf) | −0.053 | −0.095 | −0.312 | −0.326 | −0.335 |
| (2) | d2/tt1 | 0.107 | 0.112 | 0.086 | 0.084 | 0.086 |
| (3) | f1/f2 | −4.207 | −3.986 | −4.257 | −4.229 | −4.185 |
| (4) | f1/f1a | −0.597 | −0.573 | −0.609 | −0.603 | −0.573 |
| (5) | f1/f1ab | −0.290 | −0.297 | −0.329 | −0.323 | −0.315 |
| (6) | f1c_vd_ave | 81.988 | 81.988 | 80.315 | 80.315 | 81.255 |
| (7) | f1/f1c | 1.026 | 1.012 | 1.069 | 1.064 | 1.052 |
| (8) | (L1avd + L1bvd)/2 − L1cvd | 23.770 | 23.770 | 20.620 | 20.620 | 20.560 |
| (9) | (L1br − L1cf)/(L1br + L1cf) | −0.021 | 0.210 | 0.000 | 0.000 | 0.000 |

Referring to the above data, it is found that all the zoom lenses according to Examples 1 to 11 are high-performance zoom lenses which satisfy the conditional expressions (1) to (9), which have high magnification of about 20, and whose aberrations have been properly corrected.

Figure 23:
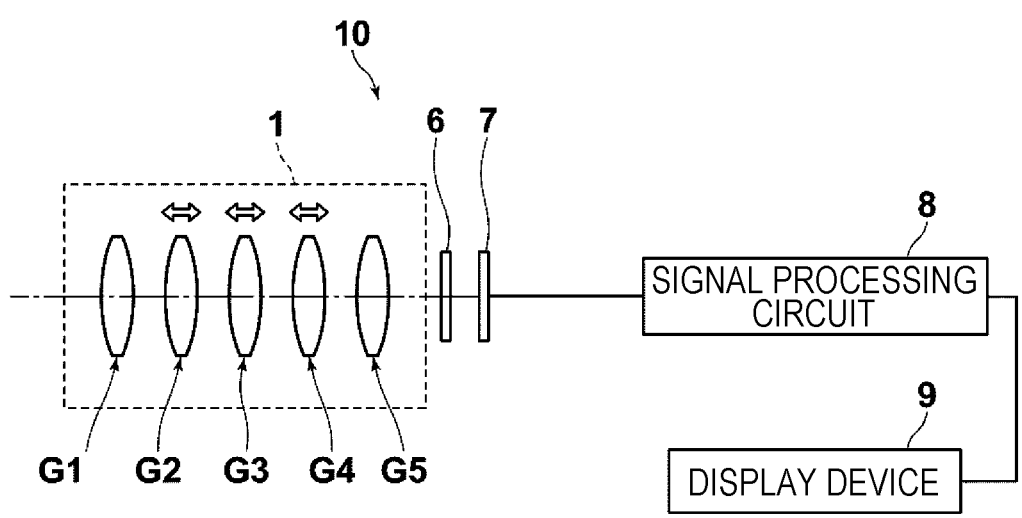
FIG. 23 is a brief configuration diagram of an imaging apparatus according to an embodiment of the invention.

An imaging apparatus according to an embodiment of the invention is described next. FIG. 23 is a schematic configuration diagram of an imaging apparatus using a zoom lens according to an embodiment of the invention, as an example of an imaging apparatus according to an embodiment of the invention. FIG. 23 schematically illustrates respective lens groups. The imaging apparatus may be, for example, a video camera or an electronic still camera including a solid-state imaging element, such as a charge coupled device (CCD) or a complementary metal oxide semiconductor (CMOS).

An imaging apparatus 10 illustrated in FIG. 23 includes a zoom lens 1, a filter 6 that is arranged on the image side of the zoom lens 1 and that has a function of a low pass filter or the like, an imaging element 7 arranged on the image side of the filter 6, and a signal processing circuit 8. The imaging element 7 is for converting an optical image formed by the zoom lens 1 into an electric signal. For example, CCD or CMOS can be used for the imaging element 7. The imaging element 7 is arranged such that an imaging surface of the imaging element 7 is aligned with the image surface of the zoom lens 1.

An image captured by the zoom lens 1 forms an image on the imaging surface of the imaging element 7, an output signal from the imaging element 7 relating to the image is arithmetically processed by the signal processing circuit 8, and the image is displayed on a display device 9.

Since the imaging apparatus 10 according to this embodiment includes the zoom lens 1 according to the invention, an image with high magnification and high image quality can be obtained.

While the invention has been described above by using the embodiments and examples; however, the invention is not limited to the embodiments and examples, and may be modified in various ways. For example, the values of curvature radius, surface distance, refractive index, and/or Abbe number of each lens are not limited to the values provided in each of the numerical examples, and may have other values.

REFERENCE SIGNS LIST 1 zoom lens
6 filter
7 imaging element
8 signal processing circuit
9 display device
10 imaging apparatus
G1 first lens group
G1a 1a lens group
G1b 1b lens group
G1c 1c lens group
G2 second lens group
G3 third lens group
G4 fourth lens group
G5 fifth lens group
PP1, PP2 optical member
L1a to L5o lens
Sim image surface
St aperture diaphragm
wa axial ray
wb ray at maximum angle of view
Z optical axis

What is claimed is:

1. A zoom lens, consisting of:
in order from an object side, a first lens group fixed relative to the image surface during zooming and having the positive refractive power, a second lens group being movable during zooming and having the negative refractive power, a third lens group being movable during zooming and having a positive refractive power, a fourth lens group being movable during zooming and having a positive refractive power, and a fifth lens group fixed relative to the image surface during zooming and having a positive refractive power,
wherein the second lens group, the third lens group, and the fourth lens group being movable by changing a distance in an optical-axis direction to an adjacent group during zooming,
wherein the first lens group has, continuously in order from the most object side, a first negative lens having a concave surface facing an image side, a second negative lens, and a third positive lens, and
wherein the following conditional expressions (1), (2), and (3) are satisfied $$-0.8 < (L1ar + L1bf)/(L1ar - L1bf) < -0.03 \quad (1),$$

$$0.04 < d2/tt1 < 0.13 \quad (2), \text{ and}$$

$$-10 < f1/f2 < -3 \quad (3),$$

where
L1ar is a curvature radius of a surface on an image side of the first negative lens,
L1bf is a curvature radius of a surface on the object side of the second negative lens,
d2 is a distance between the first negative lens and the second negative lens,
tt1 is a length on an optical axis of the first lens group,
f1 is a focal length for a d-line of the first lens group, and
f2 is a focal length for the d-line of the second lens group.

2. The zoom lens according to claim 1,
wherein the first lens group consists of, in order from the object side, a 1a lens group fixed relative to the image surface during focusing and having a negative refractive power, a 1b lens group being movable along the optical axis during focusing and having a positive refractive power, and a 1c lens group fixed relative to the image surface during focusing and having a positive refractive power, and
wherein the 1a lens group consists of three lenses.

3. The zoom lens according to claim 2,
wherein the following conditional expression (4) is satisfied $$-0.65 < f1/f1a < -0.5 \quad (4),$$

where
f1 is the focal length for the d-line of the first lens group, and
f1a is a focal length for the d-line of the 1a lens group.

4. The zoom lens according to claim 3,
wherein the following conditional expression (4-1) is satisfied $$-0.63 < f1/f1a < -0.52 \quad (4-1).$$

5. The zoom lens according to claim 2,
wherein the following conditional expression (5) is satisfied $$-0.4 < f1/f1ab < -0.2 \quad (5),$$

where
f1 is the focal length for the d-line of the first lens group, and
f1ab is a composite focal length for the d-line of the 1a lens group and the 1b lens group.

6. The zoom lens according to claim 5,
wherein the following conditional expression (5-1) is satisfied $$-0.36 < f1/f1ab < -0.21 \quad (5-1).$$

7. The zoom lens according to claim 2,
wherein the following conditional expression (6) is satisfied $$75 < f1c\_vd\_ave < 95.2 \quad (6),$$

where
f1$c$_vd_ave is an average value of Abbe numbers for the d-line of positive lenses included in the 1c lens group.

8. The zoom lens according to claim 7,
wherein the following conditional expression (6-1) is satisfied $$78 < f1c\_vd\_ave < 95.2 \quad (6\text{-}1).$$

9. The zoom lens according to claim 2,
wherein the following conditional expression (7) is satisfied $$0.95 < f1/f1c < 1.15 \quad (7),$$

where
f1 is the focal length for the d-line of the first lens group, and
f1$c$ is a focal length for the d-line of the 1c lens group.

10. The zoom lens according to claim 9,
wherein the following conditional expression (7-1) is satisfied $$1 < f1/f1c < 1.1 \quad (7\text{-}1).$$

11. The zoom lens according to claim 1,
wherein the following conditional expression (8) is satisfied $$15 < (L1avd + L1bvd)/2 - L1cvd < 29 \quad (8),$$

where
L1$a$vd is an Abbe number for the d-line of the first negative lens,
L1$b$vd is an Abbe number for the d-line of the second negative lens, and
L1$c$vd is an Abbe number for the d-line of the third positive lens.

12. The zoom lens according to claim 11,
wherein the following conditional expression (8-1) is satisfied $$18 < (L1avd + L1bvd)/2 - L1cvd < 26 \quad (8\text{-}1).$$

13. The zoom lens according to claim 1,
wherein the following conditional expression (9) is satisfied $$-0.3 < (L1br - L1cf)/(L1br + L1cf) < 0.5 \quad (9),$$

where
L1$br$ is a curvature radius of a surface on the image side of the second negative lens, and
L1$cf$ is a curvature radius of a surface on the object side of the third positive lens.

14. The zoom lens according to claim 13,
wherein the following conditional expression (9-1) is satisfied $$-0.06 < (L1br - L1cf)/(L1br + L1cf) < 0.35 \quad (9\text{-}1).$$

15. The zoom lens according to claim 1,
wherein during zooming from a wide angle end to a telephoto end, the third lens group constantly moves toward the object side so that a 3-4 composite lens group composed of the third lens group and the fourth lens group, and the second lens group simultaneously pass through respective points at which imaging magnifications of the 3-4 composite lens group and the second lens group are −1.

16. The zoom lens according to claim 1,
wherein during zooming from the wide angle end to the telephoto end, a distance between the third lens group and the fourth lens group decreases, increases, and then decreases.

17. The zoom lens according to claim 1,
wherein the following conditional expression (1-1), conditional expression (2-1), and conditional expression (3-1), and/or conditional expression (3-2) are satisfied $$-0.41 < (L1ar + L1bf)/(L1ar - L1bf) < -0.04 \quad (1\text{-}1),$$

$$0.06 < d2/tt1 < 0.12 \quad (2\text{-}1), \text{ and}$$

$$-5.5 < f1/f2 < -3 \quad (3\text{-}1), \text{ and/or}$$

$$-4.6 < f1/f2 < -3.5 \quad (3\text{-}2).$$

18. An imaging apparatus comprising the zoom lens according to claim 1.

* * * * *